(12) United States Patent
Mancuso et al.

(10) Patent No.: US 9,732,903 B2
(45) Date of Patent: Aug. 15, 2017

(54) CLAMPING BRACKET

(71) Applicant: Rockwell Automation Technologies, Inc., Mayfield Heights, OH (US)

(72) Inventors: Anthony J. Mancuso, Melrose, MA (US); Roberto S. Santos, Hudson, OH (US)

(73) Assignee: ROCKWELL AUTOMATION TECHNOLOGIES, INC., Mayfield Heights, OH (US)

( * ) Notice: Subject to any disclaimer, the term of this patent is extended or adjusted under 35 U.S.C. 154(b) by 0 days.

(21) Appl. No.: 14/931,717

(22) Filed: Nov. 3, 2015

(65) Prior Publication Data
US 2017/0122491 A1    May 4, 2017

(51) Int. Cl.
*A47B 96/00*    (2006.01)
*F16M 13/02*    (2006.01)
*F16B 2/06*    (2006.01)
*G01D 11/30*    (2006.01)

(52) U.S. Cl.
CPC ............. *F16M 13/02* (2013.01); *F16B 2/065* (2013.01); *G01D 11/30* (2013.01); *A45F 2200/0533* (2013.01)

(58) Field of Classification Search
CPC ........... F16B 2/10; F16B 2/065; F16M 13/00; F16M 13/02; F21V 1/26; G01D 11/30
See application file for complete search history.

(56) References Cited

U.S. PATENT DOCUMENTS

| 2,225,875 | A | * | 12/1940 | Liebmann | ............ | A47C 21/022 |
| | | | | | | 217/60 F |
| 4,881,716 | A | * | 11/1989 | Dingler | ................. | E04G 17/045 |
| | | | | | | 249/192 |
| 7,703,256 | B2 | * | 4/2010 | Haddock | ................... | F16B 2/10 |
| | | | | | | 52/24 |

OTHER PUBLICATIONS

"44B Adjustable Background and Foreground Suppression—50 mm Rectangular", Photoswitch Photoelectric Sensors, Allen-Bradley, retrieved Mar. 19, 2013, 1 page.
"Mounting components", Sensopart, published online at [http://www.sensopart.com/products/accessories/standard-sensors/mounting-components?limit=200], retrieved on Jul. 21, 2016, 4 pages.
"MBDF 10—Mounting component for dovetail", Sensopart, Mar. 8, 2011, 1 page.
"MBD F 25—Mounting component for dovetail F 25", Sensopart, Dec. 14, 2011, 1 page.

(Continued)

*Primary Examiner* — Amy Sterling
(74) *Attorney, Agent, or Firm* — Amin, Turocy & Watson, LLP

(57) ABSTRACT

A clamping bracket comprising, one or more bracket pieces, can be employed to hold an object in a desired position. The bracket can be constructed to make installation of the bracket with respect to the object easy and intuitive to the user, and more cost effective. The clamping bracket can have a top portion and bottom portion of the bracket that extend outward from a base portion of the bracket. Ends of the top and bottom portions can complement a groove formed in a casing of the object, wherein the ends of the top and bottom portions can be inserted into the groove. A fastener can be inserted through holes in the top and bottom portions, wherein, when the fastener is tightened down on the bracket, the fastener can cause the ends of the top and bottom portions to clamp down on and hold the object within the bracket.

19 Claims, 30 Drawing Sheets

(56) References Cited

OTHER PUBLICATIONS

"MBD F 25ST2—Mounting component (zinc die cast) for attaching dovetail F 25 to for bars ø 12 mm and square profiles 10×10 mm" Sensopart SensoClip, Mar. 18, 2015, 1 page.

"MBD F 25STP—Mounting component (zinc die cast) with sensor protection (stainless steel) for attaching F 25 sensors to bars ø 12 mm and square profiles 10×10 mm" Sensopart SensoClip, Mar. 18, 2015, 1 page.

"MBD-S94—Dovetail double clamp mounting" Sensopart, published online at [http://www.sensopart.com/en/products/accessories/standard-sensors/mounting-components/mbd-s94.html], retrieved on May 20, 2015, 1 page.

"Photoswitch Bulletin 44B Photoelectric Sensor", Publication 75051-037-01(A), Rockwell Automation—Allen-Bradley, Dec. 2004, 4 pages.

"Photoswitch Photoelectric Sensors—44B Short Range", Rockwell Automation, retrieved on May 12, 2015, 1 page.

"Photoswitch Photoelectric Sensors", Rockwell Automation, Publication Photo—BR001D-EN-P, Feb. 2012, 8 pages.

"Product Profile—44B PhotoElectric Sensor", Rockwell Automation, Publication 44B-PP001A-EN-P, Mar. 2006, 2 pages.

"Accessories", Sensopart, Feb. 2015, 42 pages.

"Short-Range Background & Foreground Suppression Sensors", Allen-Bradley, published online at [http://ab.rockwellautomation.com/sensors-switches/background-suppression-photoelectric-sensors/44b-short-range-photoelectric-sensors#selection], archived version dated Aug. 6, 2015 retrieved via the Internet Archive Wayback machine on Jul. 20, 2016, 2 pages.

"MBD F 25—Dovetail clamp mounting", Sensopart, published online at [http://www.sensopart.com/en/products/accessories/standard-sensors/mounting-components/mbd-F-25.html], retrieved on Jul. 21, 2016, 2 pages.

"45LSP Optical Fork Photoswitch Photoelectric Sensors Installation Instructions", Allen-Bradley—Rockwell Automation, Publication 45LSP-IN001C-EN-P, Nov. 2015, 4 pages.

* cited by examiner

CLAMPING BRACKET

TECHNICAL FIELD

The subject specification relates generally to brackets, e.g., clamping brackets.

BACKGROUND

Brackets often can be used to hold, fix, and/or orient an object, such as a mechanical and/or an electronic device in a certain position or place. For instance, photoelectric sensors and other types of sensors are often employed in an industrial automation system, such as a conveyor system used on an assembly line, to perform various types of sensing functions, such as detecting the presence of objects moving down an assembly line and to determine whether a given object has entered or exited a particular region of the assembly line. It can be desirable to position a sensor in a particular way with respect to the portion (e.g., industrial device, process, or asset, or portion thereof) of the industrial automation system the sensor is to perform its sensing functions, so that the sensor can obtain desirable (e.g., optimal, suitable, acceptable) sensor information and provide such desirable sensor information relating to the operation of that portion of the industrial automation system. A bracket typically can be used to hold the sensor in a desired position with respect to the portion of the industrial automation system to facilitate enabling the sensor to obtain and provide the desired sensor information.

The above-provided information is merely intended to provide a contextual overview relating to brackets, and is not intended to be exhaustive.

SUMMARY

The following discloses a simplified summary of the specification in order to provide a basic understanding of some aspects of the specification. This summary is not an extensive overview of the specification. It is intended to neither identify key or critical elements of the specification nor delineate the scope of the specification. Its sole purpose is to disclose some concepts of the specification in a simplified form as a prelude to the more detailed description that is disclosed later.

Apparatuses and methods relating to brackets are presented. The disclosed subject matter includes a bracket comprising a base portion having a defined length. The bracket also comprises a top portion that is associated with the base portion on an end of the top portion, wherein the top portion comprises a top edge portion at another end of the top portion that is opposite the end of the top portion, wherein the top edge portion is bent at a defined angle and has a defined shape that complements a first groove in a casing of an object. The bracket further comprises a bottom portion that is associated with the base portion on an end of the bottom portion, wherein the bottom portion comprises a bottom edge portion at another end of the bottom portion that is opposite the end of the bottom portion, wherein the bottom edge portion is bent at the defined angle and has the defined shape that complements a second groove in the casing of the object that is capable of being held in the bracket between the top edge portion and the bottom edge portion.

The disclosed subject matter also includes an apparatus that comprises a base portion having a specified length. The apparatus also comprises a first portion that is associated with the base portion on an end of the first portion, wherein the first portion comprises a first edge portion at another end of the first portion that is opposite the end of the first portion, wherein the first edge portion is bent at a first defined angle and has a first defined shape that is based at least in part on a first groove shape of a first groove formed in or on a casing of an object. The apparatus further comprises a second portion that is associated with the base portion on an end of the second portion, wherein the second portion comprises a second edge portion at another end of the second portion that is opposite the end of the second portion, wherein the second edge portion is bent at a second defined angle and has a second defined shape that is based at least in part on a second groove shape of a second groove in or on the casing of the object that is capable of being held in the apparatus between the first edge portion and the second edge portion.

The disclosed subject matter further includes a method that comprises at least one of forming, bending, or angling a piece of material to form a base portion, a top portion, and a bottom portion of an apparatus, wherein the base portion can be at a closed end of the apparatus, and wherein the top portion and the bottom portion each can be at a defined angle with respect to the base portion when the apparatus is at a resting position. The method also comprises forming a top edge portion on an end of the top portion that is opposite to the base portion by at least one of forming, bending, or angling a defined part of the end of the top portion downward towards the bottom portion at a defined angle with respect to a remaining portion of the top portion of the apparatus, wherein the top edge portion has a first shape that complements or corresponds to a defined shape of a top recessed region of an object that is able to be clamped and held by the apparatus. The method further comprises forming a bottom edge portion on an end of the bottom portion that is opposite to the base portion by at least one of forming, bending, or angling a defined part of the end of the bottom portion upward towards the top edge portion at a defined angle with respect to another portion of the bottom portion of the apparatus, wherein the bottom edge portion has a defined second shape that complements or corresponds to another defined shape of a bottom groove of the object that is able to be clamped and held by the apparatus, wherein the top edge portion is able to apply a first pressure to the top groove and the bottom edge portion is able to apply a second pressure to the bottom groove in response to pressure being applied to at least one of the top portion or the bottom portion to facilitate clamping and holding the object.

The following description and the annexed drawings set forth certain illustrative aspects of the specification. These aspects are indicative, however, of but a few of the various ways in which the principles of the specification can be employed. Other advantages and features of the specification will become apparent from the following detailed description of the specification when considered in conjunction with the drawings.

DETAILED DESCRIPTION

Figure 1A:
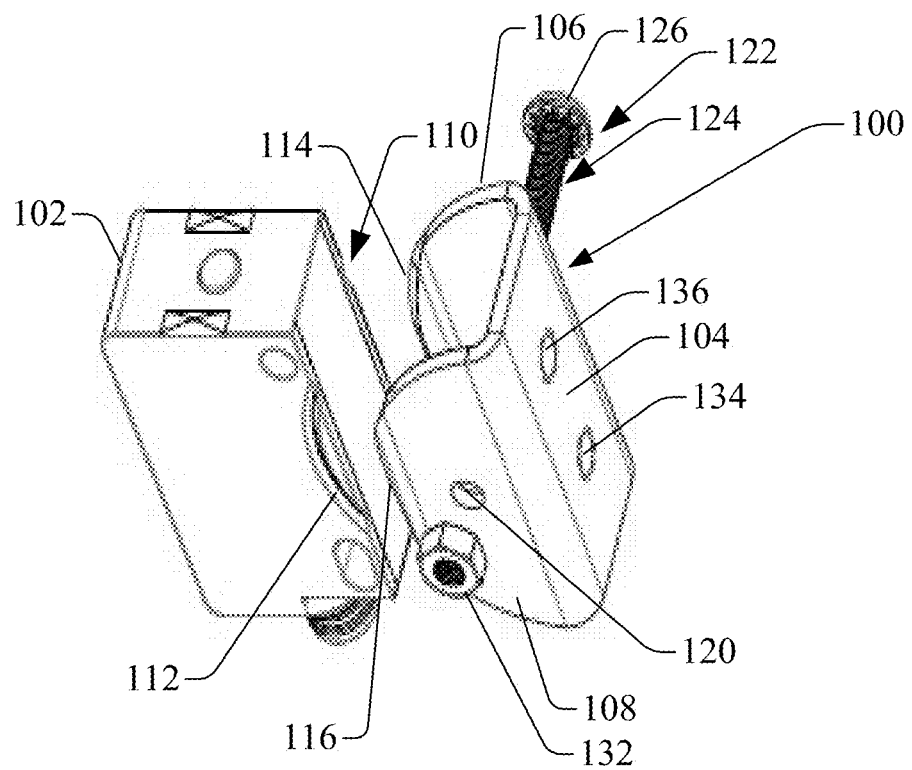
FIGS. 1A, 1B, 1C, and 1D illustrate diagrams of various views of an example apparatus that can be employed to efficiently hold or fasten an object in a desired position or place, in accordance with various aspects and embodiments of the disclosed subject matter.

The disclosed subject matter is now described with reference to the drawings, wherein like reference numerals are used to refer to like elements throughout. In the following description, for purposes of explanation, numerous specific details are set forth in order to provide a thorough understanding of the disclosed subject matter. It can be evident, however, that the disclosed subject matter can be practiced without these specific details. In other instances, well-known structures and devices are shown in block diagram form in order to facilitate describing the disclosed subject matter.

Brackets often can be used to hold, fix, and/or orient an object, such as mechanical and/or electronic devices in a certain position or place. For instance, photoelectric sensors and other types of sensors are often employed in an industrial automation system, such as a conveyor system used on an assembly line, to perform various types of sensing functions, such as detecting the presence of objects moving down an assembly line and to determine whether a given object has entered or exited a particular region of the assembly line. It can be desirable to position a sensor in a particular way with respect to the portion (e.g., industrial device, process, or asset, or portion thereof) of the industrial automation system the sensor is to perform its sensing functions, so that the sensor can obtain desirable (e.g., optimal, suitable, acceptable) sensor information and provide such desirable sensor information relating to the operation of that portion of the industrial automation system. For example, in the case of a photoelectric sensing device implemented in a manufacturing assembly line, it typically can be desired for the photoelectric sensing device to be fixedly oriented in a particular direction so as to be aligned to receive a light beam from a light source located elsewhere. A bracket can be used to hold the sensor in a desired position with respect to the portion of the industrial automation system to facilitate enabling the sensor to obtain and provide the desired sensor information.

The photoelectric sensing device is capable of receiving and detecting the presence of a light beam (e.g., a laser beam) emitted by a light source located elsewhere (e.g. opposite the sensor). Other exemplary applications for the photoelectric sensing device arrangement can include, for example, "transmitted beam" or "through beam" applications. However, other applications, including but not limited to "retroreflective" and "diffuse" applications, are known and considered to be within the scope of the disclosed subject matter. In the context of a retroreflective application, for example, a sensing device can both emit and detect light that is reflected off of a target reflector that can be positioned where the light source is located. Similarly, in the context of a diffuse application, a sensing device can both emit and detect light that is reflected off of the object to be sensed (e.g., without the use of a light source positioned or located elsewhere).

Some conventional brackets are made up of multiple pieces, such as a top piece, a bottom piece, and a number of fasteners. A user trying to install such a conventional bracket may have some difficulty in trying attach the various bracket pieces (e.g., top piece and bottom piece) to each other and/or trying to attach the various bracket pieces to the object (e.g., sensor) being fastened by the conventional bracket and trying to apply the fasteners to the bracket pieces to clamp down the bracket pieces on the object to hold the object in place. Also, one or more of these multiple pieces of a conventional bracket may be lost, which can thereby render the bracket useless or at least make the bracket less effective.

Furthermore, although in many circumstances it can be desirable for a sensor to be mounted in a manner such that the position of the sensor is accurately fixed or at least limited to being within a predictable or predetermined range, it often can be the case that the supporting structures on which sensors are to be mounted are not designed or manufactured to the tolerances that should be satisfied in the positioning of the sensors to allow for proper orientation of those sensing devices. Again, for example with respect to assembly lines, while multiple photoelectric sensors may be respectively mounted on respective successive conveyor sections in an assembly line, fine adjustment of each of the positions of the sensors typically still can be desirable to achieve proper alignment of those sensing devices with their respective light sources.

Given the above considerations, in some cases, conventional brackets can be limited in terms of their capabilities and may only allow relatively slight adjustments in the positioning of sensing devices relative to the supporting structures on which the sensing devices are being mounted via the mounting mechanisms. Also, the designs of many conventional brackets can make it difficult for persons installing sensing devices to achieve specific desired positions, that is, to finely adjust the positions of the sensing devices and set or lock the sensing devices in those positions. Also, in some cases, even if during installation it is possible to achieve a specific desired position, it often can be difficult, or even impossible, for the person doing the installing (or other persons) to determine whether the desired position has been achieved.

To that end, apparatuses (e.g., clamping brackets), and systems and methods for fabricating such apparatuses are presented. A clamping bracket, comprising one or more bracket pieces, can be employed to hold an object (e.g., a sensor device, a light device, a camera or other capture (e.g., video or audio capture) device, a measurement device, or other type of device or object) in a desired position. The bracket can be constructed to make installation of the bracket with respect to the object easy and intuitive to the user, and to make the bracket more cost effective (e.g., less expensive), as compared to conventional brackets.

In some embodiments, the clamping bracket can be a single-piece bracket that can be formed or fabricated as one piece using a desired material(s) (e.g., metal, plastic), wherein the bracket can comprise a top portion, a bottom portion, and a base portion. The top portion and the bottom portion of the bracket can extend outward from the base portion of the bracket by a desired length, which can be based at least in part on the length of the portion of the object that is to be clamped by, and held in between, the top and bottom portions of the bracket. The top portion and the bottom portion of the bracket can have a desired width, which can be based at least in part on the width of the portion of the object that is to be clamped by, and held in between, the top and bottom portions of the bracket. The base portion can be at a desired angle (e.g., 90 degrees or substantially close to 90 degrees) with respect to the top portion and bottom portion of the bracket (e.g., when the base portion is at rest with respect to the top portion and bottom portion of the bracket (e.g., when no pressure from a fastener and an associated nut or threaded hole is being exerted on the top and bottom portions)).

In other embodiments, the clamping bracket can be a multi-piece bracket that can be formed or fabricated as multiple pieces (e.g., multiple bracket portions) using a desired material(s) (e.g., metal, plastic), wherein the bracket can comprise a top portion, a bottom portion, a base portion, and a pin component. For instance, the multi-piece bracket can comprise a first piece (e.g., first bracket portion) that can comprise the top portion and part of the base portion, and a second piece (e.g., second bracket portion) that can comprise the bottom portion and another part of the base portion, wherein the base portion can be part of a hinge, wherein the top portion and bottom portion can be moved about the hinge such that, at the open end of the bracket, where the top edge portion and bottom edge portion are located, the top portion and bottom portion can have a desired angle of a range of available angles (e.g., 0 degrees to 180 degrees, or more) with respect to the top portion and bottom portion of the bracket. The respective parts of the base portion can be formed, shaped, or fabricated to have hole regions into which the pin component can be inserted to connect the first piece and the second piece together to connect the first piece and the second piece together to form the clamping bracket.

In some implementations, the object can have grooves that can be formed on the surfaces (e.g., top and bottom surfaces) of the casing of the object, wherein the grooves can have a desired (e.g., a defined) depth (e.g., into the surface of the casing) and a desired shape (e.g., a groove that can be in a straight or substantially straight line, a groove that can be curved in shape). At the open end of the bracket, which can be at an opposite end from the closed end of the bracket, wherein the top portion and bottom portion are connected to the base portion of the bracket, the end of the top portion at the open end of the bracket can have an edge (e.g., top edge), and the end of the bottom portion at the open end of the bracket can have an edge (e.g., bottom edge), wherein the respective edges can be formed to have a shape that corresponds to and complements the grooves in the casing of the object with respect to shape, depth, and/or width.

When associating the bracket with the object (e.g., when attaching the bracket to the object), the respective edges of the top and bottom portions of the bracket can be inserted into or placed in proximity to the respective grooves of the casing of the object. The respective edges of the top and bottom portions of the bracket can correspond to or complement the respective grooves of the casing of the object (e.g., the respective edges of the top and bottom portions of the bracket can be shaped (e.g., curved, straight, irregular shape), angled (e.g., bent at a desired angle), and/or sized (e.g., width) to be the same or substantially the same as the shape (e.g., curved, straight, irregular shape) and/or size (e.g., width and/or depth) of the respective grooves of the casing of the object) to facilitate (e.g., enable) insertion of the respective edges of the top and bottom portions of the bracket into the respective grooves of the casing of the object. In some implementations, the groove on the top part and the groove on the bottom part of the casing of the object can be the same (e.g., can have the same shape and size), and correspondingly, the edge of the top portion and the edge of the bottom portion of the bracket can be the same (e.g., can have the same shape, angle, and size). In other implementations, the groove on the top part and the groove on the bottom part of the casing of the object can be different from each other (e.g., can be differently shaped and/or sized), and correspondingly, the edge of the top portion and the edge of the bottom portion of the bracket can be different from each other (e.g., can be differently shaped, angled, and/or sized).

In still other implementations, the casing of the object does not have grooves formed thereon. In such implementations, the respective edges of the top and bottom portions of the bracket can be applied to or associated with the top and bottom surfaces of the object at a desired place on the top and bottom surfaces of the object.

To facilitate clamping the bracket down onto the object, the top portion and the bottom portion of the bracket each can have at least one hole formed at a desired location on the top and bottom portions of the bracket. A fastener (e.g., screw or screw with captive lock washer) can have a shaft portion of a desired length (e.g., long enough to be inserted through the hole in the top portion and through the hole in the bottom portion of the bracket), a head portion on one end of the fastener, wherein the head portion is wider (e.g., in circumference) than the hole in the top portion of the bracket, and a threaded portion of the shaft portion that is at the other end of the shaft portion of the fastener. The fastener can be inserted through the holes in the top and bottom portions, wherein, when the fastener is tightened down on the bracket, the fastener can cause the ends of the top and bottom portions to flex and clamp down on (e.g., apply a desired amount of pressure to) and hold the object within the bracket. Conversely, when the fastener is loosened, the top and bottom portions can return (e.g. spring back) to a neutral (e.g. original) position. In some implementations, one of the holes (e.g., the hole on the bottom portion of the bracket) can be threaded, and the fastener can be correspondingly threaded such that the fastener can be inserted into the hole and its threaded portion can engage the threaded portion of the bottom portion of the bracket and be rotated to cause the threaded portion of the fastener to move through the hole. The fastener can thereby apply pressure on the top portion of the bracket, via the head portion of the fastener, and on the bottom portion of the bracket, via the threaded portion of the fastener being engaged with and rotated through the threaded hole of the bottom portion of the bracket. This, in turn, can cause the respective edges of the top and bottom portions of the bracket to apply a desired amount of pressure on the respective grooved regions of the top and bottom surfaces of the casing of the object to grip and hold the object in the desired position with respect to the bracket and/or with respect to another object with which the object is associated. In this manner, the object (e.g., sensor) can be easily installed or removed (e.g. for replacement) from the bracket by loosening a single fastener and without having to remove the bracket from its attachment to a desired surface. This can be advantageous because, without having to remove the bracket from its attachment to a desired surface, it can be less likely that the bracket (or a component thereof) is lost, which can thereby render the bracket useless or at least make the bracket less effective.

In some implementations, a bracket (e.g., a single-piece or multiple-piece bracket) can be elongated to accommodate and hold more than one object in between the top and bottom portions of the bracket. Each object can be held in a desired position with respect to the clamp or another object using a fastener(s), as disclosed herein.

In some implementations, the bracket can facilitate the accurate positioning of objects (e.g., sensing devices) with respect to other supporting structures and/or other structures or devices in a manner that can allow for significant variation in sensor positioning. Also, in at least some embodiments, the disclosed subject matter can be advantageous in that the brackets described herein can facilitate the accurate positioning of sensing devices and even, at least in some cases, provide some corroboration that desired positions for the sensing devices has been achieved.

These and other aspects and embodiments of the disclosed subject matter will now be described with respect to the drawings.

Now referring to FIGS. 1A, 1B, 1C, and 1D, illustrated are diagrams of various views of an example apparatus 100 that can be employed to efficiently hold or fasten an object in a desired position or place, in accordance with various aspects and embodiments of the disclosed subject matter. The apparatus 100 can be a single-piece bracket (e.g., clamping bracket) that can be employed to clamp down on, hold, or fasten an object 102 (e.g., a sensor) in a desired position or place with respect to the apparatus 100 and/or another object. The apparatus 100 can be formed or fabricated as one piece of uniform thickness or at least substantially uniform thickness using a desired material(s), such as metal (e.g., steel, stainless steel, aluminum, spring-tempered brass, or titanium) or plastic (e.g., polybutylene terephthalate (PBT), polyether ether ketone (PEEK), polyetherimide, or polyphenylsulfone), for example.

The apparatus 100 can comprise a base portion 104 that can be associated with (e.g., integrated with) a top portion 106 and a bottom portion 108 of the apparatus 100 such that the base portion 104 can be a closed end of the apparatus 100, an end of the top portion 106 can be connected to and/or integrated with the one end of the base portion 104, and an end of the bottom portion 108 can be connected to and/or integrated with the other end of the base portion 104.

The top portion 106 and the bottom portion 108 of the apparatus 100 can extend outward from the base portion 104 of the apparatus 100 by a desired defined length, which can be based at least in part on the length of the portion of the object 102 that is to be clamped by, and held in between, the top portion 106 and bottom portion 108 of the apparatus 100. The top portion 106 and the bottom portion 108 of the apparatus 100 can have a desired defined width, which can be based at least in part on the width of the portion of the object 102 that is to be clamped by, and held in between, the top portion 106 and bottom portion 108 of the apparatus 100. The base portion 104 can be at a desired angle (e.g., 90 degrees, or substantially close to 90 degrees) with respect to the top portion 106 and bottom portion 108 of the apparatus 100.

In some implementations, the object 102 can have grooves 110 (e.g., recessed portions or regions) and 112 that can be formed in or on the surfaces (e.g., top and bottom surfaces) of the casing of the object 102, wherein the grooves 110 and 112 can have a desired defined depth (e.g., into the surface of the casing of the object 102 or into a surface of a protruding portion formed on the casing of the object 102) and a desired defined shape (e.g., a groove that can be curved in shape (e.g., in the form of a partial (e.g., half) moon or semi-circle), a groove that can be in a straight or substantially straight line). At the open end of the apparatus 100, which can be at an opposite end from the closed end of the apparatus 100, wherein the top portion 106 and bottom portion 108 can be connected to the base portion 104 at the closed end of the apparatus 100, the end of the top portion 106 at the open end of the apparatus 100 can have an edge portion 114 (e.g., top edge portion), and the end of the bottom portion 108 at the open end of the apparatus 100 can have an edge portion 116 (e.g., bottom edge portion), wherein the top edge portion 114 and bottom edge portion 116 of the apparatus 100 (e.g., dovetail clamping bracket) can be formed to have a shape, size, and/or orientation that can correspond to and complement the grooves 110 and 112 formed in or on the casing of the object 102 with respect to shape, depth, width, angle, and/or other factors.

When associating the apparatus 100 with the object 102 (e.g., when attaching the apparatus 100 to the object 102), the edge portion 114 of the top portion 106 and the edge portion 116 of the bottom portion 108 of the apparatus 100 can be inserted into or placed in proximity to the respective grooves 110 and 112 formed on or in the casing of the object 102. The edge portion 114 of the top portion 106 and the edge portion 116 of the bottom portion 108 of the apparatus 100 can correspond to or complement the respective grooves 110 and 112 formed in or on the casing of the object 102 (e.g., the respective edge portions 114 and 116 can be shaped (e.g., curved, straight, irregular shape), angled (e.g., bent at a desired angle), and/or sized (e.g., width) to be the same or substantially the same as the shape (e.g., curved, straight, irregular shape) and/or size (e.g., width and/or depth) of the respective grooves 110 and 112 formed in or on the casing of the object 102) to facilitate (e.g., enable) insertion of the respective edge portions 114 and 116 of the apparatus 100 into the respective grooves 110 and 112 of the casing of the object 102. As depicted in FIG. 1, the grooves 110 and 112 formed in or on the casing of the object 102 can be curved in a semi-circle or partial moon shape, and correspondingly, the edge portion 114 of the top portion 106 and the edge portion 116 of the bottom portion 108 of the apparatus 100 each can be curved in a semi-circle or partial moon shape that complements the grooves 110 and 112 of the object.

In some implementations, the groove 110 on the top part and the groove 112 on the bottom part of the casing of the object 102 can be the same or substantially the same (e.g., can have the same or substantially the same shape, size, and depth), and correspondingly, the edge portion 114 of the top portion 106 and the edge portion 116 of the bottom portion 108 of the apparatus 100 can be the same or substantially the same (e.g., can have the same or substantially the same shape, angle, and size). In other implementations, the groove 110 formed in or on the top part and the groove 112 formed on or in the bottom part of the casing of the object 102 can be different from each other (e.g., can be differently shaped and/or sized), and correspondingly, the edge portion 114 of the top portion 106 and the edge portion 116 of the bottom portion 108 of the apparatus 100 can be different from each other (e.g., can be differently shaped, angled, and/or sized).

In still other implementations, the casing of the object 102 does not have grooves formed thereon. In such implementations, the respective edges 114 and 116 of the apparatus 100 can be applied to or associated with the top and bottom surfaces of the object 102 at a desired place on the top and bottom surfaces of the object 102.

To facilitate clamping the apparatus 100 down onto the object 102 to hold the object 102 in a desired position with respect to the apparatus 100 or another object, the top portion 106 and the bottom portion 108 of the apparatus 100 each can have at least one hole, such as hole 118 (e.g., through or clearance hole) and hole 120 (e.g., through or clearance hole), formed at a desired location on the top portion 106 and bottom portion 108 of the apparatus 100, wherein the holes 118 and 120 can be aligned with each other to enable a fastener 122 to be inserted through holes 118 and 120. A fastener 122 (e.g., screw) can have a shaft portion 124 of a desired defined length (e.g., long enough to be inserted through the hole 118 in the top portion 106 and through the hole 120 in the bottom portion 108 of the apparatus 100), a head portion 126 on one end of the fastener 122, wherein the head portion 126 (e.g., comprising a fastener head and/or washer) is wider (e.g., in circumference) than the hole 118 in the top portion 106 of the apparatus, and a threaded portion 128 of the shaft portion 124 that is at the other end of the shaft portion 124 of the fastener 122. The shaft portion 124 of the fastener 122 can be inserted through the holes 118 and 120 in the top and bottom portions 106 and 108, and the threaded portion 128 of the fastener 122 can be inserted into and engage a threaded inner surface 130 of a nut 132 (e.g., a threaded nut) such that the nut 132 and fastener 122 can be rotated in relation to each other to cause the threaded portion 128 of the fastener 122 to proceed through the threaded portion 130 of the nut 132 to facilitate tightening the fastener 122 and nut 132 combination on the top portion 106 and bottom portion 108, respectively. The threading of the nut 132 can correspond to the threading of the threaded portion 128 of the fastener 122. In some embodiments, the fastener 122 can be a screw with a captive lock washer that can serve to prevent the fastener 122 from becoming loose when the apparatus 100 is subjected to environmental conditions, such as, for example, vibration and/or temperature extremes.

When the fastener 122 is tightened down on the surface of the top portion 106 and the nut 132 is tightened down on the surface of the bottom portion 108 of the apparatus 100, the head portion 126 of the fastener 122 can thereby apply pressure on the surface of the top portion 106 of the apparatus 100, and the nut 132 also can apply pressure on the surface of the bottom portion 108 of the apparatus 100. This, in turn, can cause the respective edge portions 114 and 116 of the top and bottom portions 106 and 108 of the apparatus 100 to move and to apply a desired corresponding amount of pressure on the respective grooves 110 and 112 (e.g., grooved regions) of the top and bottom surfaces of the casing of the object 102 to grip and hold the object 102 in the desired position with respect to the apparatus 100 and/or with respect to another object with which the object 102 is associated. In this manner, the object 102 (e.g. sensor) can be installed or removed (e.g. for replacement) from the apparatus 100 (e.g., bracket) relatively easily by loosening a single fastener 122 without having to remove the apparatus 100 from its attachment to a desired surface.

The base portion 104, top portion 106, and bottom portion 108 of the apparatus 100 can have a uniform or at least a substantially uniform thickness. This can allow the top portion 106 and bottom portion 108 to flex by an equal or substantially equal amount when the fastener 122 is tightened down on the surface of the top portion 106 and the nut 132 is tightened down on the surface of the bottom portion 108 of the apparatus 100. With increasing thickness, the stiffness of the apparatus 100 likewise can increase, which can result in a higher clamping force (e.g., the top portion 106 and bottom portion 108 can apply increased pressure against the groove(s) (e.g., grooves 110 and/or 112) on the object 102 to more rigidly fix the object 102 in a desired position and/or orientation). When the fastener 122 is loosened, the clamping force removed (or at least reduced, depending on how much the fastener 122 is loosened), and the top portion 106 and bottom portion 108 can return (e.g. spring back) to a neutral (e.g. original) position. It is to be appreciated and understood that, as desired, the base portion 104, top portion 106, and bottom portion 108 of the apparatus can have different thicknesses. For example, the base portion 104 can have a first thickness, and the top portion 106 and bottom portion 108 can have a second thickness (and/or a third thickness), wherein the first thickness can be greater than (or less than) the second thickness (and/or third thickness).

In some implementations, the bottom portion 108 (or alternatively the top portion 106) can comprise a recessed pocket (not shown in FIGS. 1A-1D) that can correspond in shape to the outer perimeter of the nut 132 such that the nut 132 can be held captive (e.g., can prevent the nut from rotating) when the fastener 122 is tightened against the top portion 106 (or alternatively the bottom portion 108). In this manner, the object 102 can be assembled to the apparatus 100 using fewer tools (e.g., by using a single screwdriver, without having to use a wrench on the nut 132).

The apparatus 100 also can comprise a desired number of holes, such as hole 134 and hole 136, that can be formed in the base portion 104 of the apparatus 100. The holes 134 and 136 can be used to facilitate fastening the apparatus 100 to a desired surface (e.g., wall, panel, floor, or other type of surface), wherein fasteners, such as a screw, a nail, or another type of fastener, can be inserted into the holes 134 and 136, and the fasteners can be attached to (e.g., screwed into, nailed into) the desired surface to attach the apparatus 100 to the desired surface. In some implementations, the holes 134 and 136 can be in the form of an elongated slot (not shown in FIGS. 1A-1D). The slots can be oriented in such a manner so as to provide adjustment of the position of the apparatus 100 in a lateral and/or longitudinal direction.

Figure 1B:
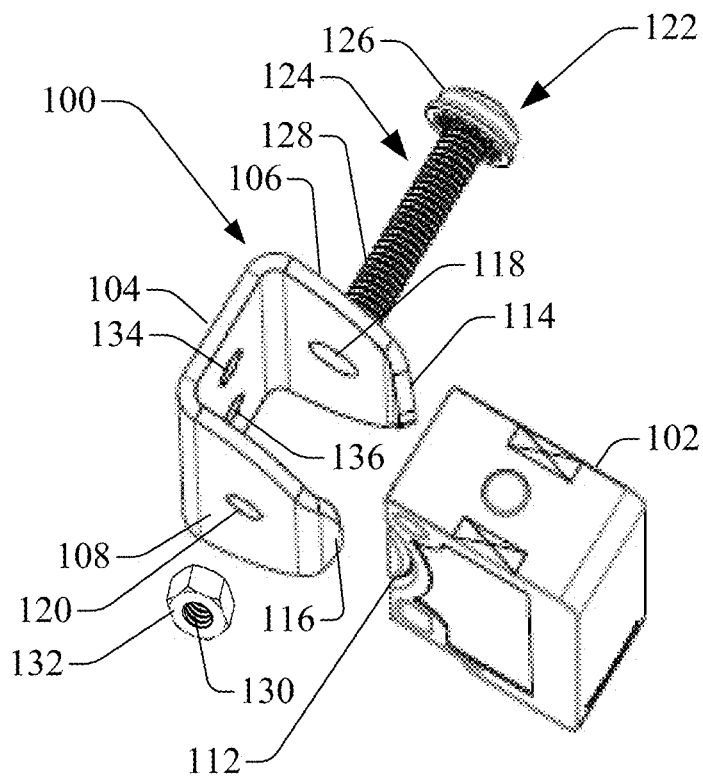
Figure 1C:
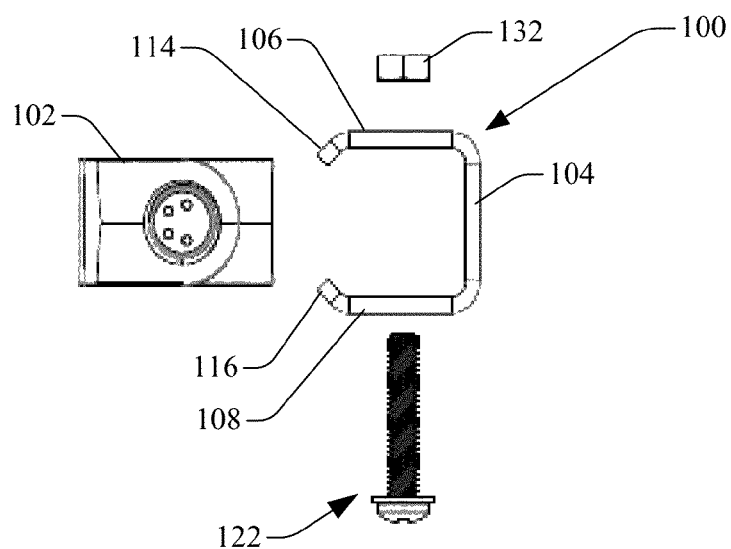
Figure 1D:
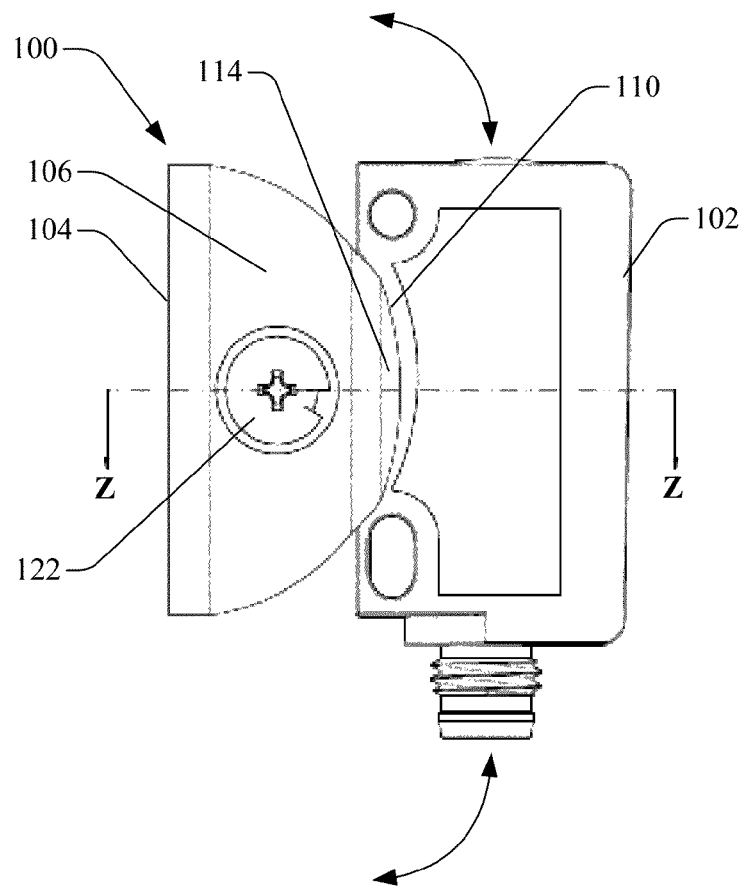

Referring briefly to FIG. 1D (in conjunction with FIGS. 1A, 1B, and 1C), FIG. 1D depicts a diagram of a top view of the example apparatus 100, in accordance with various aspects and embodiments of the disclosed subject matter. This top view of the apparatus 100 can illustrate the range of adjustment of the positioning of the apparatus 100 with respect to the object 102.

When the object 102 is being held by the apparatus 100, the object 102 can be adjusted (e.g., moved and/or rotated) with respect to the apparatus 100 (or vice versa) to accommodate different angular positions with respect to the apparatus 100. For instance, the grooves 110 and 112 of the object 102 can be angled in the form of a partial (e.g., half) moon or semi-circle shape, and the edge portions 114 and 116 of the apparatus 100 can be correspondingly angled in the form of a partial moon or semi-circle shape. The object 102 can be moved, slid, or rotated in relation to the interface between the grooves 110 and 112 of the object 102 and the edge portions 114 and 116, respectively, of the apparatus 100 to adjust the position of the object 102 with respect to the apparatus 100 to achieve a desired position of the object 102 with respect to the apparatus and/or another object. The fastener 122 can be tightened to fix the position of the object 102 with respect to the apparatus 100.

In some instances, even if during installation it is possible to achieve a specific desired position, it often may not be possible or sufficiently easy for the person doing the installing (or other persons) to determine whether the desired position has been achieved. Therefore, in some implementations, graduated markings or other indicators (not shown in FIGS. 1A-1D) can be printed, laser etched, engraved, formed, or applied, via an adhesive-backed label, to the top portion 106 (and/or alternatively to bottom portion 108) to provide an indication of the angular position range (e.g. ±30°, ±45°, etc.) that the apparatus 100 can accommodate for adjusting the relative orientation of the object 102 with respect to the apparatus 100 when the apparatus 100 is fixed to a desired mounting surface.

Reference has been made herein to various dimensions (e.g., length, width, height, thickness) of different parts or portions of the apparatus 100 and object 102. It is to be appreciated and understood that each dimension of the various dimensions (e.g., length, width, height, thickness) of the different parts or portions of the apparatus 100 and object 102 (or the other apparatuses (e.g., brackets) or objects described herein) can be virtually any size desired (e.g., by a user, manufacturer or fabricator, consumer, or other entity). For example, a length, width, height, and/or thickness of a part or portion of an apparatus or object respectively can be less than 1 inch, 1 inch, more than 1 inch, wherein the dimensions of the parts or portions of an apparatus can be based at least in part on the dimensions of the parts or portions of an object to be clamped and held by the apparatus, wherein different parts or portions of the apparatus can be respectively sized (e.g., differently sized or same sized in relation to each other), and wherein different parts or portions of the object can be respectively sized (e.g., differently sized or same sized in relation to each other).

Figure 2A:
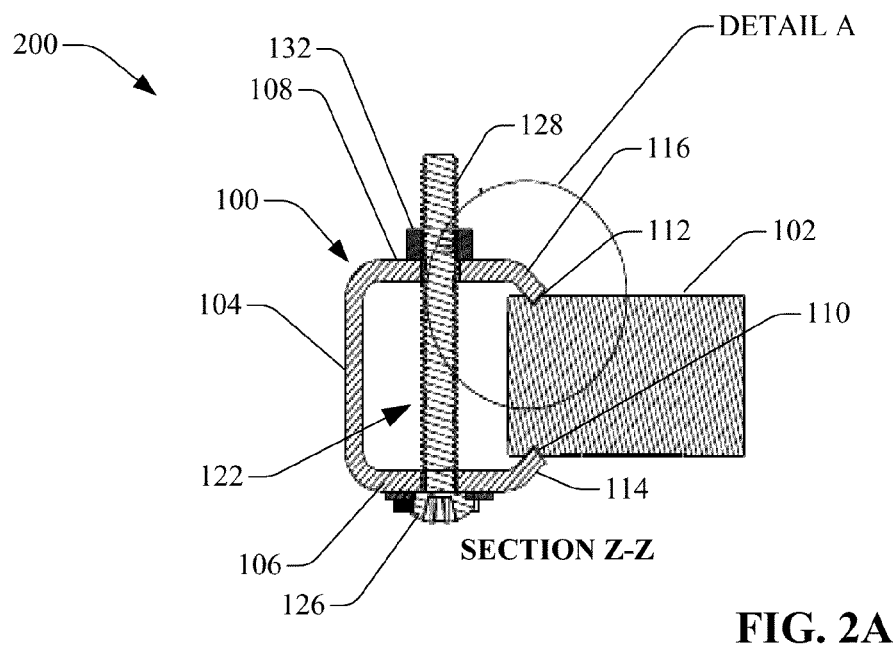
FIGS. 2A and 2B respectively illustrate a diagram of a cross-sectional view of a portion of the apparatus clamped onto an object and an enlargement of a portion of the cross-sectional view of the portion of the apparatus clamped onto an object, in accordance with various aspects and embodiments of the disclosed subject matter.
Figure 2B:
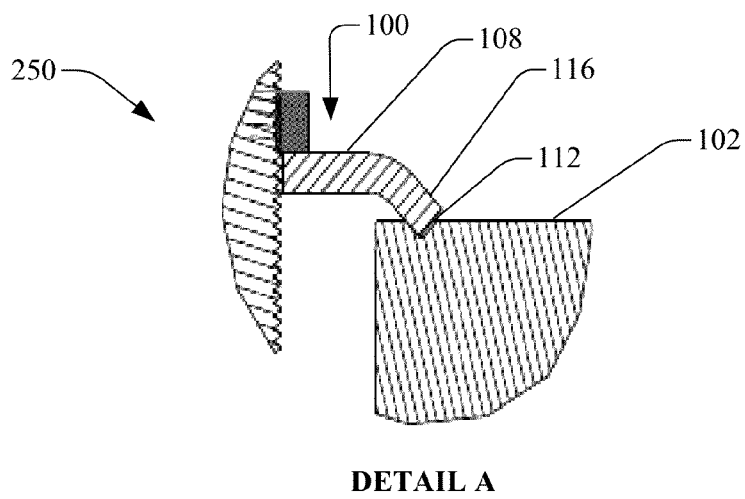

FIGS. 2A and 2B respectively illustrate a diagram of a cross-sectional view of a portion 200 of the apparatus 100 clamped onto the object 102 and an enlarged view of a portion 250 of the cross-sectional view of the portion 200 of the apparatus 100 clamped onto the object 102, in accordance with various aspects and embodiments of the disclosed subject matter. The cross-sectional view of the portion 200 of the apparatus 100 depicts the apparatus 100 clamped down on the object 102 with the edge portion 114 of the apparatus 100 shaped or otherwise formed to fit within the groove 110 of the object 102 and the edge portion 116 of the apparatus 100 shaped or otherwise formed to fit within the groove 112 of the object 102. As can be seen in FIG. 2B (as well as FIG. 2A and FIG. 1D (from a different perspective)), in the enlarged view of a portion 250 of the cross-sectional view of the portion 200 of the apparatus 100, the edge portion 116 can be shaped and can be bent or angled at a desired angle (e.g., 15 degrees, 30 degrees, 45 degrees, or other desired number of degrees) with respect to the other part of the bottom portion 108 such that the shape and the angle of the edge portion 116 can correspond to the shape and the angle of the groove 112 (e.g., a groove having a two sides open at one end and closing to a point, similar to two sides of a triangle) formed in (or on) the casing of the object 102. Same or similar to the top edge portion 114 and groove 110, as depicted in FIG. 1D, the bottom edge portion 116 can be shaped in the form of a partial moon or semi-circle that can correspond to the partial moon or semi-circle shape of the groove 112 of the object 102. These features of the edge portion 116 (and similarly edge portion 114) can enable the edge portion 116 (and similarly edge portion 114) to fit firmly and/or tightly in the groove 112 (and similarly groove 110) of the casing of the object 102 and can enable adjustment of the position of the object 102 with respect to the apparatus 100 by adjusting or moving the object 102 in relation to the interface between the groove 112 (and similarly groove 110) of the casing of the object 102 and the edge portion 116 (and similarly edge portion 114) of the apparatus 100. The fastener 122 can be tightened to fix the position of the object 102.

Figure 3:
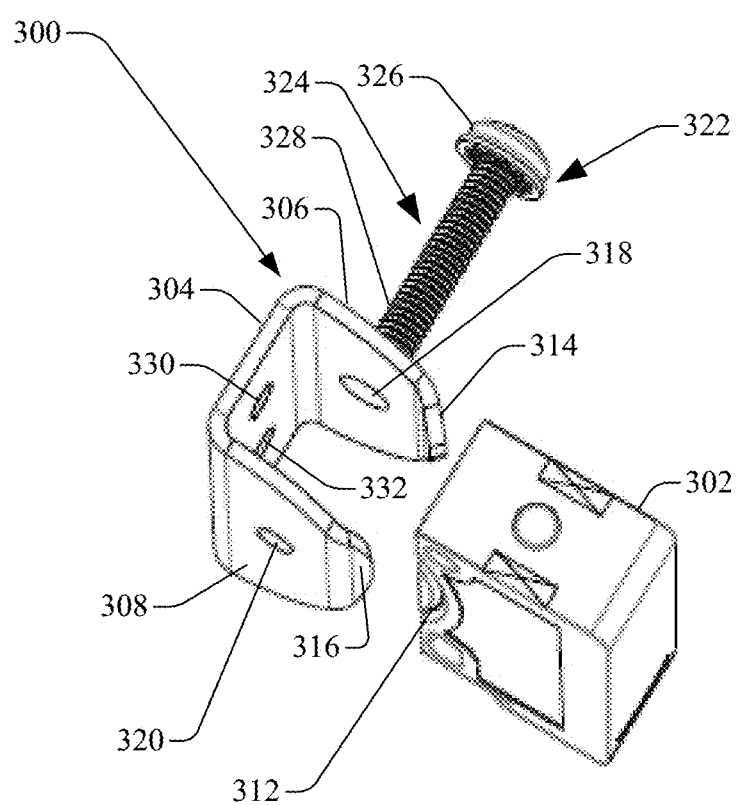
FIG. 3 presents a diagram of a view of another apparatus that can be employed to efficiently hold or fasten an object in a desired position or place, in accordance with various aspects and embodiments of the disclosed subject matter

FIG. 3 presents a diagram of a view of another apparatus 300 that can be employed to efficiently hold or fasten an object in a desired position or place, in accordance with various aspects and embodiments of the disclosed subject matter. The apparatus 300 can be a single-piece bracket (e.g., dovetail clamping bracket) that can be employed to clamp down on, hold, or fasten an object 302 in a desired position or place with respect to the apparatus 300 and/or another object. The object 302 can be, for example, a sensor device, a light device, a camera or other capture (e.g., video or audio capture) device, a measurement device, or other type of device or object. The apparatus 300 can be formed or fabricated as one piece of uniform or at least substantially uniform thickness using a desired material(s), such as metal (e.g. steel, stainless steel, aluminum, spring-tempered brass, or titanium) or plastic (e.g. PBT, PEEK, polyetherimide, or polyphenylsulfone), for example.

The apparatus 300 can be substantially the same as (e.g., can comprise substantially the same features as) apparatus 100, as described with respect to FIGS. 1A-1D and 2A-2B, except, for example, as described herein with regard to FIG. 3. For instance, the apparatus 300 can comprise a base portion 304, top portion 306, and bottom portion 308. The object 302 can comprise grooves, such as a grooves (not shown in FIG. 3 that can be formed in (or on) the top surface of the casing of the object 302 and groove 312 that can be formed in (or on) the bottom surface of the casing of the object 302. The apparatus 300 also can comprise an edge portion 314 (e.g., top edge portion), an edge portion 316 (e.g., a bottom edge portion), hole 318 formed in the top portion 306, hole 320 formed in the bottom portion 308. A fastener 322 can be employed to fasten the apparatus 300 to the object 302. The fastener 322 can comprise a shaft portion 324, a head portion 326, and a threaded portion 328 of the shaft portion 324.

In some implementations, the hole 320 in the bottom portion 308 (or alternatively the hole 318 in the top portion 306) can be a threaded hole that can have a threaded portion that can correspond to (e.g., match) the threaded portion 328 of the fastener 322 such that the threaded portion 328 of the fastener 322 can be inserted into through the hole 318 and into the hole 320 and the threaded portion 328 of the fastener 322 can engage the threaded portion of the hole 320 in the bottom portion 308 (or alternatively hole 318) of the apparatus 300, and the fastener 322 can be rotated in relation to the hole 320 (or alternatively hole 318) to cause the threaded portion 328 of the fastener 322 to move through the hole 320 (or alternatively hole 318). In some implementations, the apparatus 300 can be made (e.g., fabricated, constructed) of a plastic material and the hole 320 in the bottom portion (or alternatively the hole 318 in the top portion) can be a threaded hole formed by installing a threaded metal insert by means of an assembly process such as, for example, overmolding, thermal insertion, press fit, or ultrasonic insertion of the threaded metal insert into a through hole.

As the threaded portion 328 of the fastener 322 is rotated through the hole 320, the head portion 326 of the fastener 322 can thereby apply pressure on the top portion 306 of the apparatus 300, and the combination of the fastener 322 and the hole 320 also can apply pressure on the bottom portion 308 of the apparatus 300 via the threaded portion 328 of the fastener 322 being engaged with and rotated through the threaded hole 320 of the bottom portion 308 of the apparatus 300. This, in turn, can cause the respective edge portions 314 and 316 of the top and bottom portions 306 and 308 of the apparatus 300 to apply a desired corresponding amount of pressure on the respective grooves (e.g., grooved regions) of the top and bottom surfaces of the casing of the object 302 to grip and hold the object 302 in the desired position with respect to the apparatus 300 and/or with respect to another object with which the object 302 is associated.

When the object 302 is being held by the apparatus 300, the object 302 can be adjusted (e.g., moved and/or rotated) with respect to the apparatus 300 (or vice versa) to accommodate different angular positions with respect to the apparatus 300. For instance, the groove (not shown in FIG. 3) on the top surface of the object 302 and groove 312 on the bottom surface of the object 102 can be angled in the form of a partial (e.g., half) moon or semi-circle shape, and the edge portions 314 and 316 of the apparatus 300 can be correspondingly angled in the form of a partial moon or semi-circle shape. The object 302 can be moved, slid, or rotated in relation to the interface between the grooves of the object 302 to adjust the position of the object 302 with respect to the apparatus 300 to achieve a desired position of the object 302 with respect to the apparatus and/or another object. The fastener 322 can be tightened to fix the position of the object 302 with respect to the apparatus 300.

The apparatus 300 also can comprise a desired number of holes, such as hole 330 and hole 332, that can be formed in the base portion 306 of the apparatus 300. The holes 330 and 332 can be used to facilitate fastening the apparatus 300 to a desired surface (e.g., wall, panel, floor, or other type of surface), wherein fasteners, such as a screw, a nail, or another type of fastener, can be inserted into the holes 330 and 332, and the fasteners can be attached to (e.g., screwed into, nailed into) the desired surface to attach the apparatus 300 to the desired surface.

In some implementations, the holes 330 and 332 in the base portion 304 can be threaded holes. In some other implementations, the apparatus 300 can be made of a plastic material and the threaded holes 330 and 332 can be formed by installing a threaded metal insert by means of an assembly process such as, for example, overmolding, thermal insertion, press fit, self-threaded or ultrasonic insertion of the threaded metal insert into a through hole. In another embodiment, the holes 330 and 332 in the base portion can be in the form of an elongated slot. The slots can be oriented in such a manner so as to provide adjustment of the position of the apparatus 300 in a lateral and/or longitudinal direction.

Figure 4A:
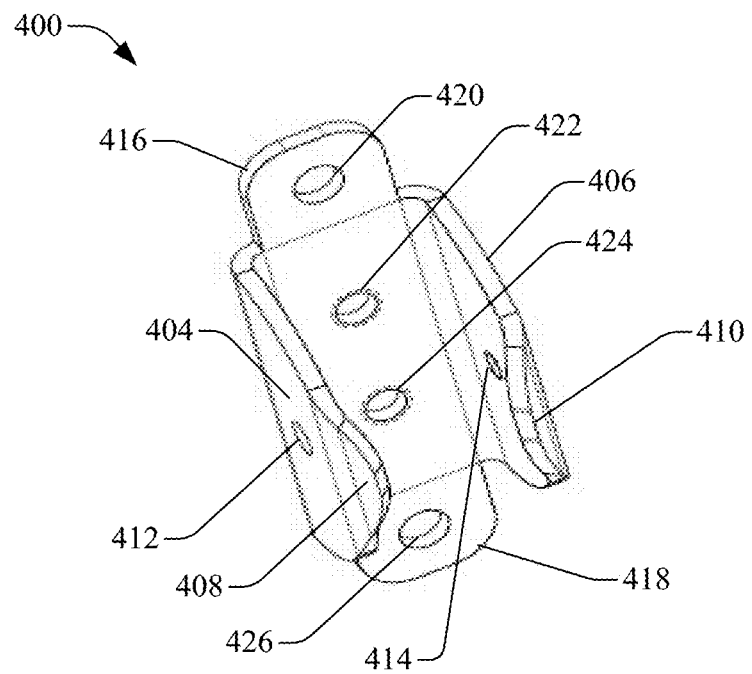
FIGS. 4A and 4B depict diagram of respective views of an apparatus that can be employed to efficiently hold or fasten an object in a desired position or place, in accordance with various aspects and embodiments of the disclosed subject matter.
Figure 4B:
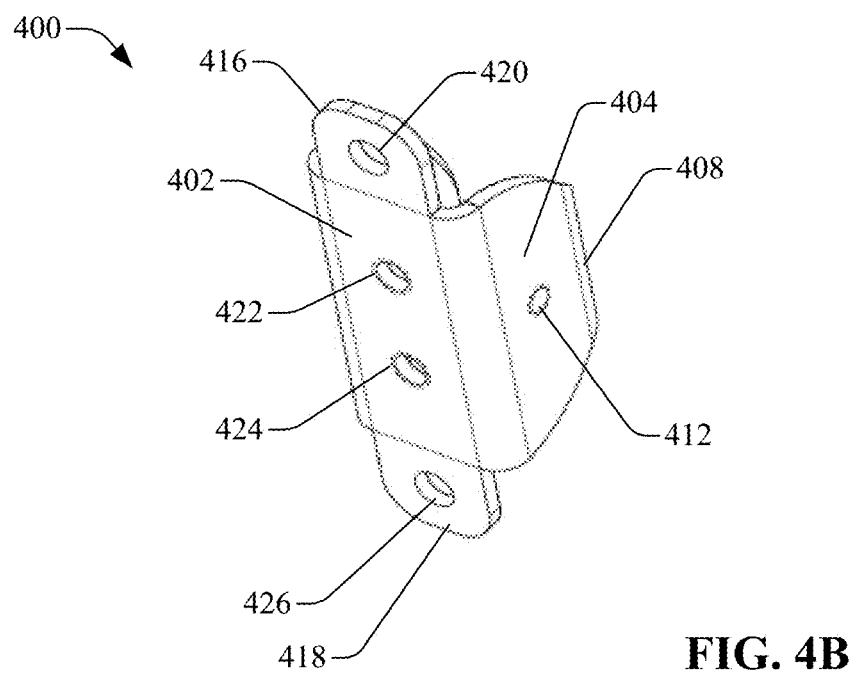

FIGS. 4A and 4B depict diagrams of views of still another apparatus 400 that can be employed to efficiently hold or fasten an object in a desired position or place, in accordance with various aspects and embodiments of the disclosed subject matter. The apparatus 400 can be a single-piece bracket (e.g., dovetail clamping bracket) that can be employed to clamp down on, hold, or fasten an object (e.g., object 102, such as is shown in FIGS. 1A, 1B, and 1D; not shown in FIGS. 4A and 4B) in a desired position or place with respect to the apparatus 400 and/or another object. The object can be, for example, a sensor device, a light device, a camera or other capture (e.g., video or audio capture) device, a measurement device, or other type of device or object. The apparatus 400 can be formed or fabricated as one piece of uniform or at least substantially uniform thickness using a desired material(s), such as metal (e.g. steel, stainless steel, aluminum, spring-tempered brass, or titanium) or plastic (e.g. PBT, PEEK, polyetherimide, or polyphenylsulfone), for example.

The apparatus 400 can be substantially the same as (e.g., can comprise substantially the same features as) apparatus 100, as described with respect to FIGS. 1A-1D and 2A-2B, apparatus 300, as described with respect to FIG. 3, except, for example, as described herein with regard to FIG. 4. For instance, the apparatus 400 can comprise a base portion 402, top portion 404, and bottom portion 406. The object can comprise grooves (e.g., grooves 110 and 112, as depicted in FIGS. 1A, 1B, and 1D) that can be formed on the top and bottom surfaces of the casing of the object, respectively. Furthermore, the object also can comprise a dovetail that can be formed on one of the surfaces of the casing of the object. The apparatus 400 also can comprise an edge portion 408 (e.g., top edge portion), an edge portion 410 (e.g., a bottom edge portion), hole 412 formed in the top portion 404, hole 414 formed in the bottom portion 406. A fastener (e.g., fastener 122, as shown in FIGS. 1A-1D; not shown in FIGS. 4A-4B) can be employed to fasten the apparatus 400 to the object. The fastener can comprise a shaft portion, a head portion, and a threaded portion of the shaft portion.

In some implementations, the base portion 402 can comprise extended portions 416 and 418 (e.g., ear portions) that can extend beyond the top portion 404 and bottom portion 406 by a desired defined length. The base portion 402 can comprise a desired number of holes, such as holes, 420, 422, 424, and 426, wherein hole 420 can be formed in one extended portion 416 of the base portion 402, holes 422 and 424 can be formed in the part of the base portion 402 that is connected to or integrated with the top portion 404 and bottom portion 406, and hole 426 can be formed in the other extended portion 418 of the base portion 402. The extended portions 416 and 418, and associated holes 420 and 426, can be employed to facilitate mounting the apparatus 400 to a desired wall, panel, floor, or other surface. For instance, it may be desirable to mount the apparatus 400 to a desired surface after the object has been clamped into the apparatus 400. In such instance, it may be difficult or impossible to insert fasteners into the holes 422 and 424 in the main body of the base portion 402 to attach the apparatus 400 and clamped object to the desired surface. The fasteners can instead be inserted through the holes 420 and 426 formed in the extended portions 416 and 418 of the base portion 402 and into the desired surface to fasten the apparatus 400 to the desired surface. It is to be appreciated and understood that there can be other reasons why it can be desirable to mount the apparatus 400 using the holes 420 and 426 formed in the extended portions 416 and 418 of the base portion 402 instead of, or in addition to, the holes 422 and 424 formed in the main body of the base portion 402 of the apparatus 400. In some implementations, the holes 420 and 426 in the extended portions 416 and 418 respectively can be in the form of an elongated or breakthrough slot. The slots can be oriented in such a manner so as to provide adjustment of the position of the apparatus 400 in a lateral and/or longitudinal direction.

Figure 5A:
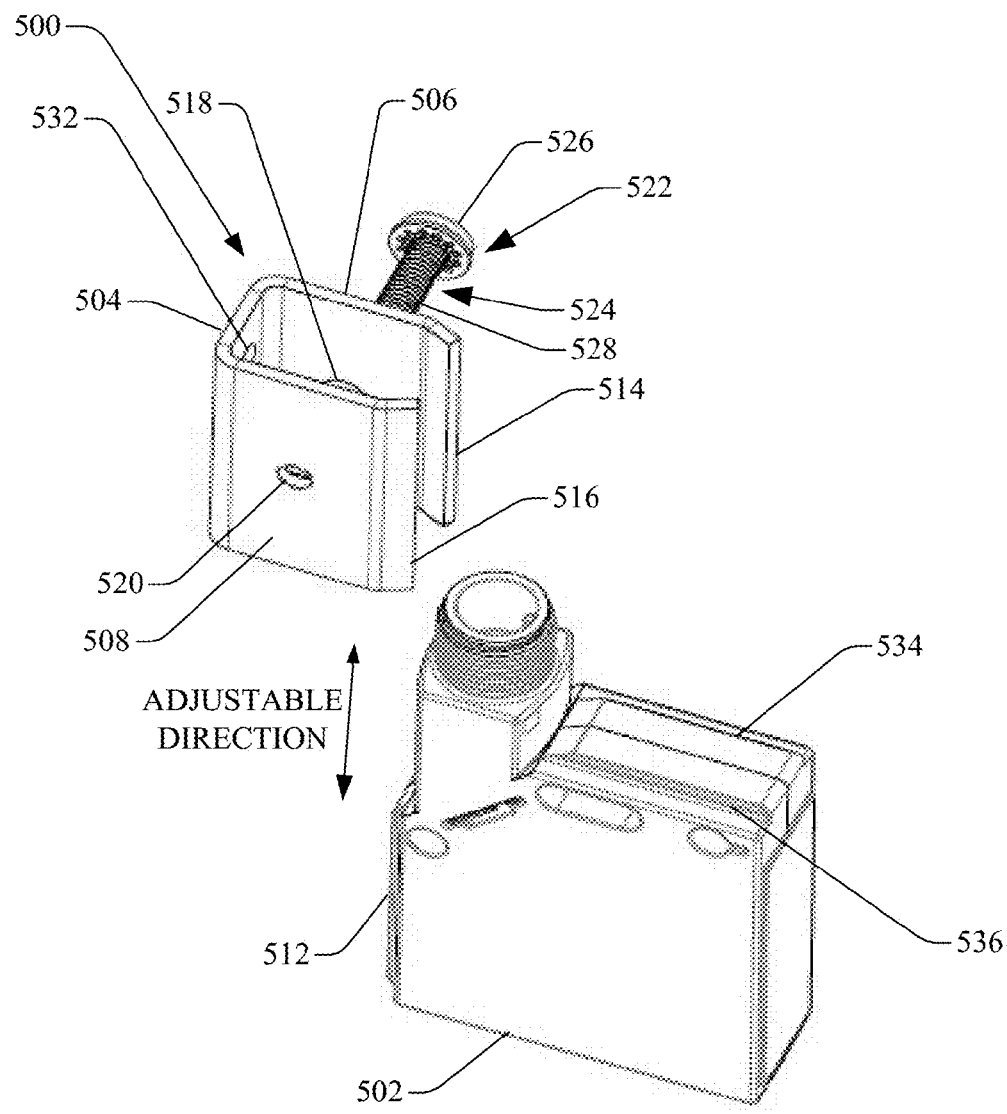
FIGS. 5A, 5B, and 5C present diagrams of various views of another example apparatus that can be employed to efficiently hold or fasten an object in a desired position or place, in accordance with various aspects and embodiments of the disclosed subject matter.
Figure 5B:
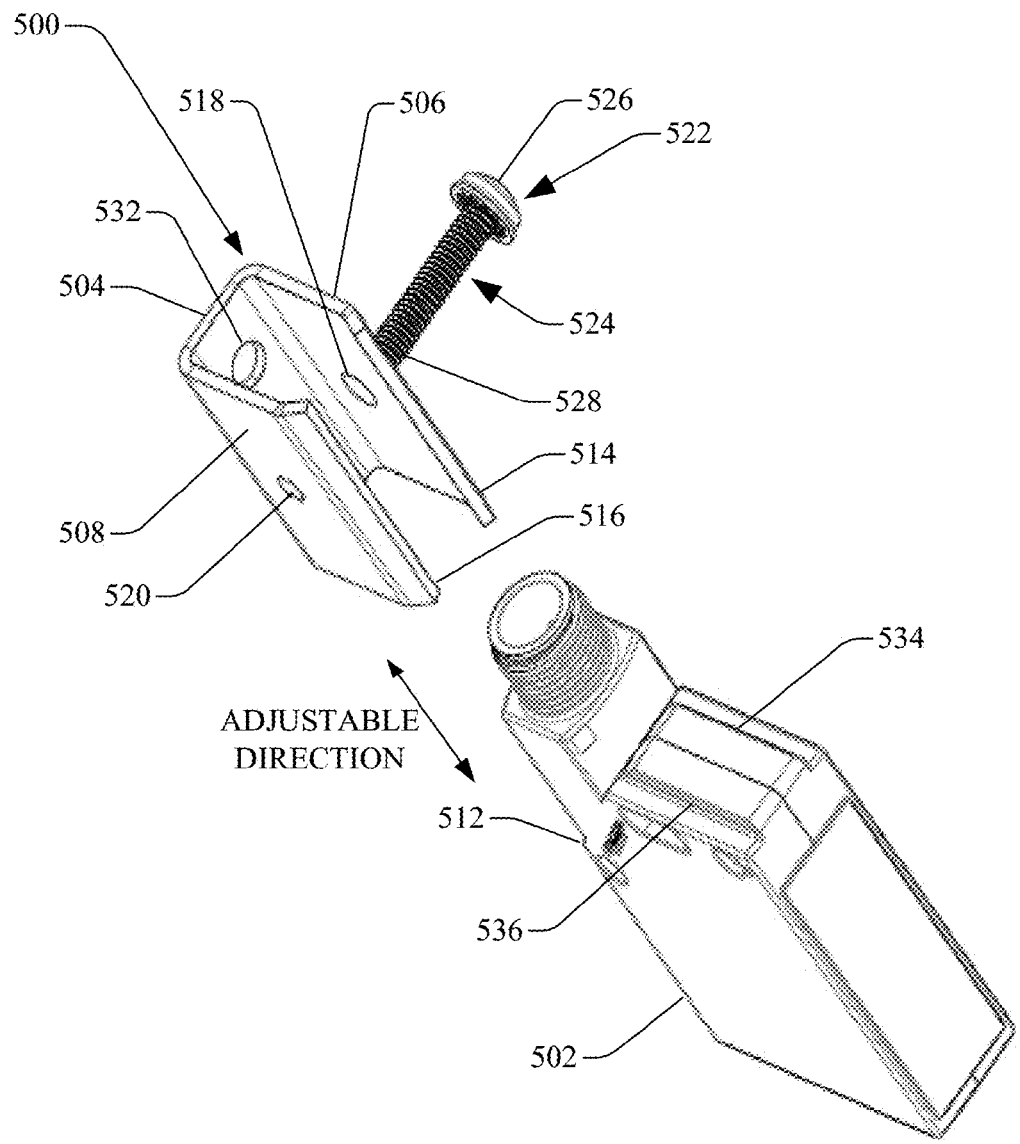
Figure 5C:
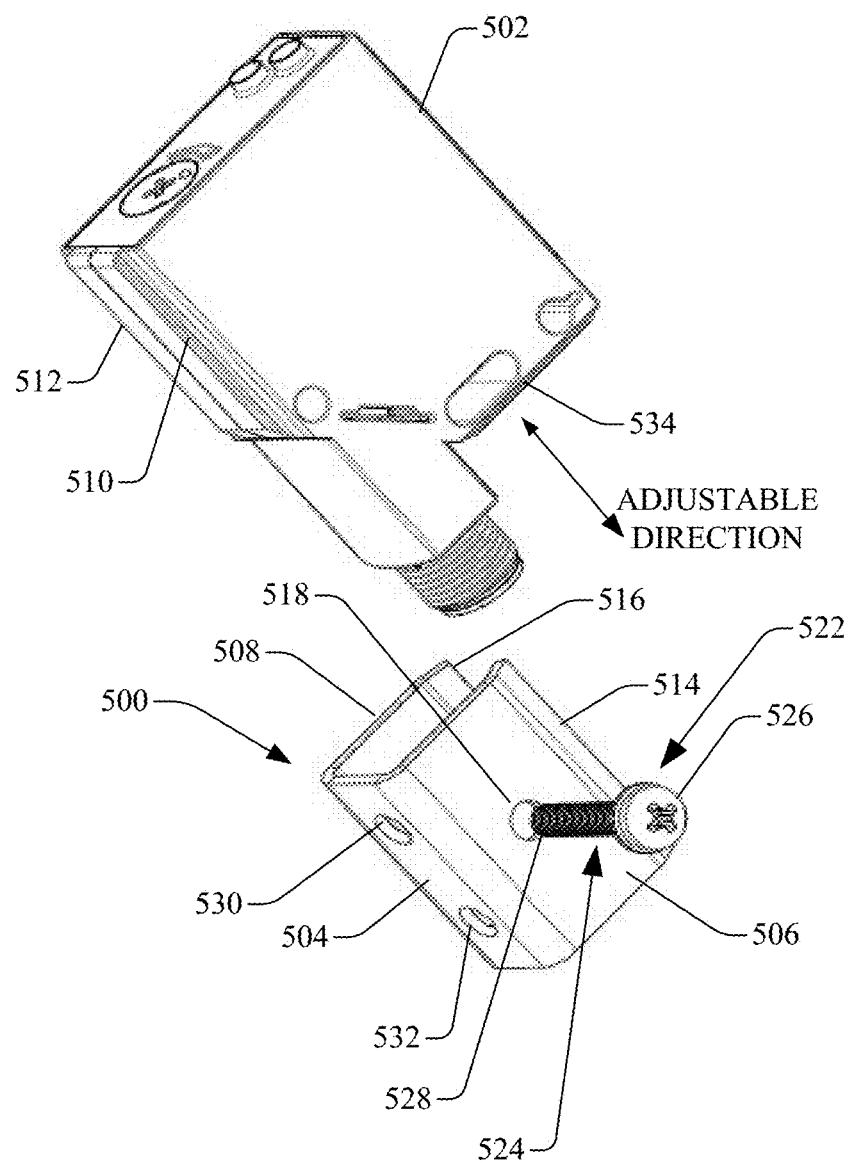

FIGS. 5A, 5B, and 5C present diagrams of various views of another example apparatus 500 that can be employed to efficiently hold or fasten an object in a desired position or place, in accordance with various aspects and embodiments of the disclosed subject matter. The apparatus 500 can be a single-piece bracket (e.g., dovetail clamping bracket) that can be employed to clamp down on, hold, or fasten an object 502 (e.g., a sensor) in a desired position or place with respect to the apparatus 500 and/or another object. The apparatus 500 can be formed or fabricated as one piece of uniform or at least substantially uniform thickness using a desired material(s), such as metal (e.g. steel, stainless steel, aluminum, spring-tempered brass, or titanium) or plastic (e.g. PBT, PEEK, polyetherimide, or polyphenylsulfone), for example.

The apparatus 500 can be substantially the same as (e.g., can comprise substantially the same features as) apparatus 100, as described with respect to FIGS. 1A-1D, 2A-2B, 3, and 4, except, for example, as described herein with regard to FIG. 5. For instance, the apparatus 500 can comprise a base portion 504, top portion 506, and bottom portion 508. The object 502 can comprise grooves 510 and 512 (e.g., recessed portions or regions) that can be formed on the top and bottom surfaces of a side of the casing of the object 502, respectively. The grooves 510 and 512, which can form a dovetail, can be formed in a straight line, as opposed to being in the shape of a partial (e.g., half) moon or semi-circle, along one side (e.g., at least one side) of the casing of the object 502, and can have a desired groove depth and shape, and can have a desired defined length that can extend all or a portion of the length of the side of the casing of the object 500.

The apparatus 500 also can comprise an edge portion 514 (e.g., top edge portion) on the top portion 506 and an edge portion 516 (e.g., a bottom edge portion) on the bottom portion 508. The edge portion 514 and edge portion 516 of the apparatus 500 (e.g., dovetail clamping bracket) can be formed to have a shape, size, and/or orientation that can correspond to and complement the grooves 510 and 512, which can form a dovetail, that can be formed in or on the casing of the object 502 with respect to shape, depth, width, angle, and/or other factors. For instance, the edge portion 514 and edge portion 516 can be shaped to be straight or at least substantially straight, instead of being curved in the shape of a partial moon or semi-circle (e.g., as in FIGS. 1A-1D), to correspond to and complement the straight grooves 510 and 512 of the object 502. The edge portion 514 and edge portion 516 also can be bent or angled at a desired angle (e.g., angled in respective directions toward the grooves 510 and 512 when the object 502 is in proximity to the open space at the open end of the apparatus 500), such that the respective edges of edge portion 514 and edge portion 516 can desirably fit into the respective grooves 510 and 512, which can be shaped to complementary match the respective edges of edge portion 514 and edge portion 516.

The top portion 506 of the apparatus 500 can have a hole 518 (e.g., through or clearance hole) formed in a desired location on the top portion 506. The bottom portion 508 of the apparatus 500 can have a hole 520 formed in a desired location on the bottom portion 508, wherein the holes 518 and 520 can be aligned with each other to enable a fastener 522 to be inserted through holes 518 and 520, and wherein the hole 520 can be a threaded hole. The fastener 522 can comprise a shaft portion 524 of a desired defined length that is sufficient to pass through the holes 518 and 520, a head portion 526, and a threaded portion 528 of the shaft portion 524.

The apparatus 500 can have holes 530 and 532 formed in the base portion 504 to facilitate mounting of the apparatus 500 on a desired surface. Fasteners (not shown) can be inserted through the holes 530 and 532 and into the desired surface to attach or mount the apparatus to or on the desired surface.

In some implementations, the object 502 can comprise additional grooves, such as groove 534 and groove 536, which can form a dovetail, that can be formed on another side of the object 502 (e.g., formed on another side that is adjacent to (or opposite) the side of the object 502 that has grooves 510 and 512). The edge portion 514 and edge portion 516 can be clamped onto groove 510 and groove 512, respectively, or alternatively, can be clamped onto groove 534 and groove 536, respectively, to facilitate holding the object 502 in a desired position or place with respect to the apparatus 500 and/or another object.

When the object 502 is being held by the apparatus 500, the object 502 can be adjusted (e.g., moved and/or translated) with respect to the apparatus 500 (or vice versa) to accommodate different positions with respect to the apparatus 500. For instance, the object 502 can be moved, translated, or slid in relation to the interface between the grooves 510 and 512 of the casing of the object 502 and the edge portions 514 and 516, respectively, of the apparatus 500 to adjust the position of the object 502 with respect to the apparatus 500 to a desired position, or alternatively, the object 502 can be moved, translated, or slid in relation to the interface between the grooves 534 and 536 of the casing of the object 502 and the edge portions 514 and 516, respectively, of the apparatus 500 to adjust the position of the object 502 with respect to the apparatus 500 to a desired position. The fastener 522 can be tightened (e.g., when the object 502 is in a desired position with respect to the apparatus 500) to fix the position of the object 502 with respect to the apparatus 500.

In some instances, even if during installation it is possible to achieve a specific desired position, it often may not be possible or sufficiently easy for the person doing the installing (or other persons) to determine whether the desired position has been achieved. Therefore, in some implementations, graduated markings or other indicators (not shown in FIGS. 5A-5C) can be printed, laser etched, engraved, formed, or applied, via an adhesive-backed label, to the top portion 506 (and/or alternatively to bottom portion 508) to provide an indication of the linear position range (e.g. ±10 mm, ±25 mm, or ±1 inch, etc.) that the apparatus 500 can accommodate for adjusting the relative position of the object 502 with respect to the apparatus 500 when the apparatus 500 is fixed to a desired mounting surface.

Figure 6A:
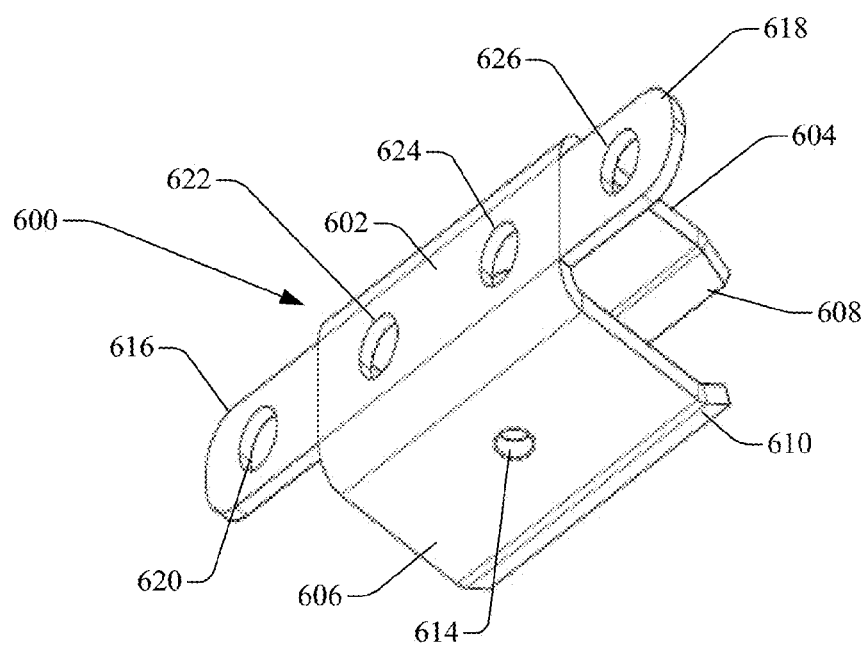
FIGS. 6A and 6B illustrate diagrams of respective views of another example apparatus that can be employed to efficiently hold or fasten an object in a desired position or place and can include extended portions that can facilitate mounting of the apparatus, in accordance with various aspects and embodiments of the disclosed subject matter.
Figure 6B:
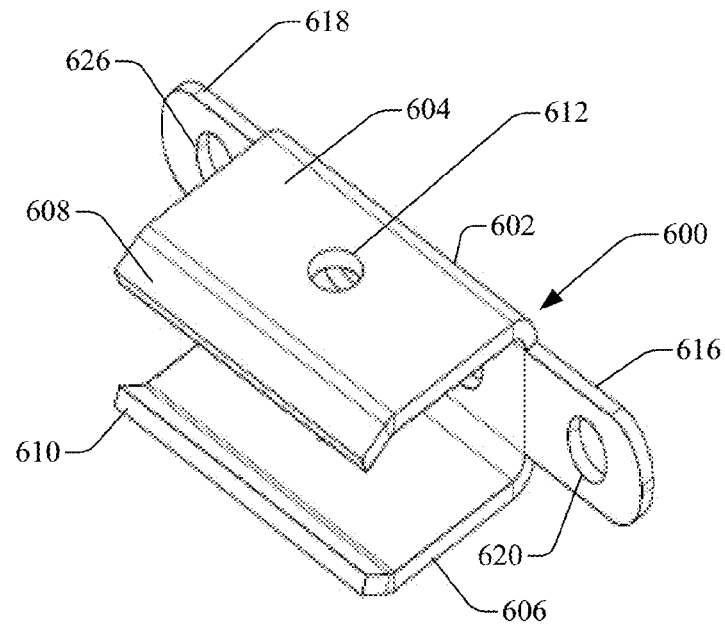

FIGS. 6A and 6B illustrate diagrams of respective views of another example apparatus that can be employed to efficiently hold or fasten an object in a desired position or place and can include extended portions that can facilitate mounting of the apparatus, in accordance with various aspects and embodiments of the disclosed subject matter. The apparatus 600 can be a single-piece bracket (e.g., dovetail clamping bracket) that can be employed to clamp down on, hold, or fasten an object (e.g., a sensor) (not shown in FIG. 6) in a desired position or place with respect to the apparatus 600 and/or another object. The apparatus 600 can be formed or fabricated as one piece of uniform or at least substantially uniform thickness using a desired material(s), such as metal (e.g. steel, stainless steel, aluminum, spring-tempered brass, or titanium) or plastic (e.g. PBT, PEEK, polyetherimide, or polyphenylsulfone), for example.

The apparatus 600 can be substantially the same as (e.g., can comprise substantially the same features as) apparatus 100, as described with respect to FIGS. 1A-1D and 2A-2B, apparatus 300, as described with regard to FIG. 3, apparatus 400, as described with respect to FIGS. 4A-4B, and apparatus 500, as described with regard to FIGS. 5A-5C, except, for example, as described herein with regard to FIG. 6. For instance, the apparatus 600 can comprise a base portion 602, top portion 604, and bottom portion 606. The apparatus 600 also can comprise an edge portion 608 (e.g., top edge portion) on the top portion 604 and an edge portion 610 (e.g., a bottom edge portion) on the bottom portion 606. The edge portion 608 and edge portion 610 of the apparatus 600 can be formed to have a shape, size, and/or orientation that can correspond to and complement the grooves (e.g., grooves 510 and 512, and/or grooves 534 and 536) formed in or on the casing of the object (e.g., object 502) with respect to shape, depth, width, angle, and/or other factors. For instance, the edge portion 608 and edge portion 610 can be shaped to be straight or at least substantially straight, instead of being curved in the shape of a partial moon or semi-circle, to correspond to and complement the straight grooves and of the object (e.g., 502). The edge portion 608 and edge portion 610 also can be bent or angled at a desired angle (e.g., angled in respective directions toward the grooves of the object when the object is in proximity to the open space at the open end of the apparatus 600), such that the respective edges of edge portion 608 and edge portion 610 can desirably fit into the respective grooves of the object, which can be shaped to complementary match the respective edges of edge portion 608 and edge portion 610.

The top portion 604 of the apparatus 600 can have a hole 612 (e.g., through or clearance hole) formed in a desired location on the top portion 604. The bottom portion 606 of the apparatus 600 can have a hole 614 formed in a desired location on the bottom portion 606, wherein the holes 612 and 614 can be aligned with each other to enable a fastener (not shown in FIG. 6) to be inserted through holes 612 and 614, and wherein the hole 614 can be a threaded hole. The fastener can comprise a shaft portion of a desired defined length that is sufficient to pass through the holes 612 and 614, a head portion, and a threaded portion of the shaft portion.

In some implementations, the base portion 602 can comprise extended portions 616 and 618 (e.g., ear portions) that can extend beyond the top portion 604 and bottom portion 606 by a desired defined length. The base portion 602 can comprise a desired number of holes, such as holes, 620, 622, 624, and 626, wherein hole 620 can be formed in one extended portion 616 of the base portion 602, holes 622 and 624 can be formed in the part of the base portion 602 that is connected to or integrated with the top portion 604 and bottom portion 606, and hole 626 can be formed in the other extended portion 618 of the base portion 602. The extended portions 616 and 618, and associated holes 620 and 626, can be employed to facilitate mounting the apparatus 600 to a desired surface (e.g., wall, panel, floor). For instance, it may be desirable to mount the apparatus 600 to a desired surface after the object has been clamped into the apparatus 600. In such instance, it may be difficult or impossible to insert fasteners into the holes 622 and 624 in the main body of the base portion 602 to attach the apparatus 600 and clamped object to the desired surface. The fasteners can instead be inserted through the holes 620 and 626 formed in the extended portions 616 and 618 of the base portion 602 and into the desired surface to fasten the apparatus 600 to the desired surface. It is to be appreciated and understood that there can be other reasons why it can be desirable to mount the apparatus 600 using the holes 620 and 626 formed in the extended portions 616 and 618 of the base portion 602 instead of, or in addition to, the holes 622 and 624 formed in the main body of the base portion 602 of the apparatus 600.

Figure 7A:
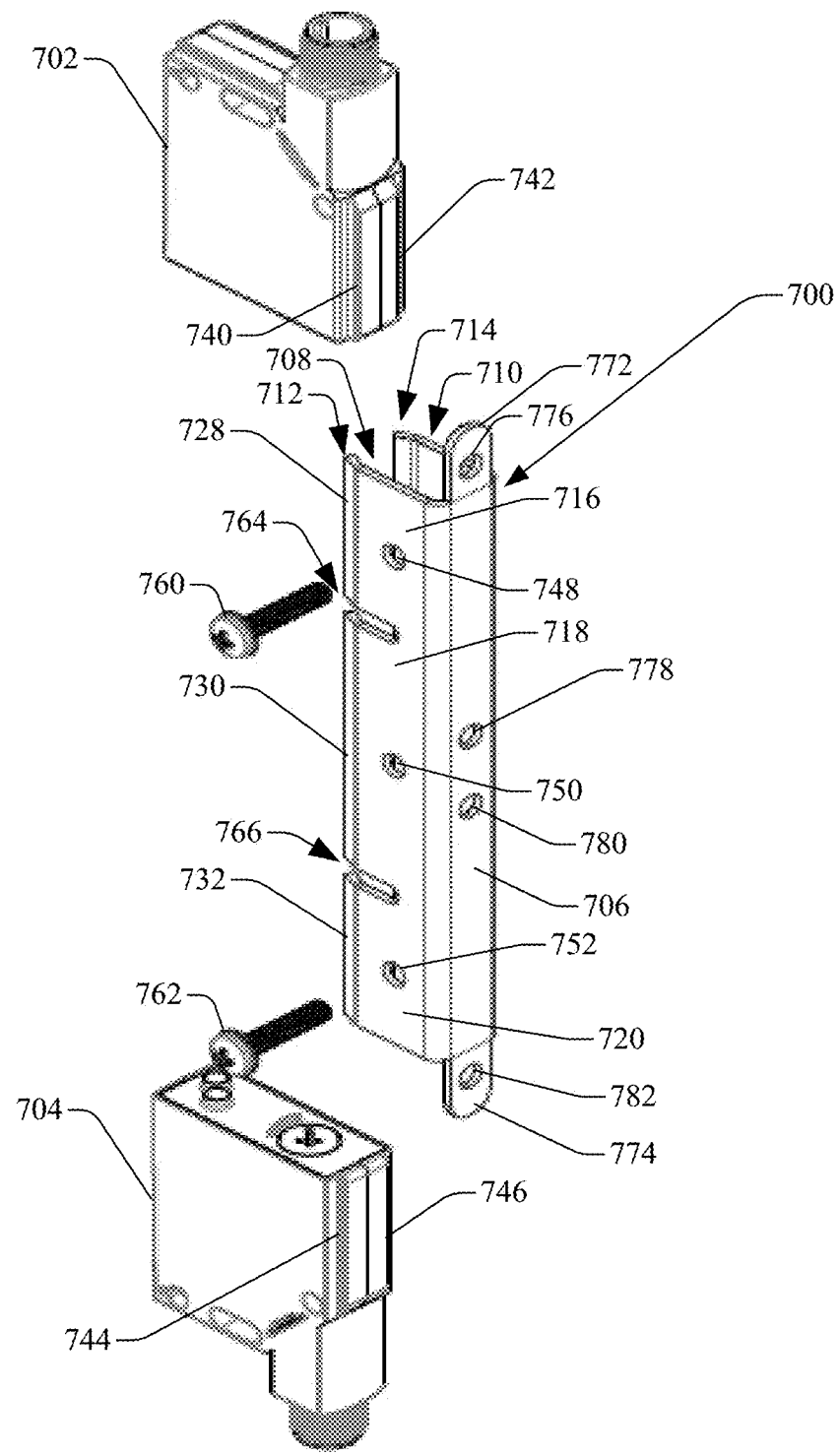
FIGS. 7A, 7B, and 7C depict diagrams of respective views of an example apparatus that can be elongated to efficiently hold or fasten multiple objects in respectively desired positions or places, in accordance with various aspects and embodiments of the disclosed subject matter.
Figure 7B:
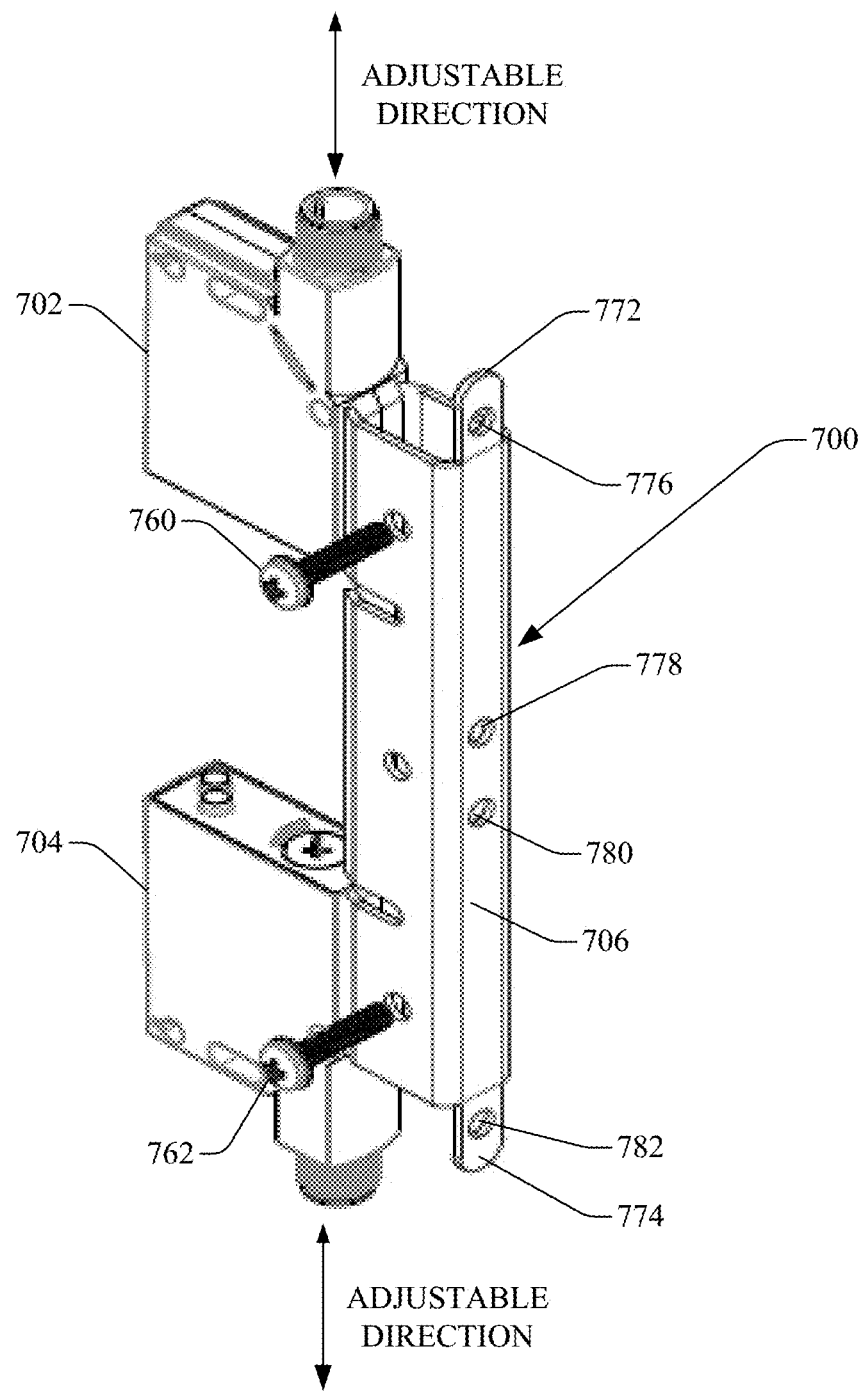
Figure 7C:
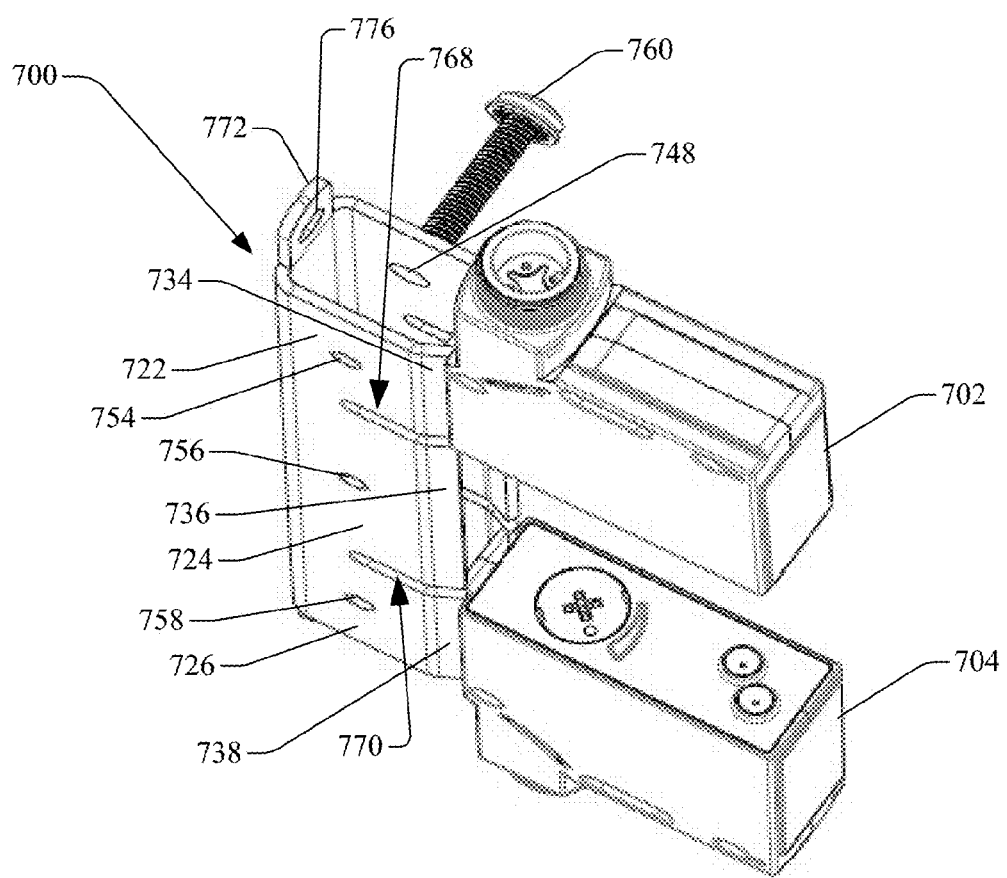

FIGS. 7A, 7B, and 7C depict diagrams of respective views of an example apparatus 700 that can be elongated to efficiently hold or fasten multiple objects in respectively desired positions or places, in accordance with various aspects and embodiments of the disclosed subject matter. The apparatus 700 can be a single-piece bracket (e.g., dovetail clamping bracket) that can be employed to clamp down on, hold, or fasten one or more objects (e.g., a sensor) in a desired position or place with respect to the apparatus 700 and/or another object(s). For instance, the apparatus 700 can be employed to clamp down on, hold, or fasten object 702 and object 704, wherein the apparatus 700 can be elongated, relative to brackets that can hold one object, to enable the apparatus 700 to hold more than one object. The apparatus 700 can be formed or fabricated as one piece of uniform or at least substantially uniform thickness using a desired material(s), such as metal (e.g. steel, stainless steel, aluminum, spring-tempered brass, or titanium) or plastic (e.g. PBT, PEEK, polyetherimide, or polyphenylsulfone), for example.

The apparatus 700 can comprise all or at least some of the features of the other apparatuses described herein, except, for example, as described herein with regard to FIG. 7. For instance, the apparatus 700 can comprise a base portion 706, top portion 708, and bottom portion 710. The apparatus 700 also can comprise an edge portion 712 (e.g., top edge portion) on the top portion 708 and an edge portion 714 (e.g., a bottom edge portion) on the bottom portion 710.

The length of the apparatus 700 can be sufficiently large enough to enable the apparatus 700 to hold more than one object, such as at least object 702 and object 704, wherein length of the apparatus 700 can be based at least in part on the size (e.g., length or width) of the respective objects. As depicted in FIG. 7, the apparatus 700 can be used to clamp on and hold at least three objects. For instance, top portion 708 can comprise a first (e.g., left) top portion 716, a second (e.g., middle) top portion 718, and a third (e.g., right) top portion 720; and the bottom portion 710 can comprise a first (e.g., left) bottom portion 722, a second (e.g., middle) bottom portion 724, and a third (e.g., right) bottom portion 726.

The first top portion 716 can comprise a first top edge portion 728 (as part on the edge portion 712), the second top portion 718 can comprise a second top edge portion 730 (as part on the edge portion 712), and the third top portion 720 can comprise a third top edge portion 732 (as part on the edge portion 712); and the first bottom portion 722 can comprise a first bottom edge portion 734 (as part on the edge portion 714), the second bottom portion 724 can comprise a second bottom edge portion 736 (as part on the edge portion 714), and the third bottom portion 726 can comprise a third bottom edge portion 738 (as part on the edge portion 714). The first top edge portion 728 and the first bottom edge portion 734 can be employed (e.g., as part of a first clamping portion of the apparatus 700) to clamp down on, hold, or fasten a first object 702 therebetween; the second top edge portion 730 and the second bottom edge portion 736 can be employed (e.g., as part of a second clamping portion of the apparatus 700) to clamp down on, hold, or fasten another object (not shown in FIG. 7) therebetween; and the third top edge portion 732 and the third bottom edge portion 738 can be employed (e.g., as part of a third clamping portion of the apparatus 700) to clamp down on, hold, or fasten a third object 704 therebetween.

The respective edge portions (e.g., 728, 730, 732, 734, 736, 738) of the apparatus 700 can be formed to have a shape, size, and/or orientation that can correspond to and complement the respective grooves (e.g., 740, 742, 744, 746) formed in or on the casing of the respective objects (e.g., object 702, object 704) with respect to shape, depth, width, angle, and/or other factors.

For instance, the respective edge portions (e.g., 728, 730, 732, 734, 736, 738) of the apparatus 700 can be shaped to be straight or at least substantially straight to correspond to and complement the respective straight grooves (e.g., 740, 742, 744, 746) of the objects (e.g., 702, 704) (as depicted in FIG. 7). The respective edge portions (e.g., 728, 730, 732, 734, 736, 738) also can be bent or angled at a desired angle (e.g., angled in a direction that reduces the open space at the open end of the apparatus 700), such that the respective edges of the respective edge portions (e.g., 728, 730, 732, 734, 736, 738) can desirably fit into the respective grooves (e.g., 740, 742, 744, 746) of the objects (e.g., 702, 704), which can be shaped to complementary match the respective edges of the respective edge portions (e.g., 728, 730, 732, 734, 736, 738) of the apparatus 700.

In other implementations, the respective grooves of the objects can be curved in the shape of a partial moon or semi-circle. In such implementations, the respective edge portions of the apparatus 700 can be correspondingly curved in the shape of a partial moon or semi-circle. When the respective edge portions of the apparatus are inserted into the respective grooves of the objects, and prior to clamping down the respective edge portions of the apparatus onto the respective grooves of the respective objects to hold the respective objects in the desired position(s), the respective objects can be moved, adjusted, or rotated along their respective grooves to a desired position(s) via the curved path (e.g., partial moon or semi-circle path) formed by the respective grooves of the apparatus being in the respective grooves of the respective objects.

The first top portion 716 can comprise a hole 748 formed in a desired location on the first top portion 716. The second top portion 718 can comprise a hole 750 formed in a desired location on the second top portion 718. The third top portion 720 can comprise a hole 752 formed in a desired location on the third top portion 720. The first bottom portion 722 can comprise a hole 754 formed in a desired location on the first bottom portion 722. The second bottom portion 724 can comprise a hole 756 formed in a desired location on the second bottom portion 724. The third bottom portion 726 can comprise a hole 758 formed in a desired location on the third bottom portion 726. In some implementations, the holes 754, 756, and 758 of the bottom portion 710 can be threaded holes that can be used with correspondingly threaded fasteners (e.g., screws) to facilitate clamping down the respective clamping portions of the apparatus 700 on the objects (e.g., 702, 704).

The location of the hole 748 on the first top portion 716 can be aligned with the location of the hole 754 on the first bottom portion 722 to enable a fastener 760 to be inserted through the hole 748 and hole 754. The location of the hole 750 on the second top portion 718 can be aligned with the location of the hole 756 on the second bottom portion 724 to enable a fastener (not shown in FIG. 7) to be inserted through the hole 750 and hole 756. The location of the hole 752 on the third top portion 720 can be aligned with the location of the hole 758 on the third bottom portion 726 to enable a fastener 762 to be inserted through the hole 752 and hole 758.

To facilitate forming the first top portion 716, second top portion 718, and third top portion 720, a slot 764 can be formed between, and to facilitate creating, the first top portion 716 and second top portion 718, and a slot 766 can be formed between, and to facilitate creating, the second top portion 718 and third top portion 720, wherein the slots 764 and 766 each can extend from the top edge portion 712 across the top portion 708 towards the base portion 706 up to a desired point on the top portion 708 (e.g., approximately halfway across the top portion 708 or more). To facilitate forming the first bottom portion 722, second bottom portion 724, and third bottom portion 726, a slot 768 can be formed between, and to facilitate creating, the first bottom portion 722 and second bottom portion 724, and a slot 770 can be formed between, and to facilitate creating, the second bottom portion 724 and third bottom portion 726, wherein the slots 768 and 770 each can extend from the bottom edge portion 714 across the bottom portion 710 towards the base portion 706 up to a desired point on the bottom portion 710 (e.g., approximately halfway across the bottom portion 710 or more).

The fasteners (e.g., 760, 762) (and threaded holes 754, 756, and 758) can function similar to the fasteners and threaded holes, as described herein, to clamp down the respective edge portions (e.g., 728 and 734, 730 and 736, and/or 732 and 738) of the first clamping portion, the second clamping portion, and/or the third clamping portion of the apparatus 700 on to the respective grooves (e.g., 740 and 744, and/or 742 and 746) of the respective objects (e.g., 702 and/or 704) to hold or fasten the respective objects in the desired position with respect to the respective clamping portions of the apparatus 700 and/or another object(s). In this manner, any object(s) assembled to any of a first clamping portion, second clamping portion, and/or third clamping portion of the apparatus 700 can be installed or removed (e.g. replaced) without having to remove, loosen, or unclamp any other object(s) assembled to (e.g., clamped and held by) the apparatus 700.

In some implementations, the slots 764, 766, 768, and 770 can have a width that can substantially correspond to or be larger than the length and/or height of the object (e.g. 702 and/or 704) to facilitate the installation and/or removal of another object (e.g. 702 or 704) in the second clamping portion of the apparatus 700 when the object 702 is assembled to the first clamping portion and the object 704 is assembled to the third clamping portion, without having to remove either object 702 or 704 to do so.

In some implementations, the base portion 706 can comprise extended portions 772 and 774 (e.g., ear portions) that can extend beyond the top portion 708 and bottom portion 710 by a desired defined length. The base portion 706 can comprise a desired number of holes, such as holes, 776, 778, 780, and 782, wherein hole 776 can be formed in one extended portion 772 of the base portion 706, holes 778 and 780 can be formed in the part of the base portion 706 that is connected to or integrated with the top portion 708 and bottom portion 710, and hole 782 can be formed in the other extended portion 774 of the base portion 706. The extended portions 772 and 774, and associated holes 776 and 782, can be employed to facilitate mounting the apparatus 700 to a desired wall, panel, floor, or other surface. For instance, it may be desirable to mount the apparatus 700 to a desired surface after object 702 and/or object 704 has been clamped into the apparatus 700. In such instance, it may be difficult to insert fasteners into the holes 778 and 780 in the main body of the base portion 706 to attach the apparatus 700 and clamped object(s) (e.g., 702 and/or 704) to the desired surface. The fasteners can instead be inserted through the holes 776 and 782 formed in the extended portions 772 and 774 of the base portion 706 and into the desired surface to fasten the apparatus 700 to the desired surface. It is to be appreciated and understood that there can be other reasons why it can be desirable to mount the apparatus 700 using the holes 776 and 782 formed in the extended portions 772 and 774 of the base portion 706 instead of, or in addition to, using the holes 778 and 780 formed in the main body of the base portion 706.

Figure 8A:
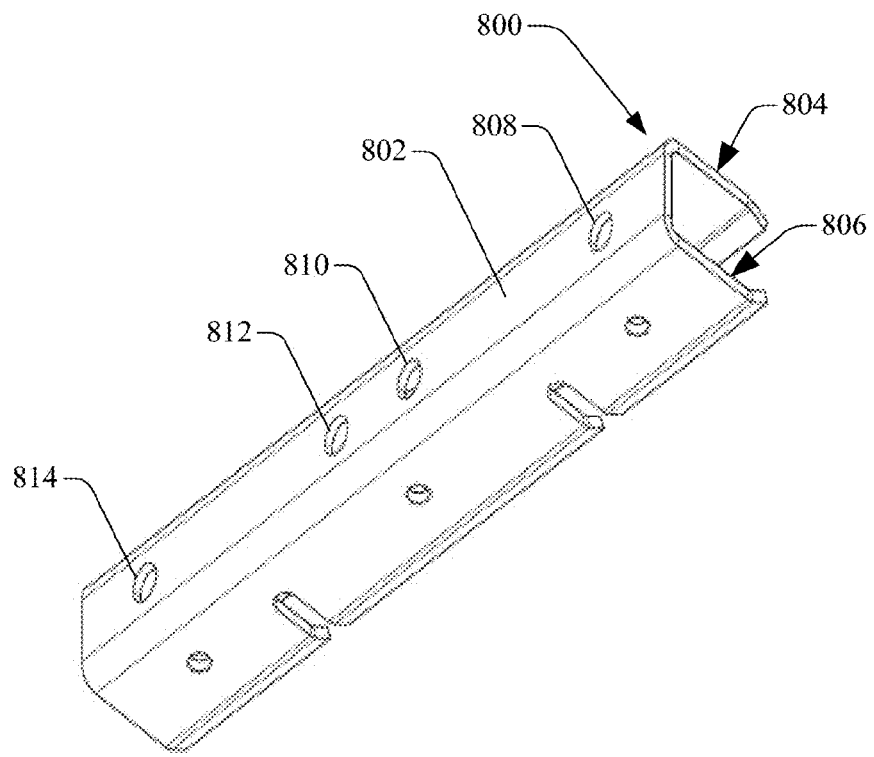
FIGS. 8A and 8B illustrate diagrams of respective views of another example apparatus that can be elongated to efficiently hold or fasten multiple objects in respectively desired positions or places, in accordance with various aspects and embodiments of the disclosed subject matter.
Figure 8B:
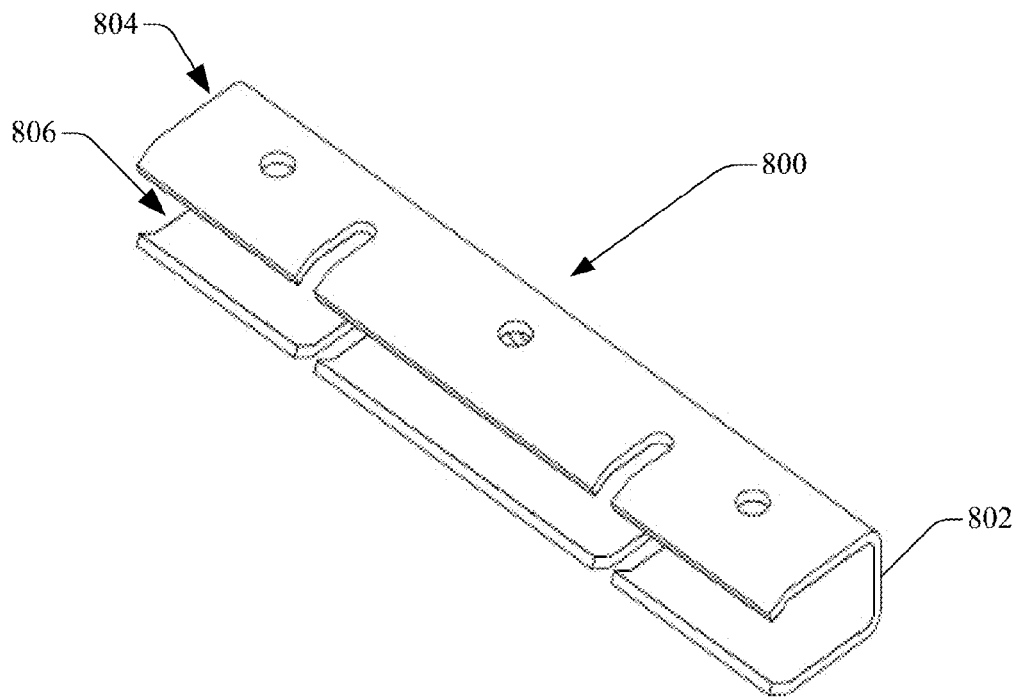
Figure 9A:
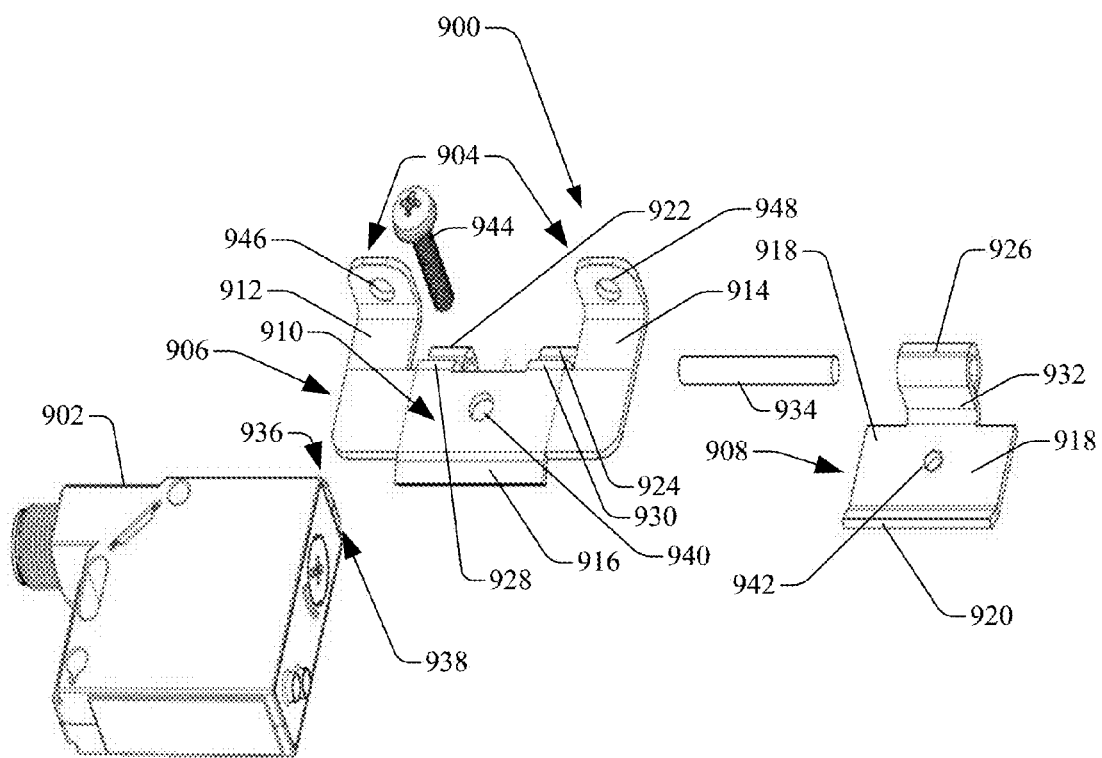
FIGS. 9A, 9B, 9C, and 9D illustrate diagrams of respective views of an example apparatus that can comprise multiple pieces and can be employed to efficiently hold or fasten an object in a desired position or place, in accordance with various aspects and embodiments of the disclosed subject matter.
Figure 9B:
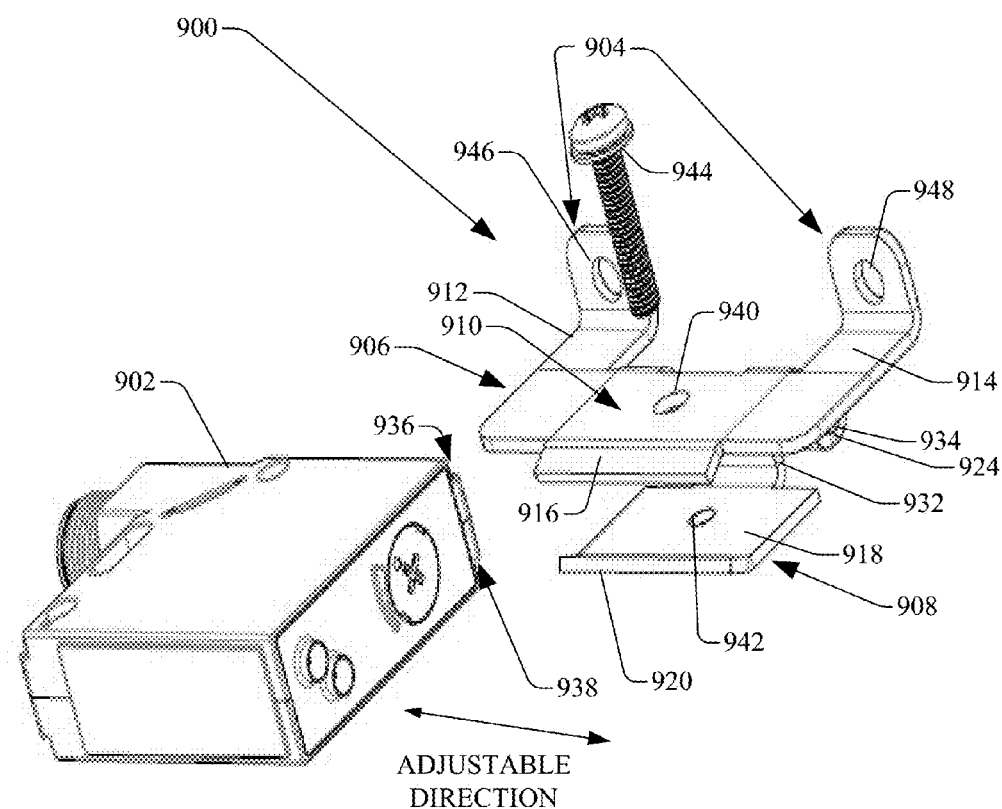
Figure 9C:
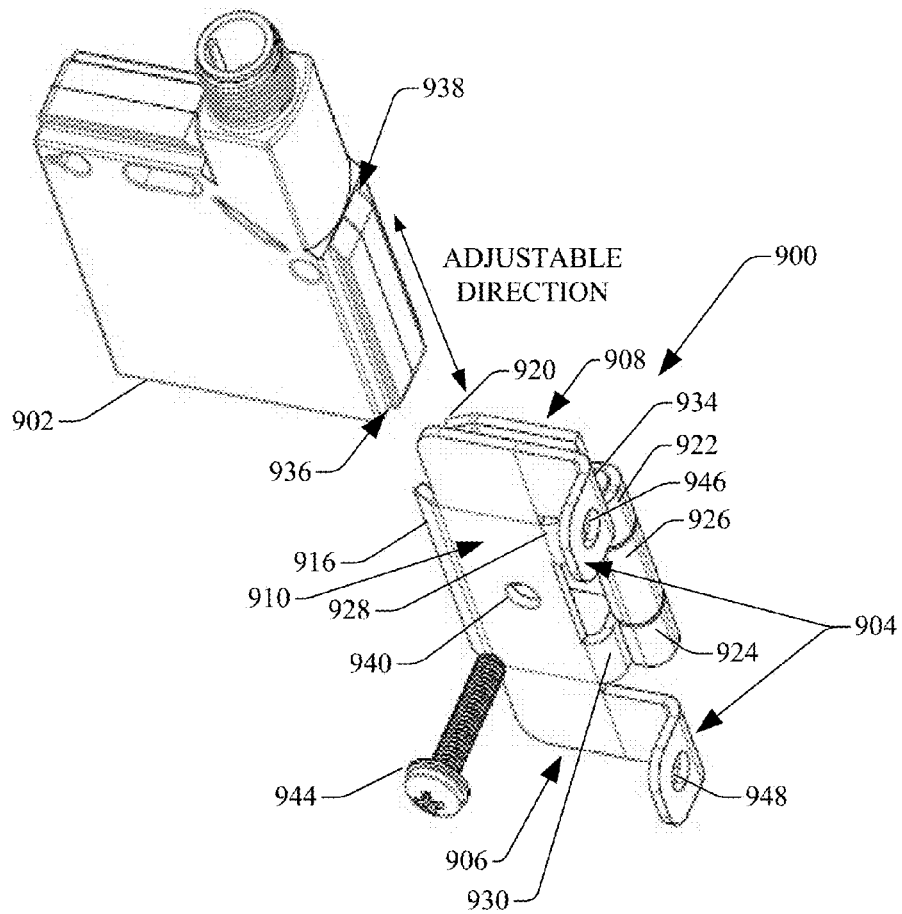
Figure 9D:
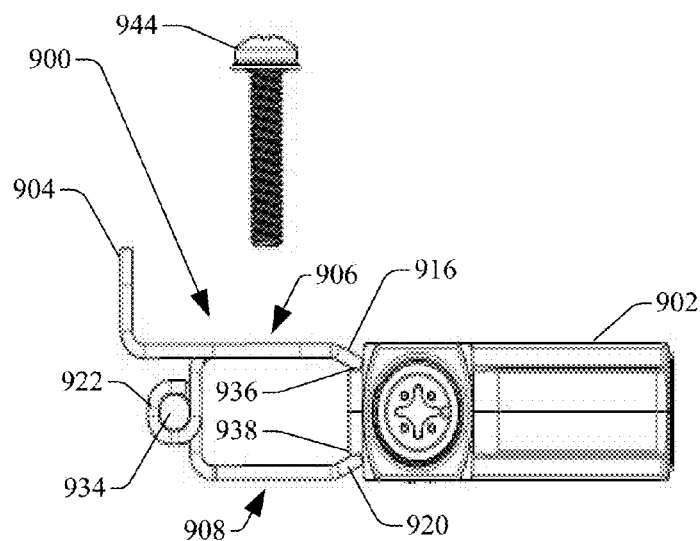

FIGS. 8A and 8B illustrate diagrams of respective views of another example apparatus 800 that can be elongated to efficiently hold or fasten multiple objects in respectively desired positions or places, in accordance with various aspects and embodiments of the disclosed subject matter. The apparatus 800 can be substantially the same as or similar to the apparatus 700 depicted in FIGS. 7A-7C (e.g., can comprise a first clamping portion, a second clamping portion, and a third clamping portion that can be employed to respectively and independently clamp down on and hold respective desired objects), except as described herein with regard to FIGS. 8A and 8B.

The apparatus 800 can comprise a base portion 802, a top portion 804 associated with (e.g., integrated with or connected to) the base portion 802 at the closed end of the apparatus 800, and a bottom portion 806 associated with the base portion 802 at the closed end of the apparatus 800. The base portion 802 can comprise holes (e.g., mounting holes), such as hole 808, hole 810, hole 812, and hole 814 that can be formed in desired locations in the base portion 802 of the apparatus 800. In contrast to the apparatus 700 of FIGS. 7A-7C, the apparatus 800 of FIGS. 8A-8B does not contain extended portions (e.g., ear portions) that extend beyond the top portion and bottom portion of the apparatus 800. The holes 808, 810, 812, and/or 814 can be used with fasteners (not shown in FIGS. 8A and 8B) to mount or attach the apparatus 800 to a desired surface, as described herein with regard to the other apparatuses described herein.

FIGS. 9A, 9B, 9C, and 9D illustrate diagrams of respective views of an example apparatus 900 that can comprise multiple pieces and can be employed to efficiently hold or fasten an object in a desired position or place, in accordance with various aspects and embodiments of the disclosed subject matter. The apparatus 900 can be a multiple-piece bracket (e.g., multiple-piece dovetail clamping bracket) that can be employed to clamp down on, hold, or fasten an object 902 (e.g., a sensor) in a desired position or place with respect to the apparatus 900 and/or another object. The apparatus 900 can be formed or fabricated using a desired material(s), such as metal (e.g. steel, stainless steel, aluminum, spring-tempered brass, or titanium) or plastic (e.g. PBT, PEEK, polyetherimide, or polyphenylsulfone), for example.

The apparatus 900 can comprise a base portion 904 that can be associated with a top portion 906 of the apparatus 900. For instance, the top portion 906 can be integrated with the base portion 904, wherein the top portion and the base portion 904 can be formed as a single piece using a desired material. The apparatus 900 also can comprise a bottom portion 908, wherein the bottom portion 908 can be formed as a single piece using a desired material.

The top portion 906 can comprise a main body portion 910 that can be substantially rectangular in shape (with regard to length and width) and can have a defined size (e.g., length, width, thickness). The top portion 906 also can comprise a first side portion 912 that can extend by a desired defined length from the main body portion 910 to a first part of the base portion 904 and a second side portion 914 that can extend by a desired defined length from the main body portion 910 to a second part of the base portion 904. The first side portion 912 and the second side portion 914 each can have a desired defined size (e.g., length, width, thickness).

The base portion 904 can be at a desired defined angle, such as 90 degrees or substantially close to 90 degrees (or another desired angle), with respect to the top portion 906. The base portion 904 can have a desired defined size (e.g., length, width, thickness). In some implementations, the width and thickness of each part of the base portion 904 can be the same or substantially the same as the width and thickness of the first side portion 912 and the second side portion 914. Each part of the base portion 904 can be substantially rectangular in shape, although, as desired, the corners of each part of the base portion 904 can be rounded or non-rounded (e.g., a standard rectangular edge).

The top portion 906 also can comprise a first (e.g., top) edge portion 916 that can extend out from at least part of the main body portion 910 of the top portion 906 by a desired defined length and can be angled or bent at a desired defined angle (e.g., 15 degrees, 30 degrees, 45 degrees, or other desired number of degrees) with respect to the main body portion 910 of the top portion 906, wherein such angling or bending can be downward towards the bottom portion 908, when the bottom portion 908 is connected to the top portion 906.

The bottom portion 908 can comprise a main body portion 918 that can be substantially rectangular in shape (with regard to length and width) and can have a defined size (e.g., length, width, thickness). The bottom portion 908 also can comprise a second (e.g., bottom) edge portion 920 that can extend out from the main body portion 918 of the bottom portion 908 by a desired defined length and can be angled or bent at a desired defined angle (e.g., 15 degrees, 30 degrees, 45 degrees, or other desired number of degrees) with respect to the main body portion 918 of the bottom portion 908, wherein such angling or bending can be upward towards the top portion 906, when the bottom portion 908 is connected to the top portion 906.

The apparatus 900 also can comprise a hinge, wherein the top portion 906 can comprise a first hinge portion 922 and a second hinge portion 924, and the bottom portion 908 can comprise a third hinge portion 926. The first hinge portion 922 and the second hinge portion 924 each can extend from a side of the main body portion 910 that is opposite to the first edge portion 916. The first hinge portion 922 can be adjacent or in proximity to the first side portion 912, and the second hinge portion 924 can be adjacent or in proximity to the second side portion 914.

To form the first hinge portion 922, the material of the top portion 906 that extends from the main body portion 910 can be formed or bent to form the first hinge portion 922 to be substantially circular with a substantially circular hole that can be defined by the inner surface of the substantially circular first hinge portion 922, wherein the substantially circular hole can have a desired defined radius and circumference. To form the second hinge portion 924, the material of the top portion 906 that extends from the main body portion 910 can be formed or bent to form the second hinge portion 924 to be substantially circular with a substantially circular hole that can be defined by the inner surface of the substantially circular second hinge portion 924, wherein the substantially circular hole can have a desired defined radius and circumference, wherein the size and shape of the first hinge portion 922 and the second hinge portion 924 can be the same or at least substantially the same, and wherein the hole of the first hinge portion 922 can be aligned or at least substantially aligned with the hole of the second hinge portion 924. When forming the first hinge portion 922 and the second hinge portion 924, the portion of the material of the top portion 906 that is used to form the first hinge portion 922 and the second hinge portion 924 can be bent downward such that they are bent downward towards the bottom portion 908 when the top portion 906 and bottom portion 908 are connected or hinged together, wherein the first hinge portion 922 and second hinge portion 924 can have an extension portion 928 and extension portion 930, respectively, that can be curved to angle downward at a desired angle, such as 90 degrees or substantially close to 90 degrees, with respect to the main body portion 910 and can extend from the main body portion 910 to the point where the first hinge portion 922 and the second hinge portion 924 are curved or bent to be in the substantially circular shape.

To form the third hinge portion 926, the material of the bottom portion 908 that extends from the main body portion 918 of the bottom portion 908 can be formed or bent to form the third hinge portion 926 to be substantially circular with a substantially circular hole that can be defined by the inner surface of the substantially circular third hinge portion 926, wherein the substantially circular hole can have a desired defined radius and circumference, wherein the size and shape of the substantially circular portion of the third hinge portion 926 can be the same or at least substantially the same as the substantially circular portions of the first hinge portion 922 and the second hinge portion 924, and wherein the hole of the third hinge portion 926 can be aligned or at least substantially aligned with the holes of the first hinge portion 922 and the second hinge portion 924. When forming the third hinge portion 926, the portion of the material of the bottom portion 908 that is used to form the third hinge portion 926 can be bent upward such that it is bent upward towards the top portion 906 when the top portion 906 and bottom portion 908 are connected or hinged together, wherein the third hinge portion 926 can have an extension portion 932 that can be curved to angle upward at a desired angle, such as 90 degrees or substantially close to 90 degrees, with respect to the main body portion 918 of the bottom portion 908 and can extend from the main body portion 918 to the point where the third hinge portion 926 is curved or bent to be in the substantially circular shape.

The apparatus 900 also can comprise a pin 934 that can have a desired defined size and shape that can correspond to the holes of the first hinge portion 922, second hinge portion 924, and third hinge portion 926. For instance, the pin 934 can be cylindrical in shape and can have a circumference or radius that can be substantially close to (e.g., almost as big as) the circumference and radius of the holes of the first hinge portion 922, second hinge portion 924, and third hinge portion 926 such that, when the third hinge 926 is inserted between the first hinge portion 922 and second hinge portion 924, the pin 934 is able to be inserted into the holes of the first hinge portion 922, second hinge portion 924, and third hinge portion 926, wherein the pin 934 can be sized and shaped in relation to the holes of the hinge portions 922, 924, and 926 so that the pin 934 fits within the holes tight enough to remain in the holes, but not so tight within the holes that it makes moving the top portion 906 and bottom portion 908 in relation to each other about the hinge undesirably difficult. The pin 934 can have a desired defined length such that it is long enough to extend through the holes of the first hinge portion 922, second hinge portion 924, and third hinge portion 926.

In some embodiments, the first (e.g., top) edge portion 916 of the top portion 906 and the second (e.g., bottom) edge portion 920 of the bottom portion 908 of the apparatus 900 can be straight or at least substantially straight (as depicted, e.g., in FIG. 9C) to correspond to the grooves 936 and 938 (e.g., straight or substantially straight grooves, which can form a dovetail) formed in or on the casing of the object 902, in a same or similar manner as described herein with other apparatuses that have straight or substantially straight edge portions. In other embodiments, the first (e.g., top) edge portion of the top portion and the second (e.g., bottom) edge portion of the bottom portion of the apparatus can be curved to form a partial (e.g., half) moon or semi-circle shape to correspond to partial moon or semi-circle shaped grooves formed in or on the casing of the object, in a same or similar manner as described herein with other apparatuses that have edge portions curved in the shape of a partial moon or semi-circle.

The main body portion 910 of the top portion 906 can have a hole 940 formed in a desired location on (e.g., substantially in the center of) the main body portion 910. The main body portion 918 of the bottom portion 908 can have a hole 942 formed in a desired location on (e.g., substantially in the center of) the main body portion 918, wherein the hole 940 in the top portion 906 can be aligned with the hole 942 in the bottom portion 908 when the top portion 906 and bottom portion 908 are connected together via the hinge and the bottom surface of the top portion 906 is facing the top surface of the bottom portion 908. In some implementations, the hole 942 in the bottom portion 908 can be a threaded hole, and the hole 940 in the top portion 906 can be a through or clearance hole. A fastener 944 can be inserted through the hole 940 and into the hole 942, wherein the threaded portion of the fastener 944 can engage the threaded portion of the hole 942, and the fastener 944 can be tightened to cause the first edge portion 916 and the second edge portion 918 to tighten down on groove 936 and groove 938, respectively, of the object 902 to hold the object 902 in a desired position with respect to the apparatus 900 and/or another object, in a same or similar manner as more fully disclosed herein with regard to other apparatuses described herein.

The bottom portion 908 can pivot about the pin 934 when the fastener 944 is tightened down on the surface of the top portion 906, which can apply pressure on the threaded hole 942 (e.g., on the threads of the threaded hole 942) of the apparatus 900.

The parts of the base portion 904 can have respective holes, hole 946 and hole 948, formed therein. The base portion 904, with holes 946 and 948 formed therein, and fasteners (not shown in FIGS. 9A-9D) can be used to mount the apparatus 900 to a desired surface, in a same or similar manner as more fully disclosed herein with regard to other apparatuses described herein.

FIGS. 10A, 10B, 10C, 10D, and 10E depict diagrams of respective views of another example apparatus 1000 that can comprise multiple pieces and can be employed to efficiently hold or fasten an object in a desired position or place, in accordance with various aspects and embodiments of the disclosed subject matter. The apparatus 1000 can be a multiple-piece bracket (e.g., multiple-piece dovetail clamping bracket) that can be employed to clamp down on, hold, or fasten an object 1002 (e.g., a sensor) in a desired position or place with respect to the apparatus 1000 and/or another object. The apparatus 1000 can be formed or fabricated using a desired material(s), such as metal (e.g. steel, stainless steel, aluminum, spring-tempered brass, or titanium) or plastic (e.g. PBT, PEEK, polyetherimide, or polyphenylsulfone), for example.

The apparatus 1000 can comprise a first bracket portion 1004 and a second bracket portion 1006, wherein the first bracket portion 1004 and the second bracket portion 1006 can be the same or at least substantially the same with regard to shape, size, and other features. Each of the first bracket portion 1004 and the second bracket portion 1006 can be formed or fabricated as a single piece.

The first bracket portion 1004 can comprise a main body portion 1008 that can have a rectangular or substantially rectangular shape with a desired defined size (e.g., length, width, thickness), wherein the size of the main body portion 1008 can be based at least in part on the size of the object 1002 that is to be clamped and held within the apparatus 1000. The first bracket portion 1004 also can comprise a first side portion 1010 (e.g., a first side flap) associated with one side of the main body portion 1008 and a second side portion 1012 (e.g., a second side flap) associated with the other side (e.g., the opposite side) of the main body portion 1008. At respective ends of the main body portion 1008, the first side portion 1010 and the second side portion 1012 can be angled or bent at a desired defined angle, such as 90 degrees or substantially close to 90 degrees, in a first direction with respect to the main body portion 1008. The first side portion 1010 and the second side portion 1012 each can have a rectangular or substantially rectangular shape with a desired defined size (e.g., length, width, thickness).

The first bracket portion 1004 also can comprise a first edge portion 1014 that can extend out from the main body portion 1008 by a desired defined length and can be angled or bent at a desired defined angle (e.g., 15 degrees, 30 degrees, 45 degrees, or other desired number of degrees) with respect to the main body portion 1008, wherein such angling or bending can be in the opposite direction of the angling or bending of the first side portion 1010 and second side portion 1012 with respect to the main body portion 1008. The first edge portion 1014 can span across all or at least a substantial portion of the side of the main body portion 1008, from which the first edge portion 1014 extends, between the first side portion 1010 and second side portion 1012.

The first bracket portion 1004 further can comprise a first extension portion 1016 that can extend from the main body portion 1008 on the opposite side of the main body portion 1008 from the first edge portion 1014. The first extension portion 1016 can be curved to angle downward (e.g., in the direction opposite of the angling or bending of that the first side portion 1010 and second side portion 1012) at a desired angle, such as 90 degrees or substantially close to 90 degrees, with respect to the main body portion 1008 and can extend from the main body portion 1008 to the point where a first hinge portion 1018 of a hinge of the apparatus 1000 can be formed. To form the first hinge portion 1018, the material of the top portion first bracket portion 1004 (with part of such material being the first extension portion 1016) that extends from the main body portion 1008 can be formed or bent to form the first hinge portion 1018 to be substantially circular with a substantially circular hole that can be defined by the inner surface of the substantially circular first hinge portion 1018, wherein the substantially circular hole can have a desired defined radius and circumference. The width of the first extension portion 1016 and associated first hinge portion 1018 can span from at or approximately close to the second side portion 1012 to at or approximately close to the halfway point of the main body portion 1008 of the first bracket portion 1004.

The main body portion 1008 of the first bracket portion 1004 also can have at least two holes, such as hole 1020 and hole 1022, of a desired defined size formed in desired location on the main body portion 1008. For instance, the hole 1020 can be centered or approximately centered between the first side portion 1010 and the halfway point across the length of the main body portion 1008, wherein the hole 1020 can be a through or clearance hole. The hole 1022 can be centered or approximately centered between the second side portion 1012 and the halfway point across the length of the main body portion 1008, wherein, in some implementations, the hole 1022 can be a threaded hole.

The first side portion 1010 can have a hole 1024 of a desired defined size formed in desired location on the first side portion 1010 (e.g., formed in the center or approximately the center of the first side portion 1010). The second side portion 1012 also can have a hole 1026 of a desired defined size formed in desired location on the second side portion 1012 (e.g., formed in the center or approximately the center of the second side portion 1012).

As disclosed, the second bracket portion 1006 can be the same or at least substantially the same as the first bracket portion 1004 with regard to shape, size, and other features, and, like the first bracket portion 1004, the second bracket portion 1006 can be formed or fabricated as a single piece using a desired material (e.g., metal, plastic). The second bracket portion 1006 can comprise a main body portion 1028, a first side portion 1030 (e.g., a first side flap) associated with one side of the main body portion 1028 and a second side portion 1032 (e.g., a second side flap) associated with the other side (e.g., the opposite side) of the main body portion 1028, wherein the main body portion 1028, first side portion 1030, and second side portion 1032 of the second bracket portion 1006 can be the same or substantially the same as the main body portion 1008, first side portion 1010, and second side portion 1012 of the first bracket portion 1004.

The second bracket portion 1006 also can comprise a second edge portion 1034 that can be the same as or similar to the first edge portion 1014 of the first bracket portion 1004. The second bracket portion 1006 further can comprise a second extension portion 1036 and a second hinge portion 1038 that can respective be the same as or similar to the first extension portion 1016 and first hinge portion 1018 of the first bracket portion 1004.

The main body portion 1028 of the second bracket portion 1006 also can have at least two holes, such as hole 1040 and hole 1042, of a desired defined size formed in desired location on the main body portion 1028, wherein such holes can be the same as or similar to the respective holes 1020 and 1022 formed in the main body portion 1008 of the first bracket portion 1004. The first side portion 1030 of the second bracket portion 1006 also can have a hole 1044 of a desired defined size formed in desired location on the first side portion 1030 (e.g., formed in the center or approximately the center of the first side portion 1030), wherein the hole 1044 can be the same as or similar to the hole 1024 formed in the first side portion 1010 of the first bracket portion 1004. The second side portion 1032 of the second bracket portion 1006 can have a hole 1046 of a desired defined size formed in desired location on the second side portion 1032 (e.g., formed in the center or approximately the center of the second side portion 1032), wherein the hole 1046 can be the same as or similar to the hole 1026 formed in the second side portion 1012 of the first bracket portion 1004.

The second bracket portion 1006 can be inverted in relation to the first bracket portion 1004 to have the second edge portion 1034 of the second bracket portion 1006 be aligned with and in proximity to the first edge portion 1014 of the first bracket portion 1004, and to have the hole 1048 of the second hinge portion 1038 be aligned with and in proximity to the hole 1050 of the first hinge portion 1018. A pin 1052 can be inserted into the hole 1048 of the second hinge portion 1038 and the hole 1050 of the first hinge portion 1018 to facilitate forming the hinge of the apparatus 1000, wherein the pin 1052 can be sized and shaped in relation to the holes 1048 and 1050 of the hinge portions 1038 and 1018 so that the pin 1052 can fit within the holes tight enough to remain in the holes 1048 and 1050, but not so tight within the holes 1048 and 1050 that it makes moving the first bracket portion 1004 and second bracket portion 1006 in relation to each other about the hinge undesirably difficult. The pin 1052 can have a desired defined length such that it is long enough to extend through the holes 1048 and 1050 of the second hinge portion 1038 and first hinge portion 1018.

When the first bracket portion 1004 and the second bracket portion 1006 are connected to each other via the hinge, the first bracket portion 1004 can be considered or referred to as the top portion of the apparatus 1000 and the second bracket portion 1006 can be considered or referred to as the bottom portion of the apparatus 1000. The hinge of the apparatus 1000 can be considered or referred to as the base portion or at least part of the base portion of the apparatus 1000.

In some embodiments, the first (e.g., top) edge portion 1014 of the first bracket portion 1004 and the second (e.g., bottom) edge portion 1034 of the second bracket portion 1006 of the apparatus 1000 can be straight or at least substantially straight (as depicted in FIG. 10) to complement or correspond to the grooves 1054 and 1056 (e.g., straight or substantially straight grooves, which can form a dovetail) or the grooves 1058 and 1060 (e.g., straight or substantially straight grooves, which can form a dovetail) formed in or on the casing of the object 1002, in a same or similar manner as described herein with other apparatuses that have straight or substantially straight edge portions. In other embodiments, the first (e.g., top) edge portion of the first bracket portion and the second (e.g., bottom) edge portion of the second bracket portion of the apparatus can be curved to form a partial (e.g., half) moon or semi-circle shape to complement or correspond to partial moon or semi-circle shaped grooves formed in or on the casing of the object, in a same or similar manner as described herein with other apparatuses that have edge portions curved in the shape of a partial moon or semi-circle.

When the first bracket portion 1004 and second bracket portion 1006 are connected together via the hinge, the hole 1020 (e.g., clearance or through hole) in the first bracket portion 1004 can be aligned with the hole 1042 (e.g., threaded hole) in the second bracket portion 1006, and the hole 1040 (e.g., clearance or through hole) in the second bracket portion 1006 can be aligned with the hole 1022 (e.g., threaded hole) in the first bracket portion 1004. A fastener 1062 can be inserted through the hole 1020 and into the hole 1042, wherein the threaded portion of the fastener 1062 can engage the threaded portion of the hole 1042, and the fastener 1062 can be tightened to cause the first edge portion 1014 and the second edge portion 1034 to move closer to each other and to tighten down on groove 1054 and groove 1056 (or alternatively, on groove 1058 and groove 1060), respectively, of the object 1002 to hold the object 1002 in a desired position with respect to the apparatus 1000 and/or another object, in a same or similar manner as more fully disclosed herein with regard to other apparatuses described herein. Additionally or alternatively, a fastener 1064 can be inserted through the hole 1040 and into the hole 1022, wherein the threaded portion of the fastener 1064 can engage the threaded portion of the hole 1022, and the fastener 1064 can be tightened to cause the second edge portion 1034 and the first edge portion 1014 to move closer to each other and to tighten down on groove 1054 and groove 1056 (or alternatively, on groove 1058 and groove 1060), respectively, of the object 1002 to hold the object 1002 in a desired position with respect to the apparatus 1000 and/or another object, in a same or similar manner as more fully disclosed herein with regard to other apparatuses described herein.

The first bracket portion 1004 (or alternatively the second bracket portion 1006) can pivot about the pin 1052 when the fastener 1062 and/or 1064 is tightened down on the surface of the main body portion 1008 and/or 1028, which can facilitate applying pressure on threaded hole 1022 and/or threaded hole 1042 (e.g., on the threads of the threaded hole 1022 and/or threaded hole 1042) of the apparatus 1000.

The hole 1024 in the first side portion 1010 of the first bracket portion and the hole 1046 in the second side portion 1032 of the second bracket portion 1006 can be used to facilitate mounting the apparatus 1000 to a desired surface. For instance, fasteners (not shown in FIG. 10) can be inserted through holes 1024 and 1046 and into the desired surface and tightened down on the apparatus 1000 to mount the apparatus to the desired surface, in a same or similar manner as more fully disclosed herein with regard to other apparatuses described herein. Alternatively, the hole 1026 in the second side portion 1032 of the first bracket portion and the hole 1044 in the first side portion 1030 of the second bracket portion 1006 can be used to facilitate mounting the apparatus 1000 to a desired surface. For instance, fasteners (not shown in FIG. 10) can be inserted through holes 1026 and 1044 and into the desired surface and tightened down on the apparatus 1000 to mount the apparatus to the desired surface, in a same or similar manner as more fully disclosed herein with regard to other apparatuses described herein.

Figure 11A:
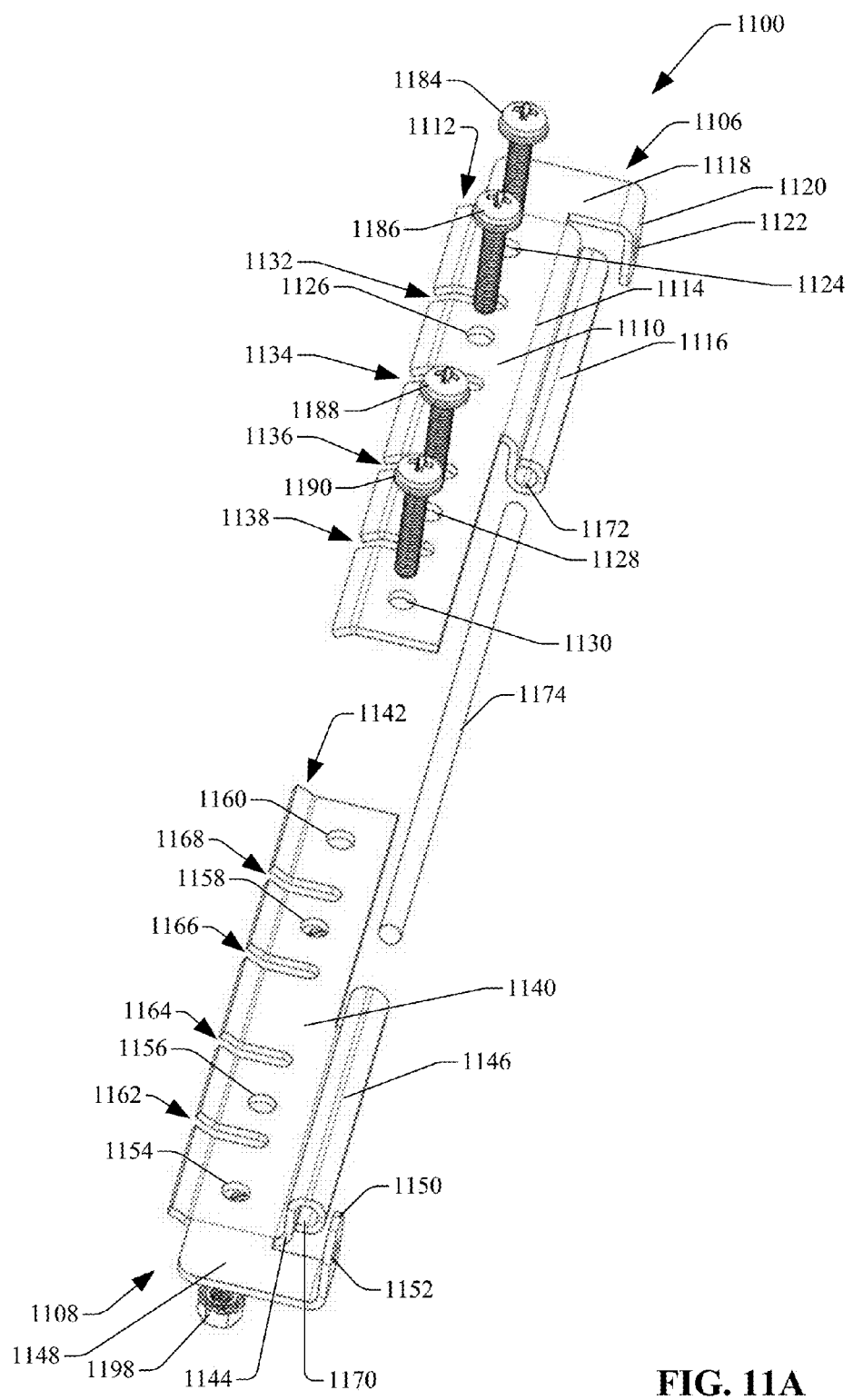
FIGS. 11A, 11B, 11C, 11D, 11E, 11F, 11G, and 11H illustrate diagrams of respective views of an example apparatus that can comprise multiple elongated pieces and can be employed to efficiently hold or fasten one or more objects in desired positions or places, in accordance with various aspects and embodiments of the disclosed subject matter.
Figure 11B:
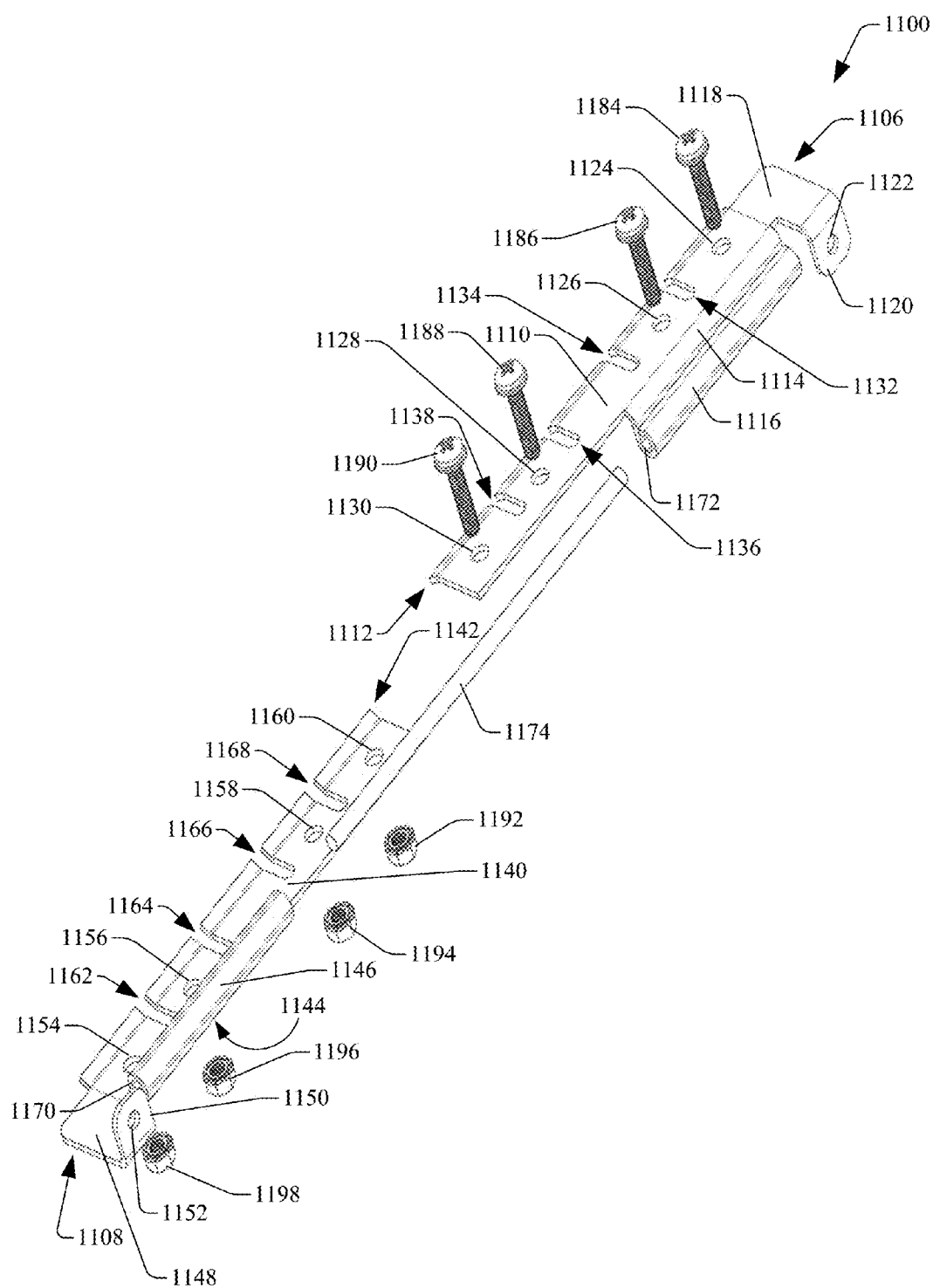
Figure 11C:
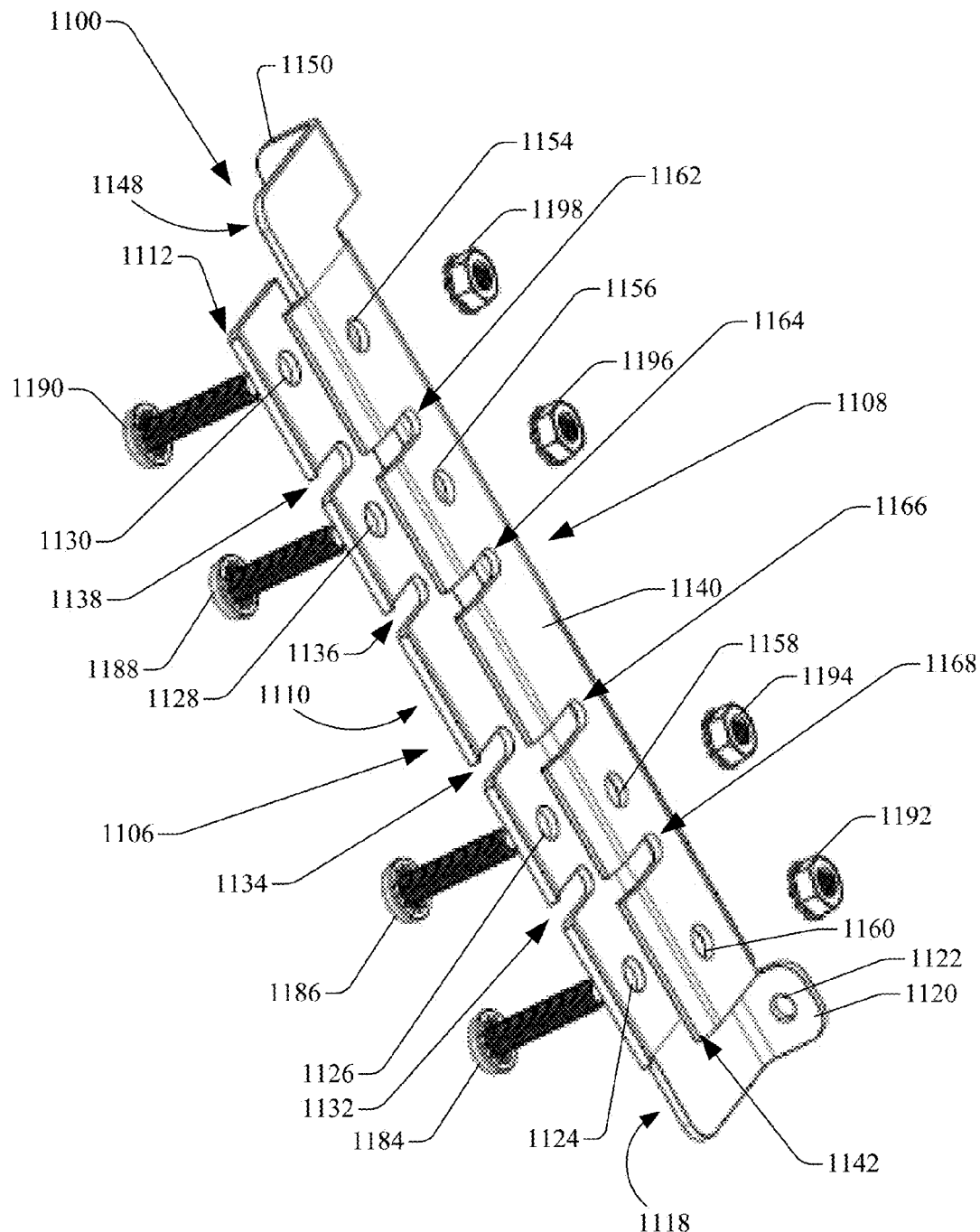
Figure 11D:
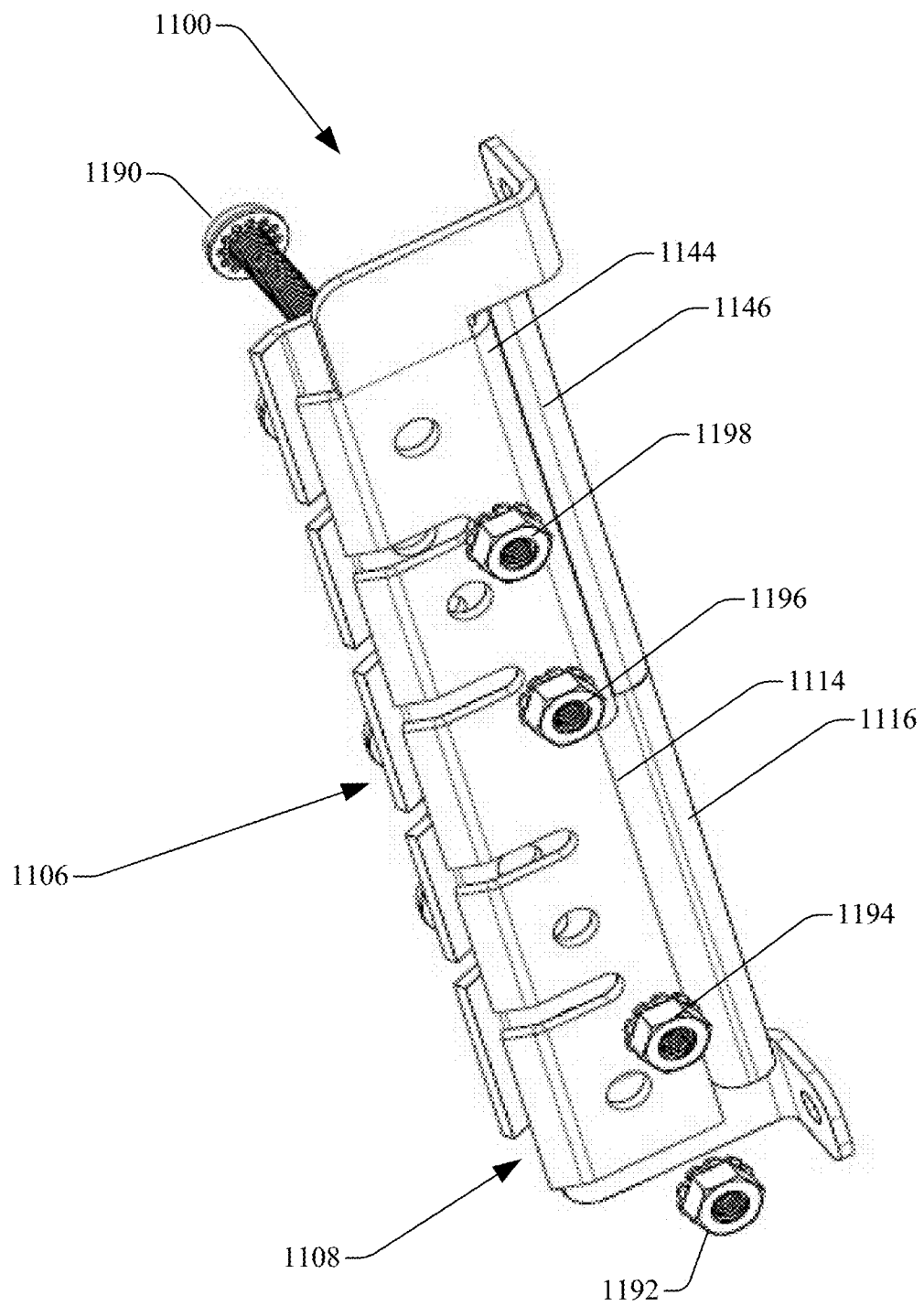
Figure 11E:
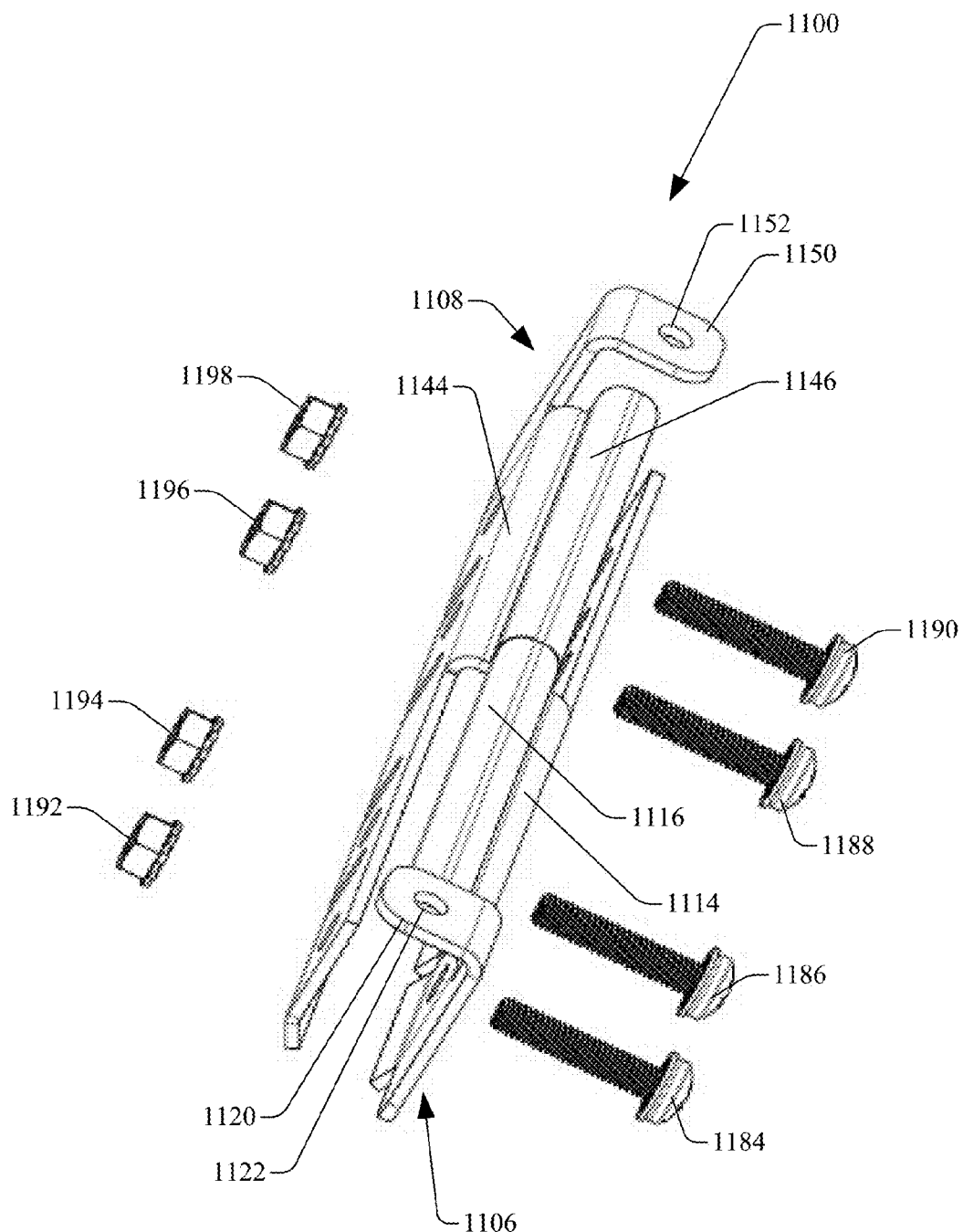
Figure 11F:
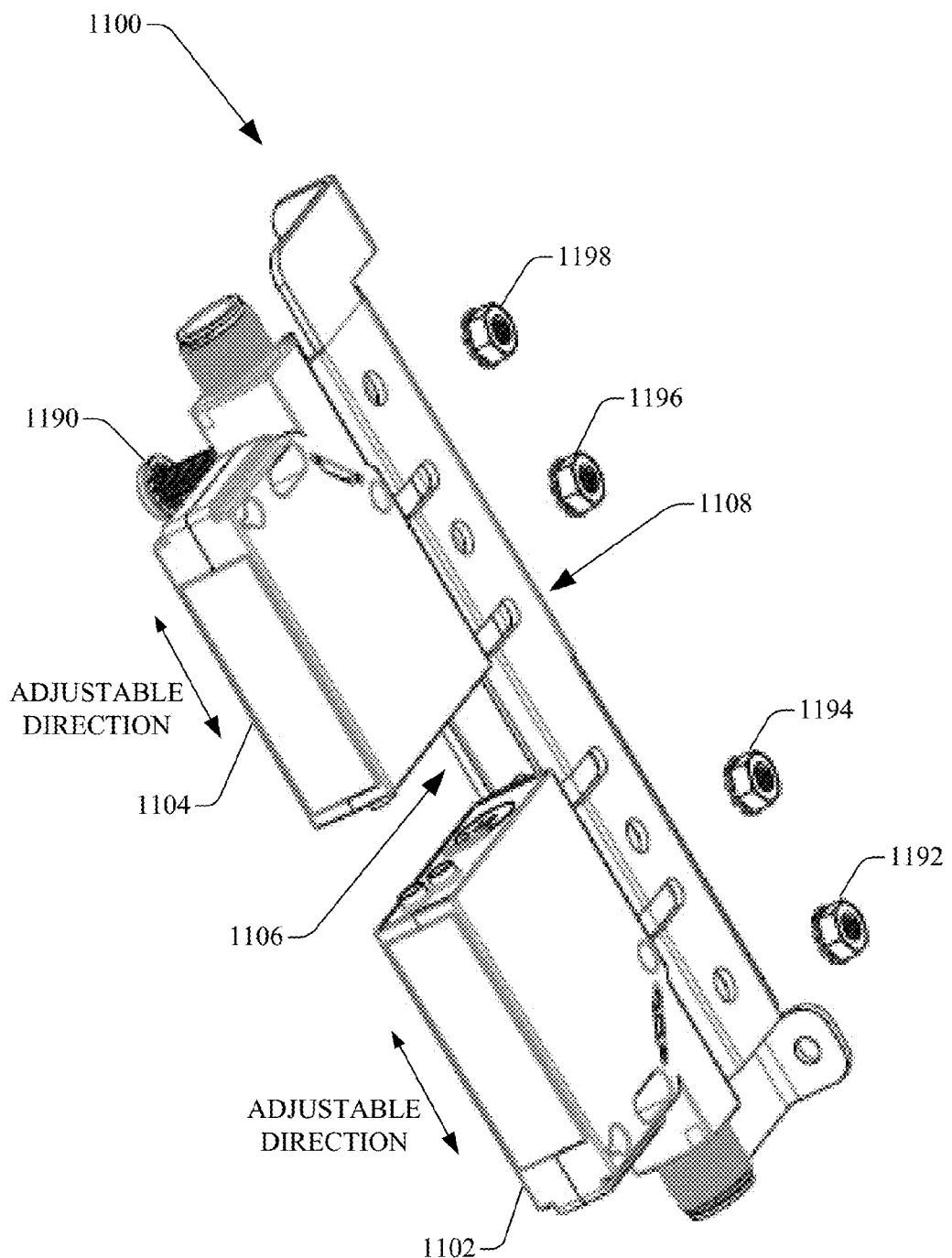
Figure 11G:
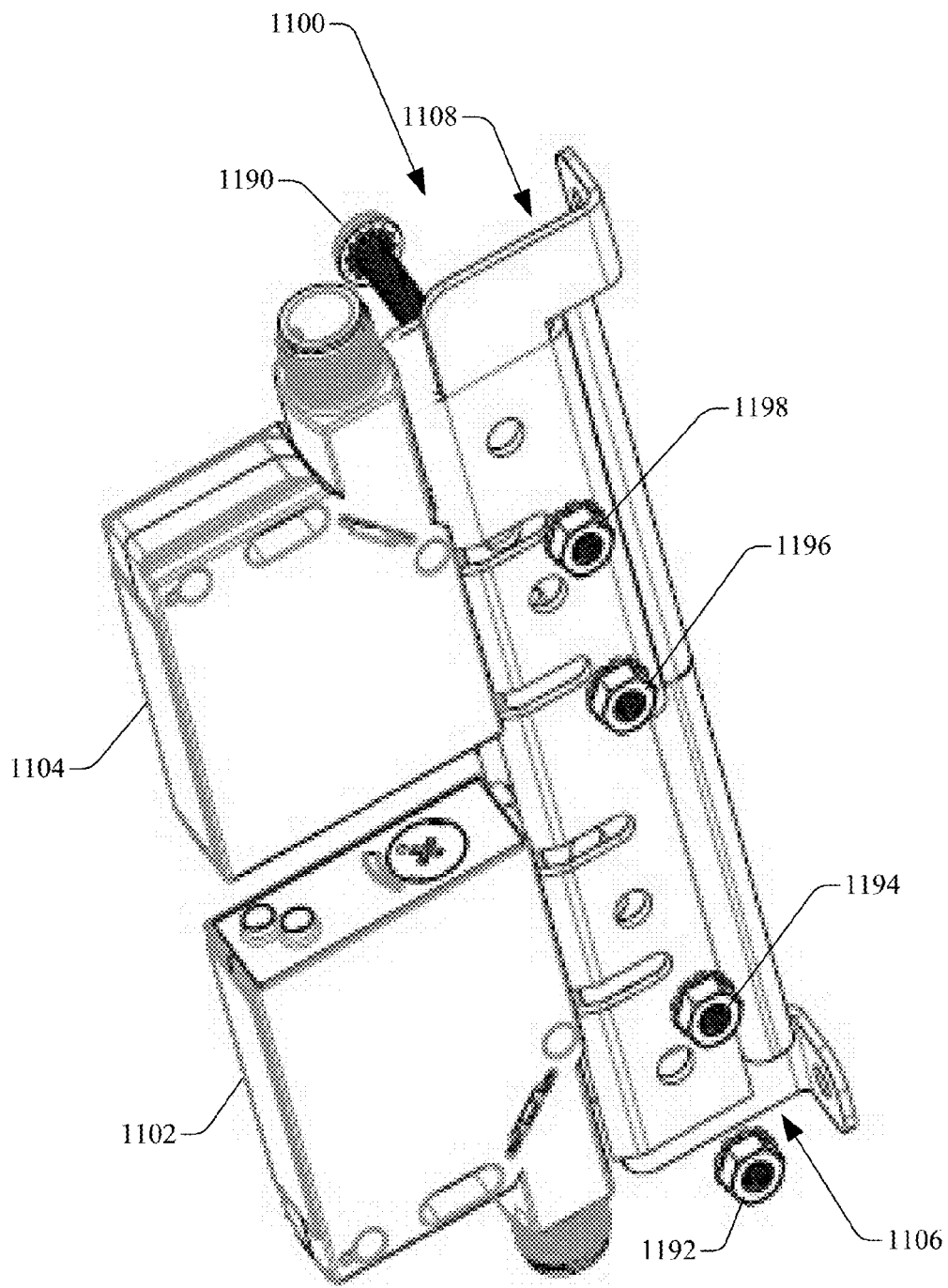
Figure 11H:
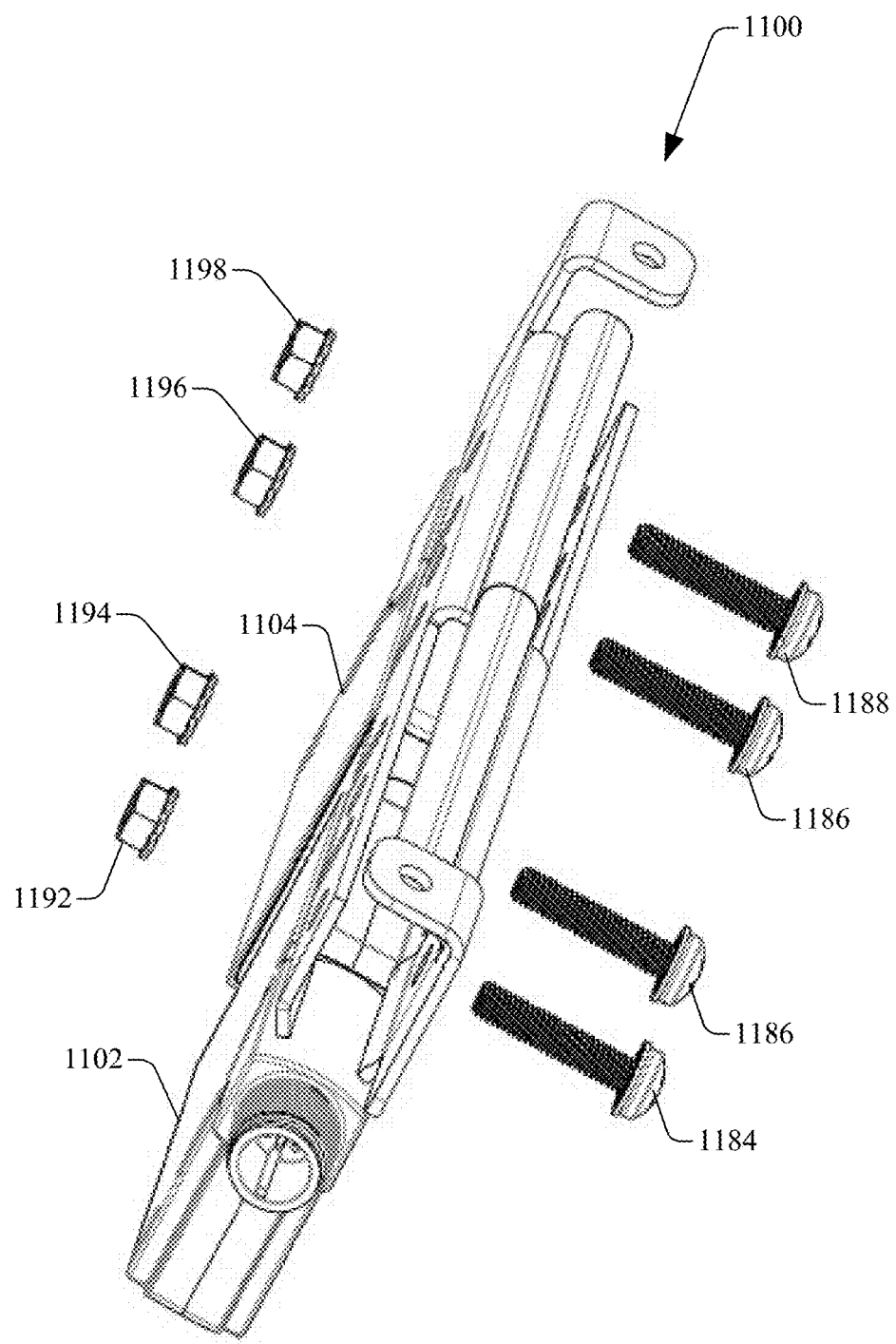
Figure 11I:
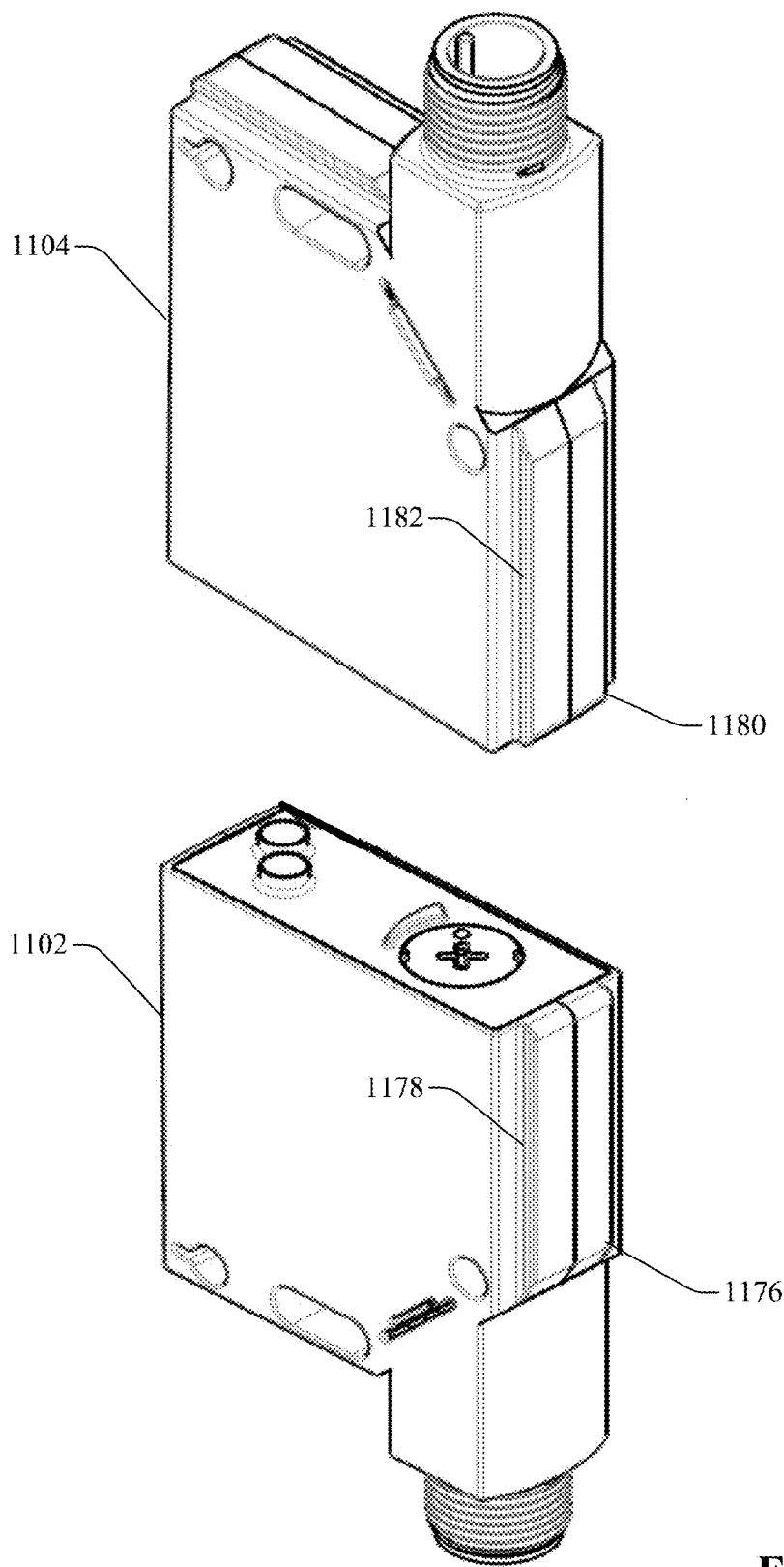
FIG. 11I depicts a diagram of typical objects that can be held in the apparatus depicted in FIGS. 11A-11H, in accordance with various aspects and embodiments of the disclosed subject matter.

FIGS. 11A, 11B, 11C, 11D, 11E, 11F, 11G, and 1111 illustrate diagrams of respective views of an example apparatus 1100 that can comprise multiple elongated pieces and can be employed to efficiently hold or fasten one or more objects in desired positions or places, in accordance with various aspects and embodiments of the disclosed subject matter. FIG. 11I depicts a diagram of objects that can be held in the apparatus 1100 (the objects also are shown in FIGS. 11F-11H), in accordance with various aspects and embodiments of the disclosed subject matter. The apparatus 1100 can be a multiple-piece bracket (e.g., multiple-piece dovetail clamping bracket) that can be employed to clamp down on, hold, or fasten one or more objects (e.g., sensors), such as object 1102 and/or object 1104 (and/or another object(s) (not shown in FIGS. 11A-11I)), in respective desired positions or place(s) with respect to the apparatus 1100 and/or another object(s). The apparatus 1100 can be formed or fabricated using a desired material(s), such as metal (e.g. steel, stainless steel, aluminum, spring-tempered brass, or titanium) or plastic (e.g. PBT, PEEK, polyetherimide, or polyphenylsulfone), for example.

In some embodiments, the apparatus 1100 can be substantially the same as or similar to the apparatus 1000 disclosed herein with respect to FIGS. 10A-10E, except as otherwise described herein. The apparatus 1100 can comprise a first bracket portion 1106 and a second bracket portion 1108, wherein the first bracket portion 1106 and the second bracket portion 1108 can be the same or at least substantially the same with regard to shape, size, and other features. Each of the first bracket portion 1106 and the second bracket portion 1108 can be formed or fabricated as a single piece.

Figure 10A:
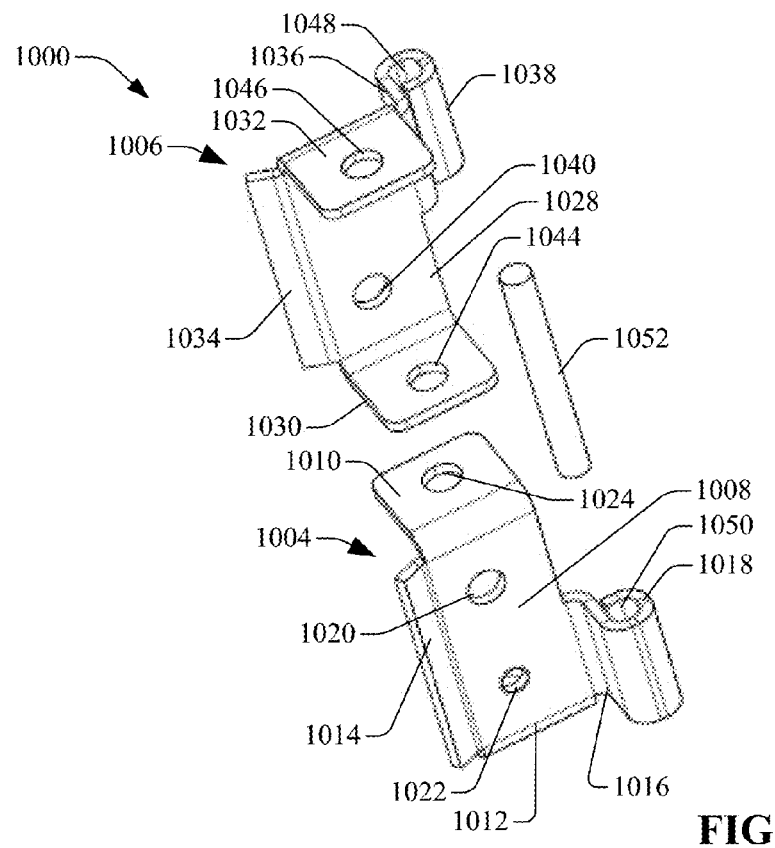
FIGS. 10A, 10B, 10C, 10D, and 10E depict diagrams of respective views of another example apparatus that can comprise multiple pieces and can be employed to efficiently hold or fasten an object in a desired position or place, in accordance with various aspects and embodiments of the disclosed subject matter.
Figure 10B:
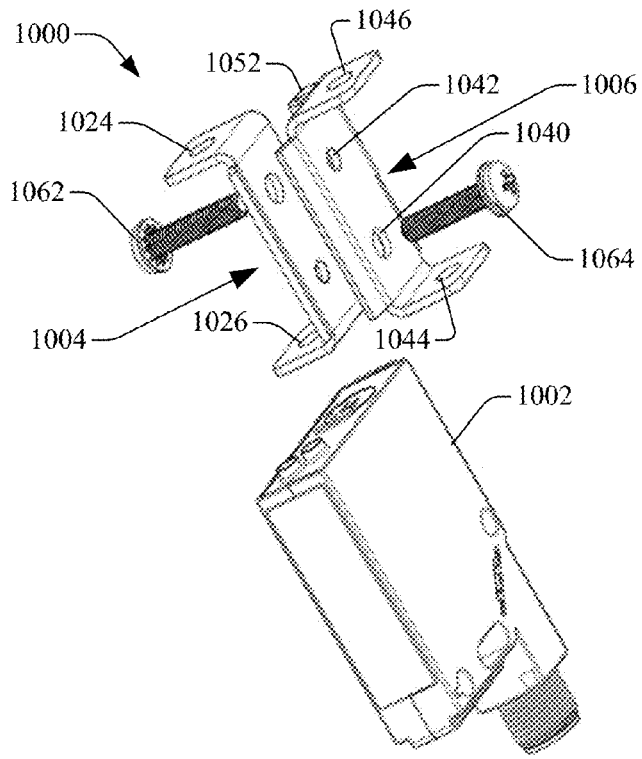
Figure 10C:
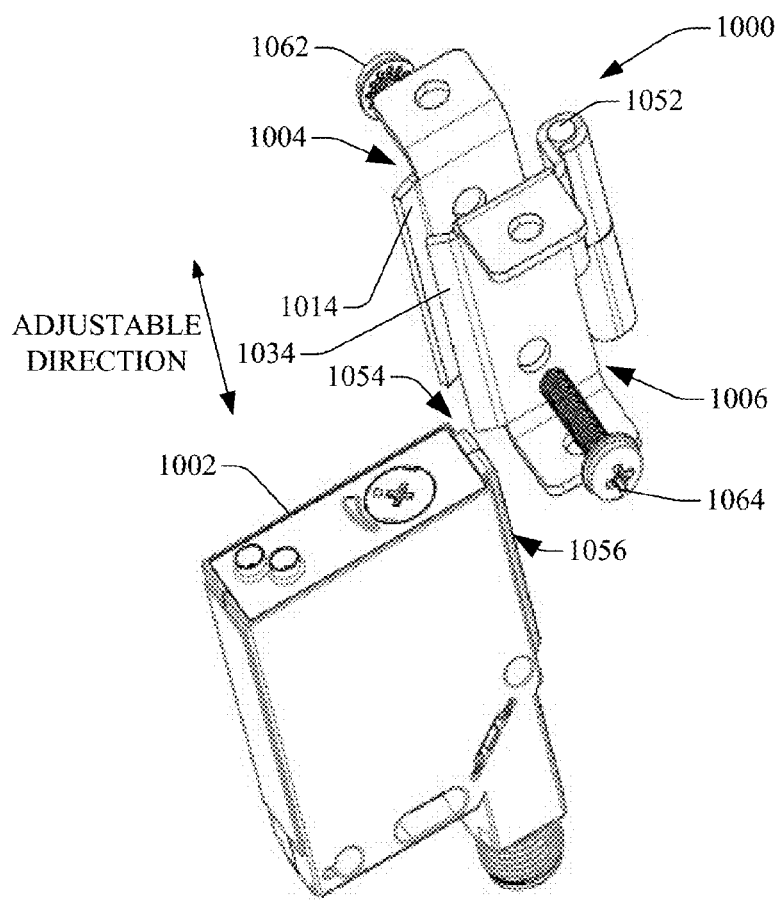
Figure 10D:
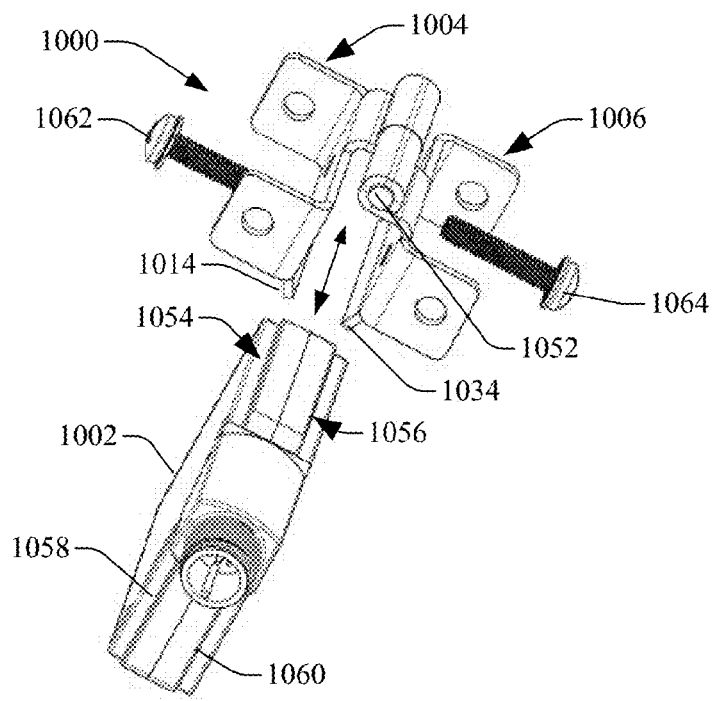
Figure 10E:
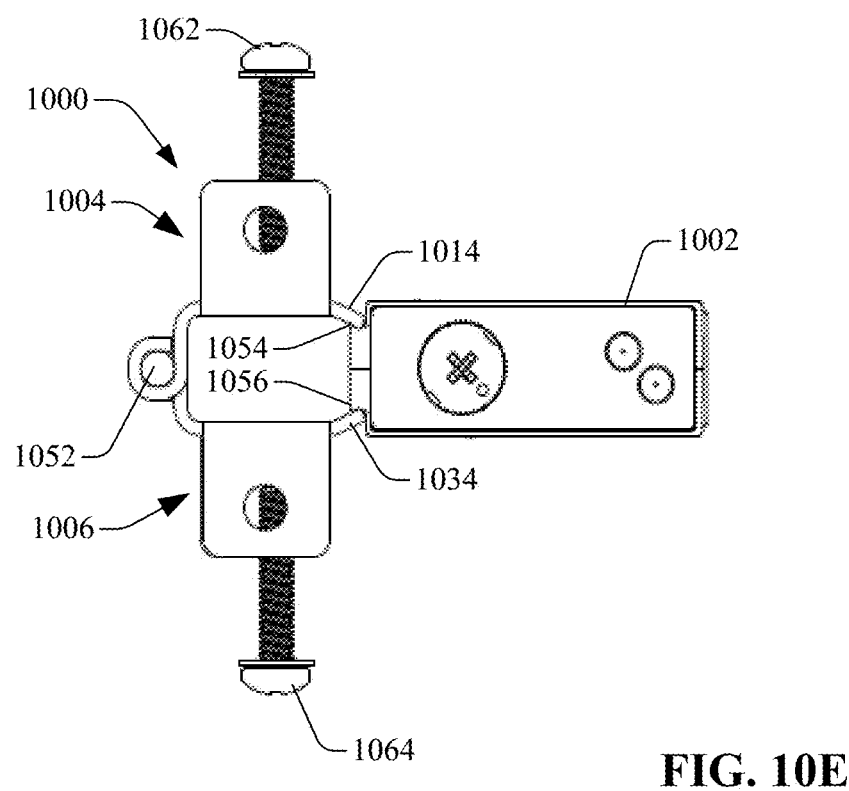

The first bracket portion 1106 can comprise a main body portion 1110 that can be substantially the same as or similar to the main body portion 1008 of FIG. 10A, except, for instance, the main body portion 1110 can be elongated to have a length sufficient to facilitate accommodating clamping down and holding two or more objects (e.g., 1102, 1104). The first bracket portion 1106 also can comprise a first edge portion 1112 that can be substantially the same as or similar to the first edge portion 1014 of FIGS. 10A-10E, except, for instance, the first edge portion 1112 can be elongated to have a length sufficient to accommodate clamping down and holding two or more objects (e.g., 1102, 1104). The first bracket portion 1106 further can comprise a first extension portion 1114 and associated first hinge portion 1116 that respectively can be substantially the same as or similar to the first extension portion 1016 and first hinge portion 1018 of FIGS. 10A-10E, except, for instance, the first extension portion 1114 and associated first hinge portion 1116 can be elongated to have a desired defined length, wherein the first extension portion 1114 and associated first hinge portion 1116 can span from the end of, or approximately the end of, the main body portion 1110 to the halfway point, or approximately the halfway point, of the main body portion 1110.

The first bracket portion 1106 also can comprise a first side portion 1118 that can be associated with (e.g., integrated with) the main body portion 1110 on one end side of the main body portion 1110. For instance, the first side portion 1118 can be on the end side of the main body portion 1110 in proximity to (e.g., on the same side of the first bracket portion 1106 as) the first extension portion 1114 and associated first hinge portion 1116. The first side portion 1118 can extend out from the main body portion 1110 by a desired defined length. The first side portion 1118 also can extend back from the main body portion 1110 in the direction opposite from the first edge portion 1112, wherein the first side portion can be angled or bent at a desired defined angle, such as 90 degrees or substantially close to 90 degrees, to form a mounting extension portion 1120 that can be further away from the main body portion 1110 than the first hinge portion 1116 to facilitate mounting of the apparatus 1100 on a desired surface, including facilitating providing a desired amount of clearance between the first hinge portion 1116 and the surface when the apparatus 1100 is mounted to the surface. The mounting extension portion 1120 can have a hole 1122 (e.g., a through or clearance hole) formed in a desired location on the mounting extension portion 1120 (e.g., in the center of or close to being in the center of the mounting extension portion 1120) and having a desired defined size.

To facilitate respective clamping and holding of respective objects by the apparatus 1100, the main body portion 1110 can have a desired number of holes and a desired number of slots formed on the main body portion 1110. In the illustrated embodiment, the main body portion 1110 can have holes 1124, 1126, 1128, and 1130 formed in desired locations on the main body portion 1110 and having a desired defined size. In some implementations, the holes 1124, 1126, 1128, and 1130 all can be through or clearance holes (as depicted in FIGS. 11A-11H).

Also, in the illustrated embodiment, the main body portion 1110 can have slots, such as slots 1132, 1134, 1136, and 1138, formed on the main body portion 1110 between the holes (e.g., 1124, 1126, 1128, 1130) formed in the main body portion 1110, or between a hole and the halfway point of the main body portion 1110, to facilitate separately clamping down and holding respective objects in the respective clamping portions formed in between the respective slots. The slots 1132, 1134, 1136, and 1138 each can be formed to extend from the first edge portion 1112 across the main body portion 1110 towards the first hinge portion 1116 for a desired defined length (e.g., halfway or two-thirds of the way across the main body portion 1110, or another desired distance across the main body portion 1110). The slots 1132, 1134, 1136, and 1138 each can have a desired defined width, wherein the defined width can be sufficient to enable the separate clamping down and holding of respective objects in the respective clamping portions formed in between the respective slots. The respective holes (e.g., 1124, 1126, 1128, 1130) can be between adjacent slots or between a slot and an end of the main body portion 1110, wherein, for example, a hole can be centered or substantially close to being centered between adjacent slots or between a slot and an end of the main body portion 1110.

As disclosed, the second bracket portion 1108 can be the same as or substantially the same as the first bracket portion 1106 with regard to shape, size, and other features, and, like the first bracket portion 1106, and the second bracket portion 1108 can be formed or fabricated as a single piece using a desired material (e.g., metal, plastic). The second bracket portion 1108 can comprise a main body portion 1140, a second edge portion 1142, a second extension portion 1144, a second hinge portion 1146, a second side portion 1148, a mounting extension portion 1150, a hole 1152 formed in the mounting extension portion 1150, holes (e.g., 1154, 1156, 1158, 1160) formed in the main body portion 1140, and slots (e.g., 1162, 1164, 1166, 1168) formed in the main body portion 1140 that respectively can be the same or substantially the same as the main body portion 1110, first edge portion 1112, first extension portion 1114, first hinge portion 1116, first side portion 1118, mounting extension portion 1120, hole 1122 formed in the mounting extension portion 1120, holes (e.g., 1124, 1126, 1128, 1130) formed in the main body portion 1110, and slots (e.g., 1132, 1134, 1136, and 1138) formed in the main body portion 1110 of the first bracket portion 1106.

The second bracket portion 1108 can be inverted in orientation in relation to the first bracket portion 1106 to have the second edge portion 1142 of the second bracket portion 1108 be aligned with and in proximity to the first edge portion 1112 of the first bracket portion 1106 (e.g., when the main body portion 1110 of the first bracket portion 1106 is substantially parallel to the main body portion 1140 of the second bracket portion 1108), and to have the hole 1170 of the second hinge portion 1146 be aligned with and in proximity to the hole 1172 of the first hinge portion 1116. A pin 1174 can be inserted into the hole 1170 of the second hinge portion 1146 and the hole 1172 of the first hinge portion 1116 to facilitate forming the hinge of the apparatus 1100, wherein the pin 1174 can be sized and shaped in relation to the holes 1170 and 1172 of the hinge portions 1146 and 1116 so that the pin 1174 can fit within the holes 1170 and 1172 tight enough to remain in the holes 1170 and 1172, but not so tight within the holes 1170 and 1172 that it makes moving the first bracket portion 1106 and second bracket portion 1108 in relation to each other about the hinge undesirably difficult. The pin 1174 can have a desired defined length such that it is long enough to extend through the holes 1170 and 1172 of the second hinge portion 1146 and first hinge portion 1116.

When the first bracket portion 1106 and the second bracket portion 1108 are connected to each other via the hinge, the first bracket portion 1106 can be considered or referred to as the top portion of the apparatus 1100 and the second bracket portion 1108 can be considered or referred to as the bottom portion of the apparatus 1100. The hinge of the apparatus 1100 can be considered or referred to as the base portion or at least part of the base portion of the apparatus 1100.

In some embodiments, the first (e.g., top) edge portion 1112 of the first bracket portion 1106 and the second (e.g., bottom) edge portion 1142 of the second bracket portion 1108 of the apparatus 1100 can be straight or at least substantially straight (as depicted in FIGS. 11A-11H) to complement or correspond to the grooves 1176 and 1178 (e.g., straight or substantially straight grooves, which can form a dovetail) formed in or on the casing of the object 1102 or the grooves 1180 and 1182 (e.g., straight or substantially straight grooves, which can form a dovetail) formed in or on the casing of the object 1104 (as depicted in FIGS. 11F-11I), in a same or similar manner as described herein with other apparatuses that have straight or substantially straight edge portions. In other embodiments, the first (e.g., top) edge portion of the first bracket portion and the second (e.g., bottom) edge portion of the second bracket portion of the apparatus can be curved to form a partial (e.g., half) moon or semi-circle shape to complement or correspond to partial moon or semi-circle shaped grooves formed in or on the casing of the object(s), in a same or similar manner as described herein with other apparatuses that have edge portions curved in the shape of a partial moon or semi-circle.

When the first bracket portion 1106 and second bracket portion 1108 are connected together via the hinge, the respective holes (e.g., 1124, 1126, 1128, 1130) formed in the main body portion 1110 of the first bracket portion 1106 can be aligned with respective holes (e.g., 1154, 1156, 1158, 1160) formed in the main body portion 1140 of the second bracket portion 1108, and the respective slots (e.g., 1132, 1134, 1136, and 1138) formed in the main body portion 1110 of the first bracket portion 1106 can be aligned with the respective slots (e.g., 1162, 1164, 1166, 1168) formed in the main body portion 1140 of the second bracket portion 1108. For instance, when the first bracket portion 1106 and second bracket portion 1108 are connected together via the hinge, hole 1124 can be aligned with hole 1160, hole 1126 can be aligned with hole 1158, hole 1128 can be aligned with hole 1156, hole 1130 can be aligned with hole 1154, and slot 1132 can be aligned with slot 1168, slot 1134 can be aligned with slot 1166, slot 1136 can be aligned with slot 1164, and slot 1138 can be aligned with slot 1162.

A fastener 1184 can be inserted through hole 1124 and hole 1160, a fastener 1186 can be inserted through hole 1126 and hole 1158, a fastener 1188 can be inserted through hole 1128 and hole 1156, and a fastener 1190 can be inserted through hole 1128 and hole 1154. A nut (e.g., threaded nut) 1192 can engage (e.g., be screwed onto) a threaded portion of fastener 1184, a nut (e.g., threaded nut) 1194 can engage (e.g., be screwed onto) a threaded portion of fastener 1186, a nut (e.g., threaded nut) 1196 can engage (e.g., be screwed onto) a threaded portion of fastener 1188, and a nut (e.g., threaded nut) 1198 can engage (e.g., be screwed onto) a threaded portion of fastener 1190. In some embodiments, the fasteners 1184, 1186, 1188, and 1190 can be screws with captive lock washers that can serve to prevent the fasteners from becoming loose when the apparatus 1100 is subjected to environmental conditions, such as, for example, vibration and temperature extremes. In some other embodiments, the nuts 1192, 1194, 1196, and 1198 can be nuts with captive lock washers that can serve to prevent the nuts from becoming loose when the apparatus 1100 is subjected to environmental conditions, such as, for example, vibration and temperature extremes.

The portion of the first edge portion 1112 and second edge portion 1142 associated with fastener 1184 and holes 1124 and 1160, respectively, can be a first clamping portion of the apparatus 1100, the portion of the first edge portion 1112 and second edge portion 1142 associated with fastener 1186 and holes 1126 and 1158, respectively, can be a second clamping portion of the apparatus 1100, the portion of the first edge portion 1112 and second edge portion 1142 associated with fastener 1188 and holes 1128 and 1156, respectively, can be a third clamping portion of the apparatus 1100, and the portion of the first edge portion 1112 and second edge portion 1142 associated with fastener 1190 and holes 1130 and 1154, respectively, can be a fourth clamping portion of the apparatus 1100.

As depicted in FIGS. 11D-11F, object 1102 is being clamped and held by the first clamping portion and second clamping portion of the apparatus 1100, and object 1104 is being clamped and held by the third clamping portion and fourth clamping portion of the apparatus 1100. The fastener 1184 and nut 1192 combination can be tightened on the first clamping portion and/or the fastener 1186 and nut 1194 combination can be tightened on the second clamping portion to cause the first clamping portion and/or second clamping portion to clamp down on the grooves 1176 and 1178 formed in or on the casing of the object 1102 to hold the object 1102 in a desired position with respect to the apparatus 1100 and/or another object. The fastener 1188 and nut 1196 combination can be tightened on the third clamping portion and/or the fastener 1190 and nut 1198 combination can be tightened on the fourth clamping portion to cause the third clamping portion and/or fourth clamping portion to clamp down on the grooves 1180 and 1182 formed in or on the casing of the object 1104 to hold the object 1104 in a desired position with respect to the apparatus 1100 and/or another object.

In some implementations, a first object can be held and clamped using the first clamping portion, a second object can be held and clamped using the second clamping portion, a third object can be held and clamped using the third clamping portion, and/or a fourth object can be held and clamped using the fourth clamping portion. For instance, the fastener 1184 and nut 1192 combination can be tightened on the first clamping portion to cause the first clamping portion to clamp down on the grooves formed in or on the casing of the first object to hold the first object in a desired position with respect to the apparatus 1100 and/or another object; the fastener 1186 and nut 1194 combination can be tightened on the second clamping portion to cause the second clamping portion to clamp down on the grooves formed in or on the casing of the second object to hold the second object in a desired position with respect to the apparatus 1100 and/or another object; the fastener 1188 and nut 1196 combination can be tightened on the third clamping portion to cause the third clamping portion to clamp down on the grooves formed in or on the casing of the third object to hold the third object in a desired position with respect to the apparatus 1100 and/or another object; and the fastener 1190 and nut 1198 combination can be tightened on the fourth clamping portion to cause the fourth clamping portion to clamp down on the grooves formed in or on the casing of the fourth object to hold the fourth object in a desired position with respect to the apparatus 1100 and/or another object. In this manner, any object(s) assembled to any of a first, second, third, and/or fourth clamping portions of the apparatus 1100 can be installed or removed (e.g., replaced) without having to remove, loosen, or unclamp any other object(s) assembled to any other of the first, second, third, and/or fourth clamping portions of the apparatus 1100.

The hole 1122 formed in the mounting extension portion 1120 of the first bracket portion 1106 and the hole 1152 formed in the mounting extension portion 1150 of the second bracket portion 1108 can be used to facilitate mounting the apparatus 1100 to a desired surface. For instance, fasteners (not shown in FIGS. 11A-11F) can be inserted through holes 1122 and 1152 and into the desired surface and tightened down on the mounting extension portion 1120 and mounting extension portion 1150 of the apparatus 1100 to mount the apparatus to the desired surface, in a same or similar manner as more fully disclosed herein with regard to other apparatuses described herein.

Figure 12:
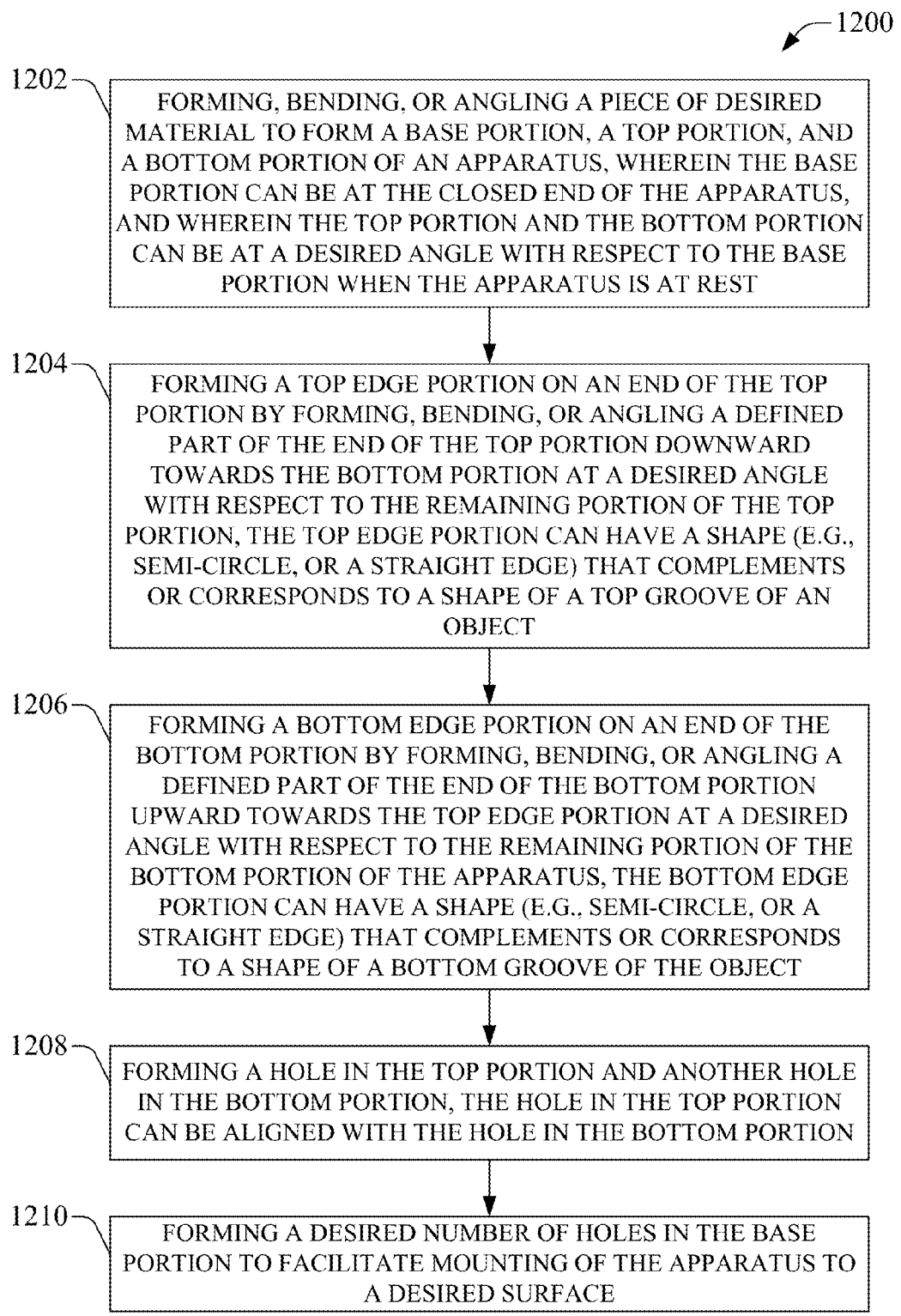
FIG. 12 illustrates a flow diagram of an example method for forming an apparatus that can be employed to efficiently hold or fasten an object in a desired position or place, in accordance with various aspects and embodiments of the disclosed subject matter, in accordance with various aspects and embodiments of the disclosed subject matter.
Figure 13:
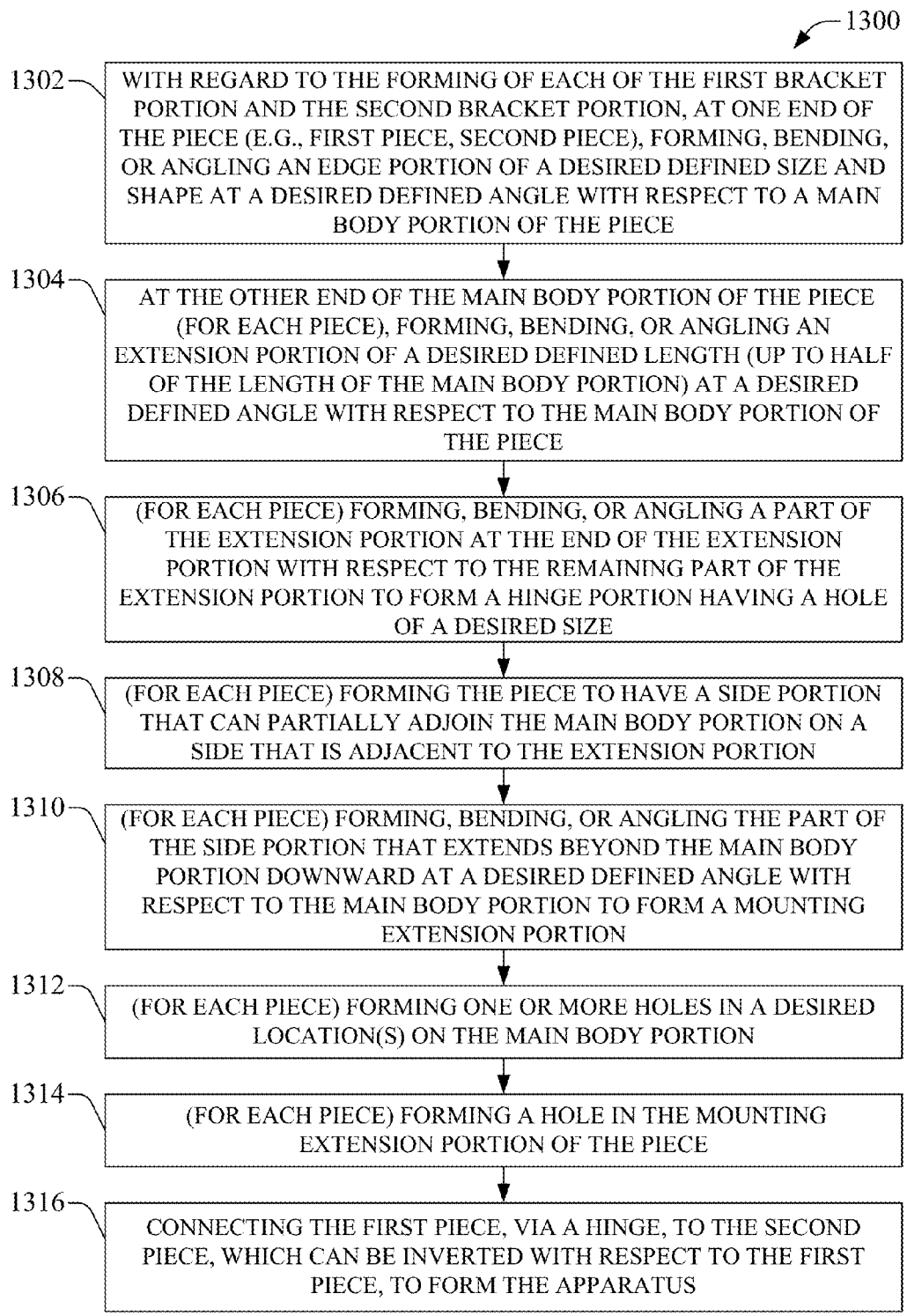
FIG. 13 presents a flow diagram of an example method for forming an apparatus (e.g., a multi-piece apparatus) that can be employed to efficiently hold or fasten an object in a desired position or place, in accordance with various aspects and embodiments of the disclosed subject matter.

FIGS. 12-13 present methods and/or flow diagrams in accordance with the disclosed subject matter. For simplicity of explanation, the methods are depicted and described as a series of acts. It is to be understood and appreciated that the disclosed subject matter is not limited by the acts illustrated and/or by the order of acts, for example acts can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events.

Now referring to FIG. 12, illustrated is a flow diagram of an example method 1200 that for forming an apparatus that can be employed to efficiently hold or fasten an object in a desired position or place, in accordance with various aspects and embodiments of the disclosed subject matter in accordance with various aspects and embodiments of the disclosed subject matter. The apparatus (e.g., dovetail clamping bracket) can be formed or created using a single piece of a desired material (e.g., metal, plastic).

At 1202, a piece of desired material can be formed, bent, or angled to form a base portion, a top portion, and a bottom portion of the apparatus, wherein the base portion can be at the closed end of the apparatus, and wherein the top portion and the bottom portion can be at a desired angle (e.g., 90 degrees or substantially close to 90 degrees) with respect to the base portion when the apparatus is at rest (e.g., when the apparatus is not subject to a force to clamp it down on an object). A machine can be employed to extrude, form, bend, or otherwise produce the base portion, top portion, and bottom portion of the apparatus. The base portion, top portion, and bottom portion of the apparatus can be of uniform or at least substantially uniform thickness.

At 1204, a top edge portion can be formed on an end of the top portion that is opposite to the base portion by forming, bending, or angling a defined part of the end of the top portion downward towards the bottom portion at a desired angle with respect to the remaining portion of the top portion of the apparatus, wherein the top edge portion can have a shape (e.g., semi-circle or partial moon edge, or a straight edge) that complements or corresponds to a shape of a top groove or dovetail of an object to be clamped and held by the apparatus. The machine can be employed to extrude, form, bend, or otherwise produce the top edge portion of the apparatus.

At 1206, a bottom edge portion can be formed on an end of the bottom portion that is opposite to the base portion by forming, bending, or angling a defined part of the end of the bottom portion upward towards the top edge portion at a desired angle with respect to the remaining portion of the bottom portion of the apparatus, wherein the bottom edge portion can have a shape (e.g., semi-circle or partial moon edge, or a straight edge) that complements or corresponds to a shape of a bottom groove or dovetail of the object to be clamped and held by the apparatus. The machine can be employed to extrude, form, bend, or otherwise produce the bottom edge portion of the apparatus.

At 1208, a hole can be formed at a desired location in the top portion and another hole can be formed at a desired location in the bottom portion, wherein the hole in the top portion can be aligned with the hole in the bottom portion to facilitate inserting a fastener. In some implementations, the hole formed in the bottom portion can be a threaded hole. The machine can be employed to form (e.g., fabricate, bore) the respective holes in the top portion and bottom portion of the apparatus.

At 1210, a desired number of holes can be formed in the base portion to facilitate mounting of the apparatus to a desired surface. The machine can be employed to form (e.g., fabricate, bore) the desired number of holes in desired locations in the base portion of the apparatus. For example, the machine can form two holes in the base portion. In some implementations, the machine can form two threaded holes in the base portion. In some implementations, the machine can form two slots in the base portion. In some implementations, the base portion can comprise an extended portion (e.g., ear portion) on each end of the base portion (e.g., the ends that are not connected to or integrated with the top portion and bottom portion), wherein the machine can form a hole, slot, or breakthrough in each extended portion.

A fastener can be inserted through the hole in the top portion and through the hole in the bottom portion (e.g., via screwing the threaded portion of the fastener through the threaded portion of the hole in the bottom portion or passing the fastener through such hole when it is a clearance hole). If the hole in the bottom portion is not threaded, a nut can be attached to the threaded portion of the fastener. The top edge portion and bottom edge portion can be inserted into the respective grooves of the object, and the fastener and/or nut can be manipulated (e.g., screwed) to apply pressure on the top portion and bottom portion, which can thereby cause the top edge portion and bottom edge portion to apply pressure on the respective grooves of the object to clamp down and hold the object in a desired position with respect to the apparatus and/or another object. Before or after clamping the object with the apparatus, the apparatus can be mounted to a desired surface using fasteners inserted through all or some of the holes formed in the base portion.

FIG. 13 presents a flow diagram of an example method 1300 that for forming an apparatus (e.g., a multi-piece apparatus) that can be employed to efficiently hold or fasten an object in a desired position or place, in accordance with various aspects and embodiments of the disclosed subject matter. The apparatus (e.g., dovetail clamping bracket) can be formed or created using two pieces of a desired material (e.g., metal, plastic), wherein the first piece, a first bracket portion, can be the same as or substantially the same as the second piece, a second bracket portion.

At 1302, with regard to the forming of each of the first bracket portion and the second bracket portion, at one end of the piece (e.g., first piece, second piece), which can span across the length of the piece, an edge portion (e.g., first edge portion, second edge portion) of a desired defined size and shape (e.g., semi-circled edged, straight or substantially straight edged) can be formed, bent, or angled at a desired defined angle with respect to a main body portion of the piece. A machine can be employed to extrude, form, or otherwise produce the respective edge portions for the first piece and second piece of the apparatus.

At 1304, with regard to the forming of each of the first bracket portion and the second bracket portion, at the other end of the main body portion of the piece (e.g., first piece, second piece), an extension portion (e.g., first extension portion, second extension portion) of a desired defined length can be formed, bent, or angled at a desired defined angle (e.g., 90 degrees or approximately 90 degrees) with respect to the main body portion of the piece, wherein the extension portion can span from at or near a side of the main body portion across up to approximately half of the length of the main body portion of the piece. The extension portion can extend out from the other end of the main body portion of the piece, wherein the length of the extension portion can be sufficiently long enough to enable part of the extension portion to be curved or bent to form a hinge portion. A machine can be employed to extrude, form, or otherwise produce the respective extension portions for the first piece and second piece of the apparatus.

At 1306, with regard to the forming of each of the first bracket portion and the second bracket portion, a part of the extension portion (e.g., first extension portion, second extension portion) at the end of the extension portion can be formed, bent, or angled with respect to the remaining part of the extension portion to form a hinge portion (e.g., first hinge portion, second hinge portion) having a hole of a desired size. The edge of the extension portion can be formed or bent to form a cylindrical or substantially cylindrical hinge portion having a hole formed therein. The machine can be employed to extrude, form, or otherwise produce the respective hinge portions for the first piece and second piece of the apparatus.

At 1308, with regard to the forming of each of the first bracket portion and the second bracket portion, the piece (e.g., first piece, second piece) can be formed to have a side portion that can partially adjoin the main body portion on a side that is adjacent to the extension portion, wherein part of the side portion can extend by a desired defined length beyond the main body portion in the direction of the extension portion. The side portion can have a desired defined size sufficiently large enough to form a mounting extension portion to facilitate mounting of the apparatus to a desired surface. The machine can be employed to extrude, form, or otherwise produce the respective side portions for the first piece and second piece of the apparatus.

At 1310, with regard to the forming of each of the first bracket portion and the second bracket portion, the part of the side portion that extends beyond the main body portion can be formed, bent, or angled downward (e.g., in the same direction as the extension portion is formed, bent, or angled) at a desired defined angle (e.g., 90 degrees or substantially close to 90 degrees) with respect to the main body portion to form a mounting extension portion having a desired defined size. The mounting extension portion can have a desired defined size sufficiently large enough to enable a hole to be formed therein to facilitate accommodating a fastener to facilitate mounting of the apparatus to a desired surface. The machine can be employed to extrude, form, or otherwise produce the mounting extension portions for the first piece and second piece of the apparatus.

At 1312, with regard to the forming of each of the first bracket portion and the second bracket portion, one or more holes can be formed in a desired location(s) on the main body portion. For instance, if the apparatus is to have one clamping portion, a hole can be formed in a desired location (e.g., center) on the main body portion. If the apparatus is to have more than one clamping portion, wherein one or more slots can be formed on the piece to facilitate creating separate clamping portions that can be used to separately clamp and hold respective objects, a desired number of holes can be formed in desired locations on the main body portion to facilitate creating the separate clamping portions of the apparatus. The machine can be employed to form the one or more holes (and/or one or more slots) in the main body portion for the first piece and second piece of the apparatus.

At 1314, with regard to the forming of each of the first bracket portion and the second bracket portion, a hole can be formed in the mounting extension portion of the piece. The machine can be employed to form (e.g. fabricate, bore) the holes in the mounting extension portions for the first piece and second piece of the apparatus. In some implementations, the machine can be employed to form threaded holes in the mounting extension portions for the first piece and second piece of the apparatus. In certain implementations, the machine can be employed to form slots or breakthroughs in the mounting extension portions for the first piece and second piece of the apparatus.

At 1316, the first piece (e.g., first bracket portion) can be connected, via a hinge, to the second piece (e.g., second bracket portion), which can be inverted with respect to the first piece, to form the apparatus, wherein the hole of the first hinge portion can be aligned with the hole of the second hinge portion and a pin can be inserted into those holes to form the hinge of the apparatus. One or more fasteners can be inserted into the one or more holes in the respective main body portions of the first piece and second piece, wherein nuts can be screwed onto the respective fasteners (e.g., when a hole(s) in the second piece is not threaded) to facilitate tightening the fastener(s) and/or nut(s) onto the one or more clamping portions of the apparatus to facilitate clamping and holding one or more objects by the apparatus. Fasteners also can be inserted through the holes in the mounting extension portions of the apparatus and into a desired surface to facilitate mounting the apparatus to the desired surface.

For purposes of simplicity of explanation, methods that can be implemented in accordance with the disclosed subject matter were shown and described as a series of blocks. However, it is to be understood and appreciated that the disclosed subject matter is not limited by the order of the blocks, as some blocks can occur in different orders and/or concurrently with other blocks from what is depicted and described herein. Moreover, not all illustrated blocks can be required to implement the methods described hereinafter.

The aforementioned apparatuses, devices, components, and systems have been described with respect to interaction among several components. It should be appreciated that such apparatuses, devices, components, and systems can include those components or sub-components specified therein, some of the specified components or sub-components, and/or additional components. Sub-components can also be implemented as components communicatively coupled to other components rather than included within parent components. Additionally, it should be noted that one or more components could be combined into a single component providing aggregate functionality. The components could also interact with one or more other components not specifically described herein but known by those of skill in the art.

It is to be appreciated and understood that components (e.g., first bracket component, second bracket component, main body portion, first edge portion, second edge portion, base portion, fastener, nut, object, etc.), as described with regard to a particular apparatus, device, system, or method, can include the same or similar functionality as respective components (e.g., respectively named (e.g., same or similarly named) components) as described with regard to other apparatuses, devices, systems, or methods disclosed herein.

Further, as used in this application, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

What has been described above includes examples of the subject specification. It is, of course, not possible to describe every conceivable combination of components or methods for purposes of describing the subject specification, but one of ordinary skill in the art can recognize that many further combinations and permutations of the subject specification are possible. Accordingly, the subject specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A bracket, comprising:
a top portion that is associated with a base portion on an end of the top portion wherein the base portion has a defined length, wherein the top portion comprises a top edge portion at another end of the top portion that is opposite the end of the top portion, wherein the top edge portion is bent at a defined angle and has a defined shape that complements a first groove in a casing of an object, wherein the top edge portion is formed in the defined shape that is semi-circular to complement a semi-circular shape of the first groove in a first surface of the casing of the object, wherein the top edge portion comprises a first edge portion, a second edge portion, and a middle edge portion situated between the first edge portion and the second edge portion, wherein the middle edge portion extends further away in distance from the base portion than the first edge portion and the second edge portion, and wherein the middle edge portion is adapted to be insertable into the first groove in the casing of the object; and
a bottom portion that is associated with the base portion on an end of the bottom portion, wherein the bottom portion comprises a bottom edge portion at another end of the bottom portion that is opposite the end of the bottom portion, wherein the bottom edge portion is bent at the defined angle and has the defined shape that complements a second groove in the casing of the object that is capable of being held in the bracket between the top edge portion and the bottom edge portion.

2. The bracket of claim 1, wherein the bracket is formed from a single piece of a material, wherein the base portion, the top portion, and the bottom portion are of a uniform or at least a substantially uniform thickness, and wherein the material comprises a metal material or a plastic material.

3. The bracket of claim 1, wherein the bottom edge portion is formed in the defined shape that is semi-circular to complement the semi-circular shape of the second groove in a second surface of the casing of the object.

4. The bracket of claim 1, wherein the top edge portion is formed in the defined shape that is straight or at least substantially straight to complement a straight or at least substantially straight shape of the first groove in a first surface of the casing of the object, and wherein the bottom edge portion is formed in the defined shape that is straight or at least substantially straight to complement the straight or at least substantially straight shape of the second groove in a second surface of the casing of the object.

5. The bracket of claim 1, wherein the top portion comprises a first hole formed in a first location on the top portion, and the bottom portion comprises a second hole formed in a second location on the bottom portion, and wherein the first hole is aligned with the second hole to facilitate insertion of a fastener into or through the first hole and the second hole to facilitate clamping of the top edge portion on the first groove of the object and the bottom edge portion on the second groove of the object.

6. The bracket of claim 5, wherein the second hole is a threaded hole that is threaded to correspond to a threaded portion of a fastener.

7. The bracket of claim 5, wherein the top edge portion is configured to apply a first pressure to the first groove of the object, and the bottom edge portion is configured to apply a second pressure to the second groove of the object, in response to a third pressure that is able to be applied to the top portion by a head portion of the fastener and a fourth pressure that is able to be applied to the bottom portion via a threaded portion of the fastener engaging the bottom hole or a threaded nut.

8. The bracket of claim 1, wherein the base portion comprises a set of holes, threaded holes, or slots usable to facilitate mounting the bracket to a surface.

9. The bracket of claim 8, wherein a subset of the set of holes, threaded holes, or slots are formed in a portion of the base portion that extends beyond a first side end of the top portion and a second side end of the bottom portion.

10. The bracket of claim 1, wherein respective slots are formed in respective locations of the top portion and the bottom portion to form at least a first clamping portion and a second clamping portion of the bracket, wherein the first clamping portion is at least partially defined by at least one slot of the respective slots, and wherein the second clamping portion is at least partially defined by at least one of the at least one slot or at least one other slot of the respective slots.

11. The bracket of claim 10, wherein the first clamping portion comprises a first top portion of the top portion, a first top edge portion of the top edge portion, a first bottom portion of the bottom portion, and a first bottom edge portion of the bottom edge portion, and wherein the second clamping portion comprises a second top portion of the top portion, a second top edge portion of the top edge portion, a second bottom portion of the bottom portion, and a second bottom edge portion of the bottom edge portion.

12. The bracket of claim 11, wherein a first hole is formed at a first location in the first top portion, a second hole is formed at a second location in the second top portion, a third hole is formed at a third location in the first bottom portion, and a fourth hole is formed at a fourth location in the second bottom portion, wherein the first hole is aligned with the third hole to facilitate insertion of a fastener into or through the first hole and the third hole to facilitate clamping of the first clamping portion on the first groove and the second groove of the object, and wherein the second hole is aligned with the fourth hole to facilitate insertion of another fastener into or through the second hole and the fourth hole to facilitate clamping of the second clamping portion on a third groove of another object and a fourth groove of the other object.

13. An apparatus, comprising:
a first portion that is associated with a base portion on an end of the first portion wherein the base portion has a specified length, wherein the first portion comprises a first edge portion at another end of the first portion that is opposite the end of the first portion, wherein the first edge portion is bent at a first defined angle and has a first defined shape that is based at least in part on a first groove shape of a first groove formed in or on a casing of an object, wherein the first edge portion is formed to be curved in the first defined shape that is semi-circular to complement the first groove shape of the first groove in or on a first surface of the casing of the object, wherein the first edge portion comprises a left edge portion, a right edge portion, and a middle edge portion situated between the left edge portion and the right edge portion, wherein the middle edge portion extends further away in distance from the base portion than the left edge portion and the right edge portion, and wherein the middle edge portion is configured to be insertable into the first groove formed in or on the casing of the object; and
a second portion that is associated with the base portion on an end of the second portion, wherein the second portion comprises a second edge portion at another end of the second portion that is opposite the end of the second portion, wherein the second edge portion is bent at a second defined angle and has a second defined shape that is based at least in part on a second groove shape of a second groove in or on the casing of the object that is capable of being held in the apparatus between the first edge portion and the second edge portion.

14. The apparatus of claim 13, wherein the first portion comprises a first hole formed in a first location on the first portion, and the second portion comprises a second hole formed in a second location on the second portion, and wherein the first hole is aligned with the second hole to facilitate insertion of a fastener into or through the first hole and the second hole to facilitate clamping of the first edge portion on the first groove of the object and the second edge portion on the second groove of the object.

15. The apparatus of claim 14, wherein the first edge portion is configured to apply a first pressure to the first groove of the object, and the second edge portion is configured to apply a second pressure to the second groove of the object, in response to a third pressure that is able to be applied to the first portion by a head portion of the fastener and a fourth pressure that is able to be applied to the second portion via a threaded portion of the fastener engaging at least one of the bottom hole or a threaded nut.

16. The apparatus of claim 13, wherein the second edge portion is formed to be curved in the second defined shape that is semi-circular to complement the second groove shape of the second groove in or on a second surface of the casing of the object, wherein the first groove shape is a semi-circular shape, and wherein the second groove shape is the semi-circular shape.

17. The apparatus of claim 13, wherein the second portion is same in structure as the first portion, and wherein the second portion is inverted with respect to the first portion to facilitate placing the first edge portion in proximity to the second edge portion when a first main body portion of the first portion is parallel to a second main body portion of the second portion.

18. The apparatus of claim 13, wherein the object is a sensor device, a light device, a camera, a video capture device, an audio capture device, or a measurement device.

19. The apparatus of claim 13, wherein the apparatus is formed from a single piece of a material, wherein the base portion, the first portion, and the second portion are of a uniform or at least a substantially uniform thickness, and wherein the material is a metal or a plastic.

* * * * *